United States Patent
Komiskas et al.

(10) Patent No.: US 11,206,391 B2
(45) Date of Patent: *Dec. 21, 2021

(54) SELECTIVE MONO/STEREO VISUAL DISPLAYS

(71) Applicant: Atheer, Inc., Santa Clara, CA (US)

(72) Inventors: Mario Komiskas, San Mateo, CA (US); Nathan Abercrombie, Oakland, CA (US); Sleiman Itani, East Palo Alto, CA (US)

(73) Assignee: Atheer, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/825,907

(22) Filed: Mar. 20, 2020

(65) Prior Publication Data
US 2020/0288115 A1    Sep. 10, 2020

Related U.S. Application Data

(63) Continuation of application No. 16/109,624, filed on Aug. 22, 2018, now Pat. No. 10,638,123, which is a continuation of application No. 14/952,007, filed on Nov. 25, 2015, now abandoned.

(51) Int. Cl.
*H04N 13/361* (2018.01)
*H04N 13/156* (2018.01)
*H04N 13/356* (2018.01)

(52) U.S. Cl.
CPC ......... *H04N 13/361* (2018.05); *H04N 13/156* (2018.05); *H04N 13/356* (2018.05)

(58) Field of Classification Search
None
See application file for complete search history.

(56) References Cited

U.S. PATENT DOCUMENTS

| 8,860,785 | B2 * | 10/2014 | Ji | H04N 13/334 |
| | | | | 348/43 |
| 10,623,726 | B2 * | 4/2020 | Kosmiskas | H04N 13/398 |
| 10,638,123 | B2 * | 4/2020 | Kosmiskas | H04N 13/361 |

(Continued)

FOREIGN PATENT DOCUMENTS

| KR | 20080088644 A | * | 10/2008 | G06T 9/20 |
| KR | 20080088644 A | | 10/2008 | |

*Primary Examiner* — Reza Aghevli
(74) *Attorney, Agent, or Firm* — Miller IP Law

(57) ABSTRACT

To enhance a mono-output-only controller such as a mobile OS to support selective mono/stereo/mixed output, a stereo controller is instantiated in communication with the mono controller. The stereo controller coordinates stereo output, but calls and adapts functions already present in the mono controller for creating surface and image buffers, rendering, compositing, and/or merging. For content designated for 2D display, left and right surfaces are rendered from a mono perspective; for content designated for 3D display, left and right surfaces are rendered from left and right stereo perspectives, respectively. Some, all, or none of available content may be delivered to a stereo display in 3D, with a remainder delivered in 2D, and with comparable content still delivered in 2D to the mono display. The stereo controller is an add-on; the mono controller need not be replaced, removed, deactivated, or modified, facilitating transparency and backward compatibility.

19 Claims, 31 Drawing Sheets

(56) References Cited

U.S. PATENT DOCUMENTS

| | | | | |
|---|---|---|---|---|
| 2008/0088644 | A1* | 4/2008 | Paquette | H04N 13/156 345/634 |
| 2010/0104219 | A1* | 4/2010 | Limonov | H04N 13/10 382/285 |
| 2011/0084900 | A1* | 4/2011 | Jacobsen | G06F 3/017 345/156 |
| 2011/0316971 | A1* | 12/2011 | Zhou | H04N 13/239 348/43 |
| 2012/0300046 | A1* | 11/2012 | Blayvas | H04N 13/305 348/54 |
| 2013/0165070 | A1* | 6/2013 | Hoffberg | G08G 1/0133 455/404.2 |
| 2013/0286010 | A1* | 10/2013 | Yan | H04N 13/183 345/419 |
| 2013/0300823 | A1* | 11/2013 | Chu | H04N 13/128 348/43 |
| 2013/0329068 | A1* | 12/2013 | Hamanaka | H04N 5/232933 348/218.1 |
| 2014/0368412 | A1* | 12/2014 | Jacobsen | G06F 3/0346 345/8 |
| 2015/0002644 | A1* | 1/2015 | Imajo | H04N 13/356 348/51 |
| 2017/0064282 | A1* | 3/2017 | Lo | H04N 13/243 |
| 2019/0058877 | A1 | 2/2019 | Komiskas et al. | |

* cited by examiner

SELECTIVE MONO/STEREO VISUAL DISPLAYS

CROSS-REFERENCE TO RELATED APPLICATION

This application is a continuation of U.S. patent application Ser. No. 16/109,624, filed Aug. 22, 2018, which is a continuation of U.S. patent application Ser. No. 14/952,007, filed Nov. 25, 2015.

FIELD OF THE INVENTION

This disclosure relates to displaying graphical content in one or both of mono and stereo formats. More particularly, the disclosure relates to selectively outputting mono and/or stereo visual display from one or more graphical content sources, enabling exhibition of content in 2D from mono displays and selective exhibition of 2D and/or 3D content (individually or together) from stereo displays, with the content potentially corresponding between displays.

DESCRIPTION OF RELATED ART

Mono displays may deliver content rendered from a single perspective or point of view. Examples may include screens for smart phones, tablets, laptop computers, desktop monitors, and so forth. For mono displays, the content as displayed may appear two dimensional or "flat". Even if the content source is three dimensional, such as a model of a three dimensional object or environment, rendering and display result in output that is or that at least appears to be two dimensional.

Stereo displays, by contrast, may deliver content rendered from two perspectives. For example, a stereo head mounted display may have a left screen and a right screen, such that when the left screen is visible to a viewer's left eye and the right screen is visible to a viewer's right eye, the user may visually "fuse" the two images to perceive an appearance of depth. In such manner, three dimensional content may be delivered with the appearance of three dimensionality.

However, delivery of content may present difficulties if the content varies in dimensionality (e.g. some content is 2D while some is 3D, content varies over time between 2D and 3D, content is 2D for one device but 3D for another, etc.), and/or if a controller for delivering content is adapted only for supporting one type of content (e.g. mono content only, stereo content only, etc.). For example, for a mobile operating system adapted specifically to deliver mono output to a mono display (e.g. on a smart phone), addressing a stereo display and/or facilitating stereo output thereto may be problematic, even if a stereo display were made available. The mobile operating system in such an example may be unsuited for handling stereo content (e.g. for processing left and right stereo feeds rather than a single mono feed, etc.), or for mixed mono/stereo content, etc. Conversely, for a controller adapted specifically to deliver stereo output to a stereo display (e.g. a head mounted display), addressing a mono display and/or facilitating output thereto likewise may be problematic.

BRIEF SUMMARY OF THE INVENTION

This disclosure contemplates a variety of systems, apparatus, methods, and paradigms for mono, stereo, and/or combined mono/stereo display.

In one embodiment, a machine-implemented method is provided that includes establishing a mono controller on a processor, establishing a stereo controller on the processor in communication with the mono controller, disposing left and right stereo displays in communication with the stereo controller and disposing at least one graphical content source in communication with the mono controller. The method includes at least one of the mono controller and the stereo controller establishing a mono perspective, and the stereo controller establishing a stereo configuration, invoking establishing of a left stereo perspective and a right stereo perspective, and invoking establishing of a dimensionality status of each graphical content source. The stereo controller invokes establishing a left surface buffer compatible with the mono controller and a right surface buffer compatible with the mono controller, and invokes establishing a left image buffer compatible with the mono controller and a right image buffer compatible with the mono controller.

In certain embodiments, for each content source with a 2D status, the stereo controller invokes rendering of a left surface therefrom with the mono perspective into the left surface buffer and a right surface therefrom with the mono perspective into the right surface buffer. For each content source with a 3D status, the stereo controller invokes rendering a left surface therefrom with the left stereo perspective into the left surface buffer and a right surface therefrom with the right stereo perspective into the right surface buffer. The stereo controller invokes compositing of the left surfaces in the left surface buffer and of the right surfaces in the right surface buffer, and invokes merging of the left surfaces to a left image into the left image buffer and of the right surfaces to a right image into the right image buffer. The method includes the stereo controller outputting the left image to the left stereo display, and the right image to the right stereo display.

The method may include the stereo display exhibiting 2D content from the content sources in 2D in conjunction with 3D content from the content sources in 3D. The stereo display may exhibits at least a portion of the 3D content in a window, with at least a portion of the 2D content outside the window.

The mono controller may be responsive to mono controller input delivered thereto. The mono controller input may invoke changing the content of the mono image. The mono controller input may invokes changing 3D content of the mono image. The mono controller input may include touch screen input.

The stereo controller may be responsive to stereo controller input delivered thereto. The stereo controller input may invoke changing the content of the mono image. The stereo controller input may invoke changing 3D content of the mono image. The stereo controller input may include free space manual input.

Invoking rendering may include the mono controller rendering, the stereo controller rendering, and/or a further data entity in communication with the mono controller and/or the stereo controller rendering. Invoking compositing may include the mono controller compositing, the stereo controller compositing, and/or a further data entity in communication with the mono controller and/or the stereo controller compositing. Invoking merging may include the mono controller merging, the stereo controller merging, and/or a further data entity in communication with the mono controller and/or the stereo controller merging.

Invoking rendering may include the stereo controller calling the mono controller to render, invoking compositing may include the stereo controller calling the mono controller to composite, and invoking merging may include the stereo controller calling the mono controller to merge.

The stereo controller calling the mono controller to render may include the stereo controller defining a virtual display for rendering by the mono controller, the stereo controller calling a render function within the mono controller, the stereo controller activating executable instructions for rendering in the mono controller, and/or the stereo controller copying and executing executable instructions for rendering from the mono controller.

The stereo controller calling the mono controller to composite may include the stereo controller defining a virtual display for compositing by the mono controller, the stereo controller calling a composite function within the mono controller, the stereo controller activating executable instructions for compositing in the mono controller, and/or the stereo controller copying and executing executable instructions for compositing from the mono controller.

The stereo controller calling the mono controller to merge may include the stereo controller defining a virtual display for merging by the mono controller, the stereo controller calling a merge function within the mono controller, the stereo controller activating executable instructions for merging in the mono controller, and/or the stereo controller copying and executing executable instructions for merging from the mono controller.

The processor may be disposed in a mobile device. The processor may be disposed in a smart phone and/or a head mounted display.

The mono controller may include a mobile operating system.

The graphical content source may include a 2D interface, a 2D model, a 2D icon, a 2D menu, a 2D meter, 2D augmented reality information, 2D virtual reality information, a 3D interface, a 3D model, a 3D icon, a 3D menu, a 3D meter, 3D augmented reality information, and/or 3D virtual reality information.

Establishing the stereo controller on the processor may not alter the mono controller. The stereo controller may not interfere with an operation of the mono controller.

In another embodiment, an apparatus is provided that includes a processor, at least one graphical content source in communication with the processor, left and right stereo displays in communication with the processor, a mono controller including executable instructions instantiated on the processor, and a stereo controller including executable instructions instantiated on the processor. The mono controller includes a graphical content communicator adapted to dispose the graphical content source(s) in communication with the mono controller, a mono perspective establisher adapted to establish a mono perspective, a mono surface buffer establisher adapted to establish a mono surface buffer including at least one mono surface, a mono image buffer establisher adapted to establish a mono image buffer, a mono surface renderer adapted to render the graphical content sources to the mono surface buffer from the mono perspective, a mono surface compositor adapted to composite the mono surface(s), and a mono image merger adapted to merge the mono surface(s) to a mono image in the mono image buffer. The stereo controller includes a mono controller communicator adapted to communicate with the mono controller, a perspective invoker adapted to invoke establishing of a mono perspective and/or a left and a right stereo perspective, a surface buffer invoker adapted to invoke establishing of left and right surface buffers including at least one left and right surface respectively with the left and right surface buffers being compatible with the mono surface buffer, an image buffer invoker adapted to invoke establishing of left and right image buffers compatible with the mono image buffer, a surface renderer invoker adapted to invoke rendering of the graphical content sources from the mono perspective to the left and right surface buffers for the 2D graphical content sources and to invoke rendering of the 3D graphical content sources from the left and right perspectives to the left and right stereo surface buffers respectively, a surface compositor invoker adapted to invoke compositing of the left and right surfaces in the left and right surface buffers respectively, an image merger invoker adapted to invoke merging of the left and right surfaces to a left image in the left image buffer and a right image in the right image buffer respectively, and a stereo outputter adapted to output the left image to the left stereo display and the right image to the right stereo display.

The apparatus may include a body, the processor and the left and right stereo displays disposed on the body, with wherein the body adapted to be worn on a wearer's such that the left and right stereo displays are disposed substantially in front of, substantially facing toward, and proximate the eyes of the wearer so as to enable stereo output thereto.

In another embodiment, a machine-implemented method is provided that includes instantiating a mobile operating system on a processor of a mobile electronic device, instantiating a stereo controller on the processor in communication with the mobile operating system, disposing left and right stereo displays in communication with the stereo controller, and disposing at least one graphical content source in communication with the mobile operating system. The method includes the mobile operating system defining a mono perspective, and the stereo controller defining a stereo configuration and defining left and right stereo perspectives. The method includes the stereo controller querying the mobile operating system for a dimensionality status of each graphical content source. The stereo controller calls the mobile operating system to define a left surface buffer, to define a right surface buffer, to define a left image buffer, and to define a right image buffer. For each 2D content source, the stereo controller calls the mobile operating system to render a left surface therefrom with the mono perspective into the left surface buffer and to render a right surface therefrom with the mono perspective into the right surface buffer. For each 3D content source, the stereo controller calls the mobile operating system to render a left surface therefrom with the left perspective into the left surface buffer and to render a right surface therefrom with the right perspective into the right surface buffer. The stereo controller calls the mobile operating system to composite the left surfaces in the left surface buffer, to composite the right surfaces in the right surface buffer, to merge the left surfaces to a left image in the left image buffer, and to merge the right surfaces to a right image in the right image buffer. The method includes the stereo controller outputting the left image to the left stereo display and outputting the right image to the right stereo display.

In another embodiment, an apparatus is provided that includes means for establishing a mono controller on a processor, means for establishing a stereo controller on the processor in communication with the mono controller, means for disposing left and right stereo displays in communication with the stereo controller, and means for disposing at least one graphical content source in communication with the mono controller. The apparatus includes means in the mono controller and/or the stereo controller for establishing a mono perspective. The apparatus includes means in the stereo controller for establishing a stereo configuration, means in the stereo controller for invoking establishing of a left stereo perspective and a right stereo perspective, means in the stereo controller for invoking establishing of a dimensionality status of each graphical content source in communication with the mono controller, means in the stereo controller for invoking establishing of a left surface buffer compatible with the mono controller, means in the stereo controller for invoking establishing of a right surface buffer compatible with the mono controller, means in the stereo controller invoking for establishing of a left image buffer compatible with the mono controller, and means in the stereo controller for invoking establishing of a right image buffer compatible with the mono controller. The apparatus includes means in the stereo controller for invoking rendering of a left surface with the mono perspective into the left surface buffer for each of the 2D content sources, means in the stereo controller for invoking rendering of a left surface with the left perspective into the left surface buffer for each of the 3D content sources, means in the stereo controller for invoking rendering of a right surface with the mono perspective into the right surface buffer for each of the 2D content sources, and means in the stereo controller for invoking rendering of a right surface with the right perspective into the right surface buffer for each of the 3D content sources. The apparatus further includes means in the stereo controller for invoking compositing of the left surfaces in the left surface buffer, means in the stereo controller for invoking compositing of the right surfaces in the right surface buffer, means in the stereo controller for invoking merging of the left surfaces to a left image into the left image buffer, and means in the stereo controller for invoking merging of the right surfaces to a right image into the right image buffer. The apparatus also includes means in the stereo controller for outputting the left image to the left stereo display, and the right image to the right stereo display.

In another embodiment, a machine-implemented method is provided that includes establishing a mono controller on a processor, establishing a stereo controller on the processor in communication with the mono controller, disposing a mono display in communication with the mono controller, disposing left and right stereo displays in communication with the stereo controller, and disposing at least one graphical content source in communication with the mono controller. The method includes the mono controller and/or the stereo controller establishing a mono perspective, the stereo controller establishing a stereo configuration, the stereo controller invoking establishing of a left stereo perspective and a right stereo perspective, and the stereo controller invoking establishing of a dimensionality status of each graphical content sources in communication with the mono controller. The mono controller establishes a mono surface buffer, and the stereo controller invokes establishing of a left surface buffer compatible with the mono controller and a right surface buffer compatible with the mono controller. The mono controller establishes a mono image buffer, and the stereo controller invokes establishing of a left image buffer compatible with the mono controller and a right image buffer compatible with the mono controller. For each content source the mono controller renders a mono surface therefrom from the mono perspective into the mono surface buffer. For each content source having 2D status, the stereo controller invokes rendering of a left surface therefrom with the mono perspective into the left surface buffer and a right surface therefrom with the mono perspective into the right surface buffer. For each content source having 3D status, the stereo controller invokes rendering of a left surface therefrom with the left stereo perspective into the left surface buffer and a right surface therefrom with the right stereo perspective into the right surface buffer. The mono controller composites the mono surfaces in the mono surface buffer, and the stereo controller invokes compositing of the left surfaces in the left surface buffer and the right surfaces in the right surface buffer. The mono controller merges the mono surfaces to a mono image in the mono image buffer, and the stereo controller invokes merging of the left surfaces to a left image into the left image buffer and the right surfaces to a right image into the right image buffer. The method includes the mono controller outputting the mono image to the mono display, and the stereo controller outputting the left image to the left stereo display and the right image to the right stereo display.

The stereo display may exhibit 2D content from the content sources in 2D in conjunction with 3D content from the content sources in 3D. The content exhibited by the stereo display may substantially corresponds with the content exhibited by the mono display. The stereo display may exhibits at least a portion of the 3D content in a window, with at least a portion of the 2D content outside the window.

The mono controller may be responsive to mono controller input delivered thereto. The mono controller input may invoke changing content of the mono image. The mono controller input may invoke changing 3D content of the mono image. The mono controller input may include touch screen input.

The stereo controller may be responsive to stereo controller input delivered thereto. The stereo controller input may invokes changing content of the mono image. The stereo controller input may invoke changing 3D content of the mono image. The stereo controller input may include free space manual input.

Invoking rendering may include the mono controller rendering, the stereo controller rendering, and/or a further data entity in communication with at the mono controller and/or the stereo controller rendering. Invoking compositing may include the mono controller compositing, the stereo controller compositing, and/or a further data entity in communication with at the mono controller and/or the stereo controller compositing. Invoking merging may include the mono controller merging, the stereo controller merging, and/or a further data entity in communication with at the mono controller and/or the stereo controller merging.

Invoking rendering may include the stereo controller calling the mono controller to render, invoking compositing may include the stereo controller calling the mono controller to composite, and invoking merging may include the stereo controller calling the mono controller to merge.

The stereo controller calling the mono controller to render may include the stereo controller defining a virtual display for rendering by the mono controller, the stereo controller calling a render function within the mono controller, the stereo controller activating executable instructions for rendering in the mono controller, and/or the stereo controller copying and executing executable instructions for rendering from the mono controller.

The stereo controller calling the mono controller to composite may include the stereo controller defining a virtual display for compositing by the mono controller, the stereo controller calling a composite function within the mono controller, the stereo controller activating executable instructions for compositing in the mono controller; and/or the stereo controller copying and executing executable instructions for compositing from the mono controller.

The stereo controller calling the mono controller to merge may include the stereo controller defining a virtual display for merging by the mono controller, the stereo controller calling a merge function within the mono controller, the stereo controller activating executable instructions for merging in the mono controller, and/or the stereo controller copying and executing executable instructions for merging from the mono controller.

The processor may be disposed in a mobile device. The processor may be disposed in a smart phone and/or a head mounted display.

The mono controller may include a mobile operating system.

The graphical content sources may include a 2D interface, a 2D model, a 2D icon, a 2D menu, a 2D meter, 2D augmented reality information, 2D virtual reality information, a 3D interface, a 3D model, a 3D icon, a 3D menu, a 3D meter, 3D augmented reality information, and/or 3D virtual reality information.

Establishing the stereo controller on the processor may not alter the mono controller. The stereo controller may not interfere with an operation of the mono controller.

In another embodiment, an apparatus is provided that includes a processor, at least one graphical content source in communication with the processor, a mono display in communication with the processor, left and right stereo displays in communication with the processor, a mono controller including executable instructions instantiated on the processor, and a stereo controller including executable instructions instantiated on the processor. The mono controller includes a graphical content communicator adapted to dispose the graphical content source(s) in communication with the mono controller, a mono perspective establisher adapted to establish a mono perspective, a mono surface buffer establisher adapted to establish a mono surface buffer including at least one mono surface, a mono image buffer establisher adapted to establish a mono image buffer, a mono surface renderer adapted to render the graphical content sources to the mono surface buffer from the mono perspective, a mono surface compositor adapted to composite the mono surface(s), a mono image merger adapted to merge the mono surface(s) to a mono image in the mono image buffer, and a mono outputter adapted to output the mono image to the mono display. The stereo controller includes a mono controller communicator adapted to communicate with the mono controller, a perspective invoker adapted to invoke establishing of left and right stereo perspectives, a surface buffer invoker adapted to invoke establishing of left and right surface buffers including at least one left and right surface respectively with the left and right surface buffers being compatible with the mono surface buffer, an image buffer invoker adapted to invoke establishing of left and right image buffers compatible with the mono image buffer, a surface renderer invoker adapted to invoke rendering of the graphical content sources from the mono perspective to the left and right surface buffers for the graphical content sources exhibiting 2D graphical content and to invoke rendering of the graphical content sources from the left and right perspectives to the left and right stereo surface buffers respectively for the graphical content sources exhibiting 3D graphical content, a surface compositor invoker adapted to invoke compositing of the left and right surfaces in the left and right surface buffers respectively, an image merger invoker adapted to invoke merging of the left and right surfaces to a left image in the left image buffer and a right image in the right image buffer respectively, and a stereo outputter adapted to output the left image to the left stereo display and the right image to the right stereo display.

The apparatus may include a body, the processor and the left and right stereo displays being disposed on the body, the body being adapted to be worn on a wearer's head such that the left and right stereo displays are disposed substantially in front of, substantially facing toward, and proximate eyes of the wearer so as to enable stereo output thereto. In another embodiment, a machine-implemented method is provided that includes instantiating a mobile operating system on a processor of a mobile electronic device, instantiating a stereo controller on the processor in communication with the mobile operating system, disposing a mono display in communication with the mono controller, disposing left and right stereo displays in communication with the stereo controller, and disposing at least one graphical content source in communication with the mobile operating system. The mobile operating system defines a mono perspective, and the stereo controller defines a stereo configuration and left and right stereo perspectives.

According to certain embodiments, the stereo controller queries the mobile operating system for a dimensionality status of the graphical content source(s) in communication with the mobile operating system. The mono controller defines a mono surface buffer, and the stereo controller calls the mobile operating system to define a left surface buffer and a right surface buffer. The mobile operating system defines a mono image buffer, and the stereo controller calls the mobile operating system to define a left image buffer and a right image buffer. For each content source the mobile operating system renders a mono surface therefrom with the mono perspective into the mono surface buffer. For each content source with a 2D status the stereo controller calls the mobile operating system to render a left surface therefrom with the mono perspective into the left surface buffer and a right surface therefrom with the mono perspective into the right surface buffer. For each content source with a 3D status the stereo controller calls the mobile operating system to render a left surface therefrom with the left perspective into the left surface buffer and a right surface therefrom with the right perspective into the right surface buffer. The mobile operating system composites the mono surfaces in the mono surface buffer, and the stereo controller calls the mobile operating system to composite the left surfaces in the left surface buffer and the right surfaces in the right surface buffer. The mobile operating system merges the mono surfaces to a mono image in the mono image buffer, and the stereo controller calls the mobile operating system to merge the left surfaces to a left image in the left image buffer the right surfaces to a right image in the right image buffer. The method includes the mobile operating system outputting the mono image to the mono display, and the stereo controller outputting the left image to the left stereo display and the right image to the right stereo display.

In another embodiment, an apparatus is provided that includes means for establishing a mono controller on a processor, means for establishing a stereo controller on the processor in communication with the mono controller, means for disposing a mono display in communication with the mono controller, means for disposing left and right stereo displays in communication with the stereo controller, means for disposing at least one graphical content source in communication with the mono controller, and means in the mono and/or the stereo controller for establishing a mono perspective. The apparatus includes means in the stereo controller for establishing a stereo configuration, means in the stereo controller for invoking establishing of a left stereo perspective and a right stereo perspective, and means in the stereo controller for invoking establishing of a dimensionality status of each graphical content source in communication with the mono controller. The apparatus includes means in the mono controller for establishing a mono surface buffer, and means in the stereo controller for invoking establishing of a left surface buffer compatible with the mono controller and a right surface buffer compatible with the mono controller. The apparatus includes means in the mono controller for establishing a mono image buffer, and means in the stereo controller invoking for establishing of a left image buffer compatible with the mono controller and a right image buffer compatible with the mono controller. The apparatus includes means in the mono controller for rendering a mono surface with the mono perspective into the mono surface buffer for each of the content sources. The apparatus also includes means in the stereo controller for invoking rendering of a left surface with the mono perspective into the left surface buffer for each content source with a 2D status and a right surface with the mono perspective into the right surface buffer for each of the content sources having a 2D status. The apparatus includes means in the stereo controller for invoking rendering of a left surface with the left perspective into the left surface buffer for each of the content sources having a 3D status and a right surface with the right perspective into the right surface buffer for each of the content sources having a 3D status. The apparatus includes means in the mono controller for compositing the mono surfaces in the mono surface buffer, and means in the stereo controller for invoking compositing of the left surfaces in the left surface buffer and the right surfaces in the right surface buffer. The apparatus includes means in the mono controller for merging the mono surfaces to a mono image into the mono image buffer, and means in the stereo controller for invoking merging of the left surfaces to a left image into the left image buffer and the right surfaces to a right image into the right image buffer. The apparatus includes means in the mono controller for outputting the mono image to the mono display, and means in the stereo controller for outputting the left image to the left stereo display and the right image to the right stereo display.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
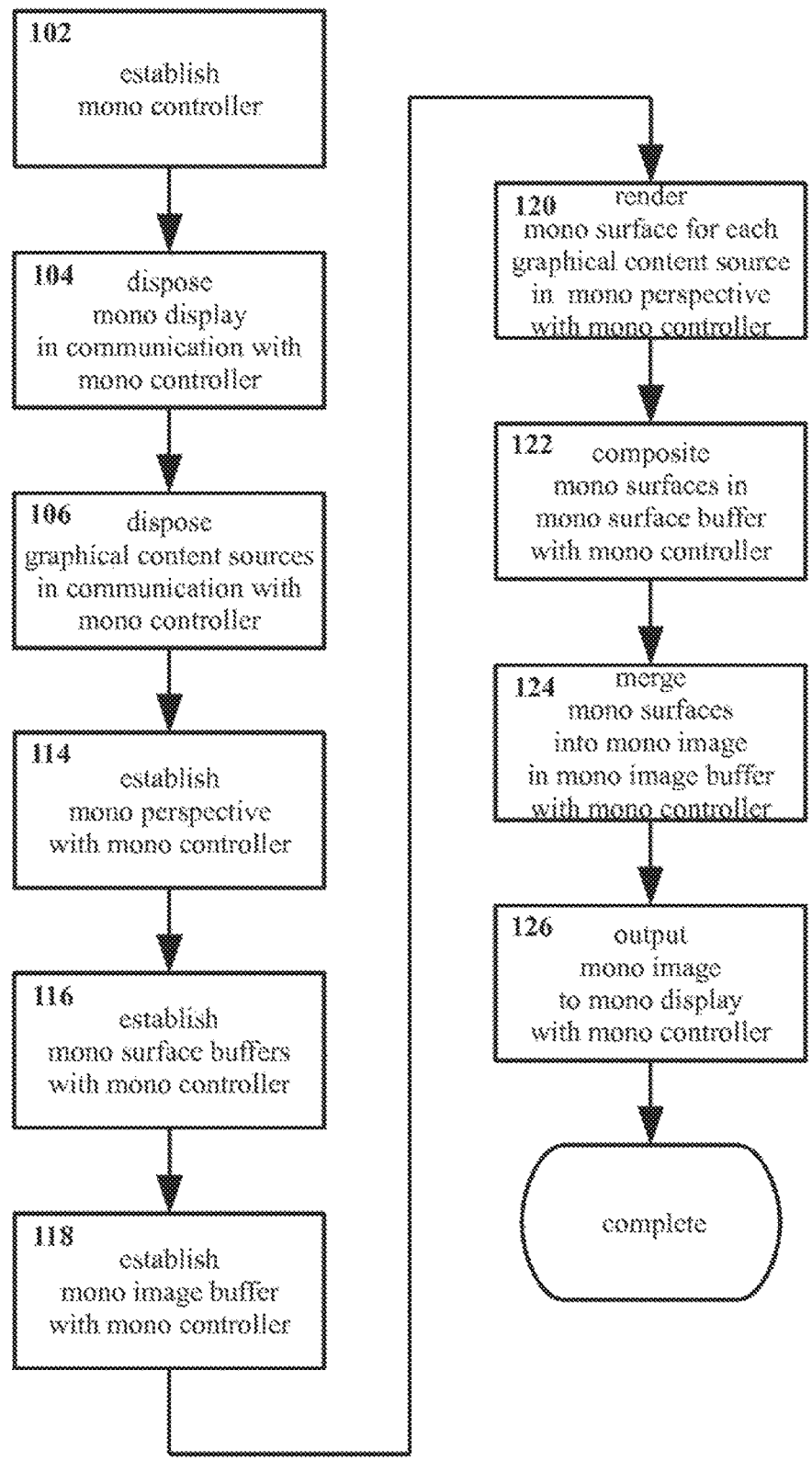
FIG. 1 shows an arrangement for delivering mono-only graphical content from a mono-only display, in flow chart form.

Mono output may be delivered using dedicated tools specifically for enabling mono output in cooperation specifically with mono displays. Stereo output also may be delivered using dedicated tools specifically for enabling stereo output in cooperation specifically with stereo displays.

In addition, as described and shown herein certain embodiments may enable selective delivery of mono, stereo, and/or mixed mono/stereo output. Also, certain embodiments may enable such selective delivery of mono, stereo, and/or mixed mono/stereo output at least in part through the use of tools that, in themselves, may be directed exclusively to mono output, exclusively from mono displays. In addition, certain embodiments may enable such selective delivery of mono, stereo, and/or mixed mono/stereo output without disabling, interfering with the operation of, and/or modifying the aforementioned tools for mono-only output from mono-only displays (though such mono-only tools may be supplemented). Furthermore, certain embodiments may enable selective delivery of mono, stereo, and/or mixed mono/stereo output from stereo displays, while enabling parallel delivery of mono-only output that is otherwise visually similar or identical from mono displays.

More concretely, consider a device with a mono display such as a smart phone, with a mobile operating system thereon supporting mono output to the mono display; and a device with a stereo display such as a near-eye stereo head-mounted display, with stereo controller software disposed thereon. Various embodiments may selectively deliver a controlled mix of mono and stereo content to the head mounted display. For example, certain features may be displayed in two-dimensional mono form while other features are displayed in stereo three-dimensional form, potentially at the same time, in proximity, mutually interacting, etc. Various embodiments may utilize functions already present within the mobile operating system for supporting mono output, such as renderers, compositors, etc., repurposing those functions (e.g. via the stereo controller software) and enabling delivery of a mono/stereo output mix, even though such functions may in themselves be limited only to mono output. Various embodiments may so repurpose such mono-only functions of the mobile operating system to enable mono/stereo output with the head mounted display, without necessarily requiring modification, deactivation, etc. of those mono-only functions or the mobile operating system as a whole. That is, the stereo controller software may run in conjunction with the mobile operating system (possibly even on the same processor), producing additional functionality—e.g. mono/stereo output with the head mounted display—at least in part by utilizing portions of the mobile operating system, without necessarily changing or requiring changes to the mobile operating system. Various embodiments also may enable continuing delivery of mono output by the mobile operating system to the smart phone mono display, even with certain mono-only functions of the mobile operating system being also re-purposed for mono/stereo display by the stereo controller with the head mounted display; and with the mono/stereo output with the head mounted display being visually similar or identical to the mono display output with the smart phone display.

In more colloquial terms, in certain embodiments a stereo controller may re-purpose parts of a mobile operating system or other mono controller, so as to enable selective delivery of mono and/or stereo content rather than mono content only. The mobile operating system may not require modification despite such re-purposing, and such re-purposing may not interfere with the ongoing operation of the mobile operating system, e.g. in continuing to deliver mono output to a mono-only display. Mono/stereo output delivered from a stereo display and mono output delivered from a mono display may be visually similar and/or identical, except with regard to dimensionality (i.e. content delivered in stereo to the stereo display appears three dimensional, while similar content delivered in mono to the mono display appears two dimensional).

Thus, it is emphasized that although certain embodiments may facilitate stereo output and/or mono output, such embodiments are not necessarily limited either to mono output alone nor to stereo output alone. Rather, embodiments may for example enable delivery of stereo output in cooperation with a mono system without necessarily degrading the ability of that mono system to provide mono output, without necessarily requiring that existing mono output capability be removed, replaced, or modified, and/or while potentially taking advantage of the existing mono output capability in enabling stereo output.

However, these are examples only, and are not limiting. More detailed description is provided subsequently herein.

It may be illuminating to present certain examples of uses for such an approach (though the following should not be considered limiting). Broadly speaking, delivery of combined mono/stereo output in convenient form facilitates the addition of 3D content to 2D content. That is, a "window" of 3D content may be "dropped in" to output that is otherwise 2D.

For example, in terms of a viewer experience a 3D videoconferencing window may be added to a 2D desktop. The person at the other end may be visible as a 3D presence, rather than as a flat image (assuming the person at the other end is being imaged in a manner that supports 3D output), even though surrounding features such as text documents, email programs, spreadsheets, etc. are in 2D. When the videoconference is over, the viewer may dismiss the 3D window, returning to an all 2D view.

As another example, someone assembling a piece of machinery such as an automobile engine may call up a 3D model of that engine, so as to more clearly view the intended positions, alignments, and/or motions of various components in 3D, while still viewing instructions describing the assembly task or providing other useful information as 2D text.

As still another example, a surgeon may view a 3D model of an organ, injury, etc. in 3D, while also keeping other information such as a cardiac trace, text indicating blood pressure, etc. present in 2D arranged around the 3D window. The surgeon may then rotate the 3D model of (for example) a patient's heart, zoom in or out, pan and tilt, etc. as needed, while the 3D model remains in the 3D window and the other important 2D information remains in place and visible. He or she also may resize the 3D window, move the 3D window around the screen, open another 3D window, etc., depending on what is most useful at any given time. The surgeon might also minimize or close the 3D window to clear his or her field of view for the surgery itself, and so forth. A high degree of flexibility in the use of 3D content thus may be available, enabling modification of what is displayed based on changing circumstances or changing user needs.

In addition, from the point of view of a programmer, if 3D content may be added and manipulated through "dropping in" a 3D window into an existing 2D environment, programming also may be simplified. Rather than requiring a dedicated 3D interface, or a tailor-made 3D space for each instance of 3D content, the programmer may call a 3D window similarly to calling a 2D window or other available content.

Furthermore, if 3D content may be combined in such fashion with 2D content, programs and other features already available for 2D content may remain useful as-is even with the addition of 3D content. A program that is capable only of handling 2D information may run in one window, even as another window displays 3D content. It may not be necessary to modify existing software, operating systems, libraries, utilities, etc., in order to support 3D content if 2D and 3D content can be mixed.

It is emphasized that although such features may be possible and/or useful for certain advantages, they are examples only, and embodiments are not limited only thereto.

As a note on terminology, the term "establishing" is used broadly herein. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a rendering may encompass several potential approaches, such as performing the rendering computationally (e.g. through the use of executable instructions instantiated on a processor), obtaining the rendering from a data store such as a hard drive or solid state drive, receiving the rendering via communication with some external device, system, etc., and so forth. Other arrangements also may be equally suitable, and embodiments are not limited with regard to how actions and/or entities may be established.

In addition, the terms "establish" and "invoke" are used herein to refer to certain tasks being commanded and/or carried out, with meanings that may in cases overlap but that are not necessarily identical.

As noted, the term "establish" as used herein refers to some action being taken, without consideration of "who" carries out the action.

By contrast, the term "invoke" as used herein refers to some action being taken, in addition considering "who" carries out the action. That is, the entity that carries out the action may be (but is not required to be) different from the entity that commands the action, initiates the action, or otherwise causes the action to take place. For example, a stereo controller may invoke rendering of a 3D model; the stereo controller may perform the rendering, but the rendering also may be performed by a rendering routine within a mono controller that is distinct from the stereo controller. In such instance the stereo controller may not carry out the rendering (and indeed the stereo controller itself may not even have a rendering engine or other system for directly rendering the model), but nevertheless the stereo controller is causing the rendering to be carried out (and may be controlling or overseeing the rendering, etc.), even if the mono controller carries out the actual work of rendering.

To invoke some action does not necessarily require that the action be carried out by some other entity unless so specified, but indicates that some other entity may carry out the action, e.g. as commanded by the entity doing the invoking.

FIG. 1 shows an example arrangement for mono visual display, presented herein so as to illustrate one possible manner (though not necessarily the only manner) by which mono visual content may be delivered to a mono display.

In FIG. 1, a mono controller is established 102. A mono controller may be substantially any entity adapted to deliver mono content to a mono display, for example performing the steps shown in FIG. 1, though not necessarily limited by the specific steps presented as an example in FIG. 1. Broadly speaking, a mono controller oversees the delivery of mono content (including but not limited to 2D imagery) to a viewer via a display suitable for such mono content. A mono controller may be and/or may include executable instructions instantiated on a processor, for example a mobile operating system loaded onto a processor in a mobile device such as a smart phone, tablet, head mounted display, etc. As another example, mono controllers also may include a personal computer operating system loaded onto a processor of a desktop or laptop computer, etc. Other arrangements also may be suitable.

A mono display is disposed 104 in communication with the mono controller. A mono display may be any system adapted to deliver content in a single-perspective, i.e. "mono", arrangement. Typically though not necessarily, a mono display may be considered to be a "flat" or 2D display, without supporting an appearance of a depth dimension. More concrete examples of mono displays may include but are not limited to a CRT monitor, an LCD display, a plasma screen, etc. Devices including such mono displays may include but are not limited to smart phones, tablets, desktop PCs, laptop PCs, etc. For a mono controller that includes executable instructions instantiated onto a processor, for example, disposing 104 a mono display in communication with the mono controller may represent physically connecting a mono display to the processor, configuring communication protocols so that the mono controller may address the mono display, etc. However, embodiments are not limited with regard to either how the mono controller is disposed in communication with the mono display, nor with regard to the nature(s) of either the mono controller or the mono display.

At least one graphical content source is disposed 106 in communication with the mono controller. A graphical content source supplies information regarding graphical content to the mono controller, and/or places graphical content under the control of the mono controller. For example, a video feed, a computer model, etc. may supply graphical information to the mono controller, which the mono controller may configure for output to the mono display (as described subsequently herein).

The term "graphical content" as used herein should be understood broadly. For example, although text is not necessarily considered to be "graphics" in common usage, nevertheless text may be considered graphical content herein, at least in that text may be displayed. That is, text may be visible when outputted from a display, and thus for purposes of the present disclosure is considered to be graphical content unless otherwise specified.

Similarly, the term "graphical content source" also should be understood broadly. A graphical content source provides information and/or control of information, but is not required to create or otherwise originate that information.

For example, a data store such as a hard drive may store information rather than necessarily creating information per se, but nevertheless may provide information to a mono controller. Similarly, a communicator such as a wireless modem or wired connection may transmit information from elsewhere, but likewise may provide information to a mono controller. Thus a data store and/or a communicator may in at least certain embodiments be considered a graphical content source, as may other devices and/or systems.

Furthermore, a graphical content source is not necessarily required to have graphical content therein in itself. As noted a computer model may be considered to be a graphical content source, however at least certain models may be entirely mathematical. That is, such a computer model may be "nothing but numbers", rather than necessarily being or including content that is directly visible e.g. as images. As described subsequently, images (or other visible features) may be rendered from a graphical content source, even if the graphical content itself is not strictly speaking a visual feature in itself.

Continuing in FIG. 1, a mono perspective is established 114 in and/or by the mono controller. For example, if graphical content is a three dimensional model, then at least in principle the distance, direction, orientation, etc. from which that three dimensional model is to be considered may vary. As a more concrete example, a three dimensional model of an automobile might be displayed from the front, the left side, etc., the field of view may vary so as to encompass the entire vehicle or only a small portion of the vehicle, etc. A mono perspective may be implicit and/or inherent for at least certain content. For example, for text the perspective may be assumed to be normal to the plane of the text; such presumed perspectives may be considered to satisfy the step of establishing 114 a mono perspective.

A mono surface buffer is established 116 in and/or by the mono controller. A mono surface buffer is a defined "space" wherein graphical surfaces (described subsequently herein) may be stored, manipulated, etc. It is noted that the mono surface buffer may not be a space or a place in a physical sense (though such is not prohibited), but rather may be a logical construct for accommodating graphical surfaces. For example, a mono surface buffer may be or may at least include some designated region of processor-accessible memory. In such instance, the step of establishing 116 the mono surface buffer may include designating address(es) for memory such that the mono controller may send mono surfaces thereto, manipulate mono surfaces therein, copy or move mono surfaces and/or data regarding mono surfaces therefrom, etc. It is noted that a mono surface buffer may include therein space for multiple surfaces, e.g. one or more surfaces for each graphical content source. Alternately, multiple mono surface buffers may be established.

A mono image buffer is established 118 in and/or by the mono controller. A mono image buffer is a defined "space" wherein an image may be stored, manipulated, etc. As with the mono surface buffer, the mono image buffer may not be a physical space or place (though again such is not prohibited), but rather may be a logical construct.

For example, a mono image buffer may be or may at least include some designated region of processor-accessible memory. In such instance, the step of establishing 118 the mono image buffer may include designating address(es) for memory such that the mono controller may send mono images thereto, manipulate mono images therein, draw mono images and/or data regarding mono images therefrom, etc. It is noted that a mono image buffer may include therein space for multiple images, and/or that multiple mono image buffers may be established.

The term "image buffer" is used herein for clarity, in that the image buffer as describes serves to accept images therein. However, in certain instances the term "frame buffer" also may be suitable, e.g. if the images stored therein are considered to be sequential frames of a video, an updating screen, etc.

Still with reference to FIG. 1, the mono controller renders 120 the graphical content sources to produce mono surfaces, in the mono perspective. The resulting mono surfaces are disposed within the mono surface buffer.

A mono surface may be considered to be a "view" of graphical content from and/or within a graphical content source. The term "rendering" as used herein refers to the production of that view, i.e. that mono surface, from the graphical content source. The process of rendering may vary. For example, for a graphical content source in the form of a video feed composed of many sequential image frames, a render thereof may simply be one of those image frames captured, copied, etc. from the video feed. However, as another example for a graphical content source in the form of a mathematical model of a 3D object or environment, a render thereof may be a graphical image based on the mathematical model, e.g. what would be "seen" of the model if the model were there to be seen (rather than being purely mathematical).

The mono controller composites 122 the mono surfaces within the mono surface buffer. Compositing includes arranging mono surfaces with regard to one another, for example specifying that some mono surfaces are "on top of" other mono surfaces (in a logical sense, not necessarily a physical sense), or otherwise addressing how overlapping data from multiple mono surfaces is to be handled (e.g. considering surfaces to be transparent, etc.). Compositing may also include aligning one or more mono surfaces with respect to one another and/or to some external standard. Compositing further may include scaling or otherwise resizing one or more mono surfaces, for example so as to arrange for all surfaces to have a consistent size; as a more concrete example, if the mono display is known to include an array of pixels 640×480 in size, some or all mono surfaces may be scaled to 640×480 pixels in size so as to fill the screen when outputted. Other operations also may be suitable.

Still referring to FIG. 1, the mono controller merges 124 the mono surfaces to form a mono image. Merging may yield the mono image directly in the mono image buffer, but also may move the image into the mono image buffer after generation elsewhere, etc. The term "merging" as used herein refers to combining multiple mono image surfaces to form a single image therefrom. In certain instances, merging may be considered analogous to collapsing a "stack" of mono surfaces (and/or renders thereon) such that some or all of the content of the mono surfaces (or at least the content thereof) therein is present within the resulting mono image. Another potentially analogous operation is the notion of "flattening" in certain graphics programs, wherein multiple "layers" are combined into one image.

The mono controller then outputs 126 the mono image to the mono display, such that the mono image is potentially visible thereon by a viewer.

An arrangement such as that shown in FIG. 1 may exhibit certain limitations. Notably, a mono controller as described with regard to FIG. 1 may not be suited for delivering 3D content, such as stereo content. More particularly, while a mono controller in communication with a mono display may output images of 3D content, the content itself nevertheless may be 2D (i.e. a "flat" image of a "solid" object may be displayed).

Mono controllers may make no provision for 3D. Thus, even if a mono controller were put in communication with a stereo display or other 3D output system, the mono controller may not necessarily be capable of displaying content in 3D. Indeed, if the mono controller does not have suitable avenues for addressing 3D content, including but not limited to stereo 3D, attempting to place a stereo display in communication with a mono controller may result in no content being displayed at all, or content being displayed incorrectly, or some other malfunction.

However, although mono controllers may have limitations with regard for example to delivering 3D output, mono controllers nevertheless are in wide use. For example Android, iOS, Windows Mobile, etc. may be used on smart phones, tablets, and other mobile devices, various operating systems may be used on laptop and desktop computers, etc. Likewise, many applications, libraries, plug-ins, peripherals, etc. may be configured to cooperate with mono controllers and/or with processors having mono controllers instantiated thereon. In addition, mono controllers may include useful features in themselves, whether relating to image output or otherwise (e.g. with regard to general file handling, input, etc.).

Furthermore, not all graphical content necessarily is either in 3D form or even well-suited for adaptation or conversion into 3D form. The continued ability to display 2D content, such as certain menus, text, etc. may remain useful even if the ability to display 3D content is made available. In particular, the ability to simultaneously display both 2D and 3D content may be advantageous.

Thus, although it may be possible in principle to fully replace existing mono controllers with dedicated stereo controllers (or other 3D controllers), such a full replacement may represent and/or require a considerable effort, may not be entirely necessary, and may present problems in itself (for example, "legacy" applications written for use with a mono controller may not operate properly or at all with a replacement stereo controller).

If mono controllers already are available, it may be fruitful to add to and/or adapt existing mono controllers so as to enable stereo output and/or mixed mono/stereo output as well, without necessarily replacing, modifying, or interfering with such mono controllers or capabilities thereof.

Figure 2A:
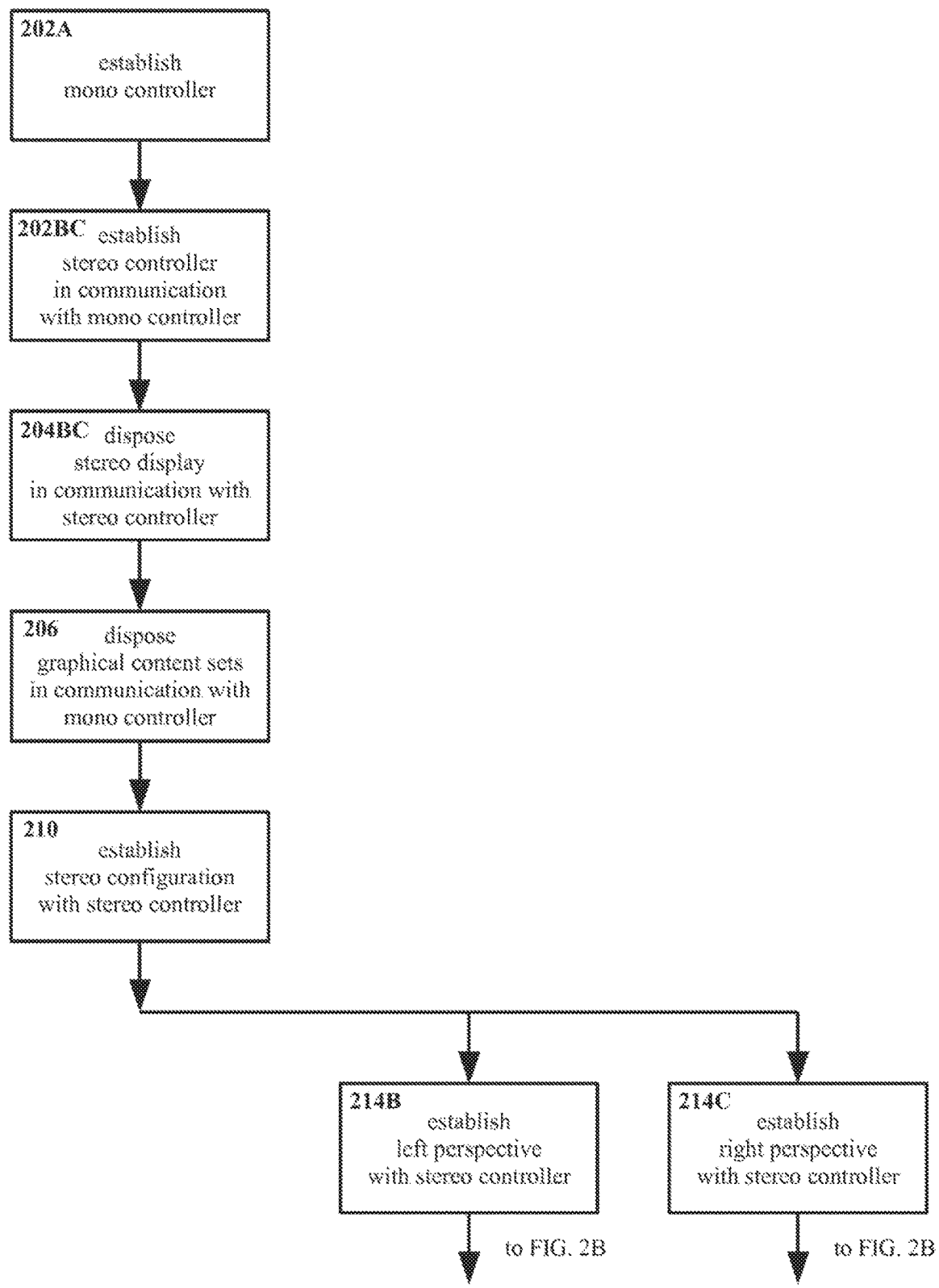
FIG. 2A through FIG. 2C show an example method for delivering stereo and/or mixed mono/stereo content from a stereo display, in flow chart form.
Figure 2B:
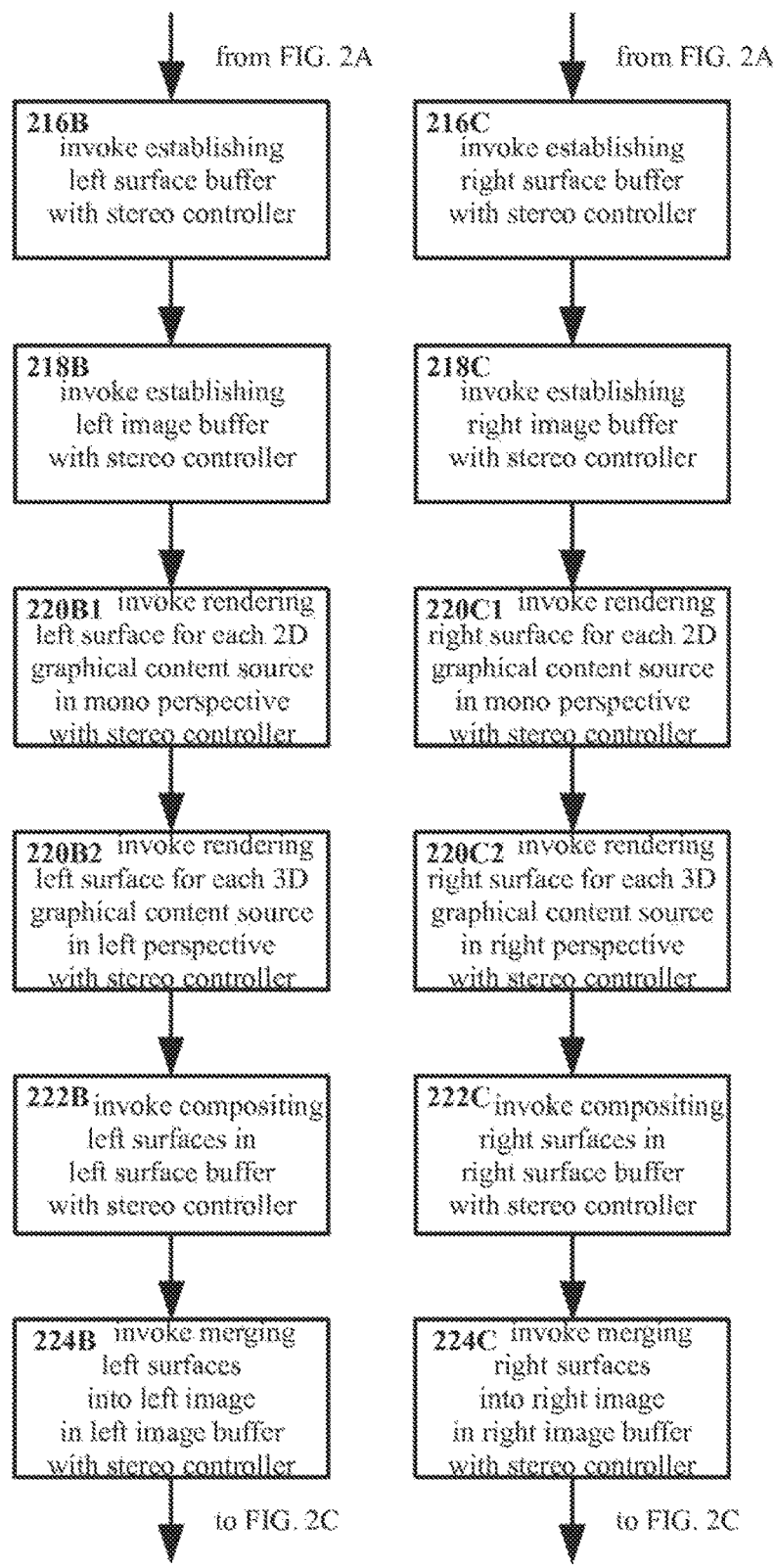

Now with reference to FIG. 2A and FIG. 2B, therein is shown an example arrangement for stereo visual display. The method shown in FIG. 2A and FIG. 2B may in some sense be considered to be an adaptation of and/or an addition to certain steps as previously described with regard to FIG. 1. At least certain embodiments may utilize existing "infrastructure", e.g. a mono controller and/or functions as may be carried out in whole or in part a mono controller, in producing new outcomes. More colloquially, stereo output may be accomplished at least partly through the use of a mono controller.

It is also noted that for purposes of simplicity, the arrangement shown in FIG. 2A and FIG. 2B is specific to outputting 2D and 3D content to a stereo display. Not all embodiments necessarily are limited in such fashion, and further examples are presented subsequently herein addressing other arrangements, such as selective output of 2D and/or 3D content to either or both of mono and stereo displays.

In FIG. 2A, a mono controller is established 202A, e.g. by instantiation of executable instructions onto a processor. Mono controllers have been described previously herein with regard to FIG. 1. It is noted that the mono controller and establishment 202A thereof in FIG. 2A may in itself enable only mono output, as described herein with regard to FIG. 1. However, as described herein for various embodiments resources of the mono controller may be repurposed, and/or additional resources provided, so as to enable stereo output (even though the mono controller in itself may be incapable of and/or provide no consideration for stereo output).

Embodiments are not limited with regard to what mono controller(s) is established 202A, what processor (if any) the mono controller is established 202A on, how the mono controller is established 202A, etc.

A stereo controller is established 202BC, in communication with the mono controller. A stereo controller may be substantially any entity adapted to perform the steps also shown in FIG. 2A and FIG. 2B and ascribed thereto. Broadly speaking, a stereo controller oversees the delivery of stereo content (e.g. stereo 3D imagery) to a viewer via a display suitable for such stereo content. A stereo controller may be and/or may include executable instructions instantiated on a processor, for example an application instantiated onto a processor in a mobile device such as a smart phone, tablet, head mounted display, etc., and in communication with a mobile operating system thereof. As another example, stereo controllers also may include an application loaded onto a processor of a desktop or laptop computer and in communication with the operating system thereof, etc. Other arrangements also may be suitable.

For certain embodiments, it may be useful to consider the stereo controller as an "add on" entity, such as a computer application made up in whole or in part of executable instructions, those executable instructions being adapted to interface with executable instructions in the mono controller. In such instances the stereo controller may communicate data with the mono controller, and/or to communicate instructions with the mono controller. As a more concrete example, the stereo controller may be adapted to call on functions within the mono controller as may already exist therein, for example instructing the mono controller to establish surface buffers, to render surfaces, etc. In some sense, certain embodiments may be considered to "spoof" the mono controller, e.g. the stereo controller may command the mono controller to establish a surface buffer, in similar fashion to the mono controller establishing a surface buffer as a step in delivering mono output (e.g. as in step 116 in FIG. 1). Thus, the stereo controller may invoke and/or replicate certain existing functions of the mono controller, but may do so at least potentially to carry out functions other than and/or beyond the capabilities of the mono controller alone.

More regarding such "spoofing", replication, invocation, etc. is described subsequently herein.

Typically, though not necessarily, the stereo controller may be established 202BC onto the same processor as a mono controller, both being instantiated on that processor and being in communication therethrough. However, other arrangements, including but not limited to establishing 202BC the stereo controller onto a different processor, that different processor being in communication with the mono controller, may be equally suitable.

Still with reference to FIG. 2A, a stereo display is disposed 204BC in communication with the stereo controller. A stereo display may be any system adapted to deliver content in a two-perspective stereo configuration (e.g. as stereo image pairs), so as to facilitate the appearance of three dimensionality to content displayed therefrom. For example, a near-eye head mounted display, having left and right screens configured to be disposed proximate to and in front of the left and right eyes respectively of a viewer, may be suitable for use as a stereo display. However this is an example only, and other arrangements may be equally suitable.

For a stereo controller that includes executable instructions instantiated onto a processor, for example, disposing 204BC a stereo display in communication with the stereo controller may represent physically connecting a stereo display to the processor, configuring communication protocols so that the stereo controller may address the stereo display, etc. However, embodiments are not limited with regard to either how the stereo controller is disposed in communication with the stereo display, nor with regard to the nature(s) of either the stereo controller or the stereo display.

It is noted that the mono controller is not necessarily required to be in direct communication with the stereo display. Logically, if a stereo display is in communication with the stereo controller, and the stereo controller is in communication with the mono controller, then in some sense the mono controller is indeed in communication with the stereo display. However, direct communication between the mono controller and the stereo display is not required (though such also is not prohibited). Thus is may not be necessary, for example, to either select or adapt the mono controller so as to be capable of communicating with the stereo display, nor conversely to select or adapt a stereo display suitable for communication with the mono controller.

Continuing in FIG. 2A, at least one graphical content source is disposed 206 in communication with the mono controller. Graphical content sources have been previously described herein with regard to mono output, however some additional comments with regard to stereo output may be illuminating. Notably, a graphical content source may be defined logically, rather than for example physically. For example, a data store may be considered collectively as being a single graphical content source, it may also be suitable to consider each file therein as a distinct graphical content source. Furthermore, for files that may include both 2D and 3D information therein, it may be suitable to consider individual 2D and/or 3D elements in a given file as being distinct graphical content sources. As noted, in the arrangement shown in FIG. 2A and FIG. 2B all graphical content addressed therein is considered to be 3D content, but this is an example only and other arrangements may be equally suitable.

It is also noted that in step 206 the graphical content sources are disposed in communication with the mono controller, not necessarily with the stereo controller. Although graphical content sources may be disposed in direct communication with the stereo controller, this is not required. Again, logically if a graphical content source is in communication with the mono controller, and the stereo controller is in communication with the mono controller, then in some sense the graphical content source is also in communication with the stereo controller. However, direct communication between the graphical content sources and the stereo controller is not required (though such also is not prohibited). Thus the stereo controller may not necessarily require or have any capability for directly communicating with graphical content sources.

For example, the stereo controller may not have, and may not be required to have, suitable drivers, protocols, libraries, etc., appropriate for the graphical content source(s). In certain embodiments, the mono controller may already incorporate some or all such features, such that the stereo controller may access relevant information from the mono controller. Thus, capabilities of the mono controller for communicating with graphical content sources may be utilized, without necessarily duplicating such features within the stereo controller.

Moving on in FIG. 2A, a stereo configuration 210 is established with the stereo controller. Stereo configuration refers to visual properties of the stereo display, and/or the output therefrom. For example, a given stereo display may at least potentially accommodate a range of relative sizes and fields of view of the left and right displays with regard to one another within a stereo display, degrees of overlap between left and right displays, relative brightnesses of the left and/or right displays and/or portions thereof, etc. In principle mono displays may be described as also having a "configuration", e.g. in terms of features such as screen extent, screen resolution, etc. However step 210 is noted herein e.g. because the number of parameters for a stereo display may be notably large, and variations thereof potentially of considerable significance in output. For example, a stereo display typically exhibits a separation distance between left and right screens facilitating stereo vision, while a mono display typically exhibits no such feature.

Continuing in FIG. 2A, a left perspective is established 214B is established with the stereo controller, and a right perspective 214C also is established with the stereo controller. The arrangement of steps in FIG. 2A (and subsequently in FIG. 2B) is shown as two parallel tracks by way of explanation, i.e. two similar sets of steps are carried out with regard to left and right stereo views. However, this is an illustrative arrangement only, and it is not required that steps be performed computationally in parallel, or that steps and/or the arrangement thereof are limited unless otherwise stated.

With regard to establishing 214B a left perspective, the left perspective represents a view of three dimensional content with regard to distance, direction, orientation, etc., as may make up one of a stereo pair of views (e.g. left and right). For example, a left perspective may be offset some distance to the left from a nominal "centerline view", although other arrangements may be suitable.

Similarly with regard to establishing 214C a right perspective, the right perspective represents a view of three dimensional content with regard to distance, direction, orientation, etc., as may make up another of a stereo pair of views. For example, a right perspective may be offset some distance to the right from a nominal "centerline view", although again other arrangements may be suitable.

The particulars of left and right perspectives may vary, for example different embodiments may exhibit different effective distances between the left and right perspectives, thus representing different stereo baselines. Embodiments are not limited as to the particulars of left and right perspectives, or how those perspectives are established. Indeed, although left and right perspectives are presented as examples, it is not necessary for all embodiments to define stereo pairs in terms of right and left, and other arrangements may be suitable.

As noted previously, the method shown in FIG. 2A through FIG. 2C may in certain embodiments behave at least somewhat as an "add on" for a mono controller, and/or as a repurposing of certain functions of a mono controller. However as may be seen, FIG. 2A through FIG. 2C do not illustrate therein direct analogs of certain steps in FIG. 1. For example, no step directly analogous to step 114 (establishing a mono perspective) is so illustrated.

This should not be taken to indicate that steps performed by and/or in the mono controller are necessarily prevented or excluded by the stereo controller, unless otherwise specified. Steps not explicitly shown in FIG. 2A through FIG. 2C may nevertheless be executed, including but not limited to direct analogs of steps in FIG. 1. For instance, a step of establishing a mono perspective is not required for the example method shown in FIG. 2A through FIG. 2C, which addresses stereo output only; a mono perspective thus is of little or no relevance. However, the mono controller established in step 202A of FIG. 2A may still establish a mono perspective, even though such a step is not shown in FIG. 2A through FIG. 2C.

Figure 2C:
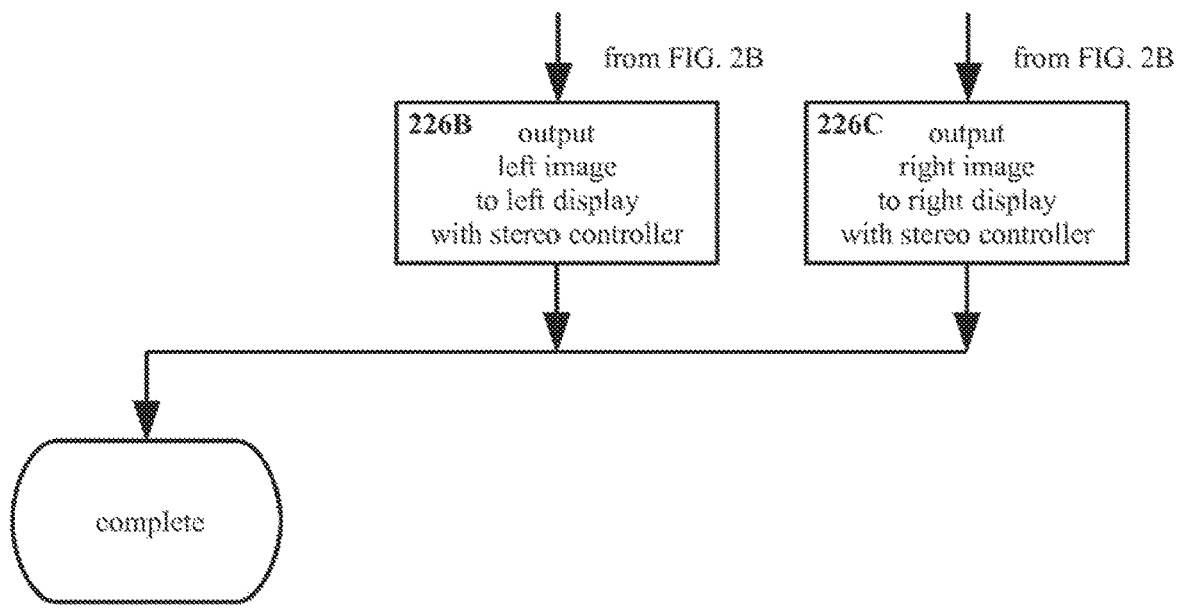

In general, the execution of steps shown in FIG. 2A through FIG. 2C to generate stereo output does not necessarily preclude the execution of steps not shown in FIG. 2A through FIG. 2C. In particular, mono output also may be generated (and indeed the generation of both mono and stereo output is addressed in more detail subsequently herein), and/or other functions also may be carried out. Thus, for example, enabling stereo output does not necessarily replace or prevent enabling mono output, rather enabling stereo output may supplement enabling mono output.

Now with reference to FIG. 2B, a left surface buffer is invoked 216B to be established with the stereo controller. A left surface buffer is a defined "space" wherein graphical surfaces may be stored, manipulated, etc., at least somewhat similar in concept to the mono surface buffer described with regard to step 116 in FIG. 1. Typically though not necessarily, the left surface buffer is compatible with the mono controller, for example having similar size, format, memory configuration, etc. to a mono surface buffer as may be produced by the mono controller, at least insofar as the left surface buffer would be adapted to accept surfaces as rendered by the mono controller.

With regard to the term "invoke", it is again noted that the stereo controller may or may not itself perform the task of establishing the left surface buffer the left surfaces for 2D content (various embodiments may enable either or both options). Rather, the stereo controller may command and/or otherwise cause the mono controller to establish a surface buffer to be utilized as the left surface buffer. As noted with regard to FIG. 1, a mono controller may already include suitable capabilities for establishing surface buffers. While similar capabilities may be present within the stereo controller, it may be suitable to rely on already-existing capabilities within the mono controller, rather than duplicating functions.

Similarly, with regard to other uses herein of "invoke", it should be understood that the term indicates that some entity may cause an action to be taken, regardless of whether that entity or some other entity directly carries out that action. With regard to the preceding step, the stereo controller invokes 216B a left surface buffer to be established, but the stereo controller may or may not directly establish the left surface buffer in itself, e.g. possibly calling the mono controller to establish a suitable surface buffer instead. With regard to steps subsequently described herein, likewise image buffers may be invoked, rendering may be invoked, etc.

Still with reference to FIG. 2B, a right surface buffer similarly is invoked 216C to be established with the stereo controller. The right surface buffer is again a defined "space" wherein graphical surfaces may be stored, manipulated, etc., again at least somewhat similar in concept to the mono surface buffer described with regard to step 116 in FIG. 1. Typically though not necessarily, the right surface buffer also is compatible with the mono controller, for example having similar size, format, memory configuration, etc. to a mono surface buffer as may be produced by the mono controller, at least insofar as the right surface buffer would be adapted to accept surfaces as rendered by the mono controller.

However, despite potential similarities between the left and right surface buffers and the mono surface buffer previously described, it is noted that in FIG. 2B the left and right surface buffers are established by the stereo controller. Thus the stereo controller may designate addresses in memory for the left and right surface buffers, or similarly define the left and right surface buffers. Indeed, it is noted that a given mono controller may not have the capability to create and/or address left and right surface buffers, or even more than one surface buffer generally, since a single surface buffer may be sufficient for mono output (and mono controllers may not even consider the possibility of stereo output).

A left image buffer is invoked 218B to be established with the stereo controller. A left image buffer is a defined "space" wherein an image may be stored, manipulated, etc., at least somewhat similar in concept to the mono image buffer described with regard to step 118 in FIG. 1. Typically though not necessarily, the left image buffer is compatible with the mono controller, for example having similar size, format, memory configuration, etc. to a mono image buffer as may be produced by the mono controller, at least insofar as the left image buffer would be adapted to accept images as merged by the mono controller.

A right image buffer is invoked 218C to be established with the stereo controller. The right image buffer also is a defined "space" wherein an image may be stored, manipulated, etc., at least somewhat similar in concept to the mono image buffer described with regard to step 118 in FIG. 1. Typically though not necessarily, the right image buffer is compatible with the mono controller, for example having similar size, format, memory configuration, etc. to a mono surface buffer as may be produced by the mono controller, at least insofar as the right image buffer would be adapted to accept images as merged by the mono controller.

Again, despite potential similarities between the left and right image buffers and the mono image buffer previously described, it is noted that in FIG. 2B the left and right surface buffers are established by the stereo controller (and the mono controller may not even have the capability to establish left and right image buffers).

Still with reference to FIG. 2B, rendering is invoked 220B1 of left surfaces for each 2D graphical content source, in mono perspective, with the stereo controller.

In other words, the mono controller may already be capable of rendering surfaces from a mono perspective (and/or from other perspectives), and thus the stereo controller may cause the mono controller to render the left surfaces exhibiting 2D content from the mono perspective, rather than the stereo controller itself rendering such left surfaces internally. The command to render the relevant surfaces may come from the stereo controller, but the work of rendering may be performed by the mono controller.

Rendering is also invoked 220C1 of right surfaces for each 2D graphical content source, in mono perspective, with the stereo controller. Again with regard to the term "invoke", it is noted that the stereo controller may or may not itself perform the task of rendering 220C1 the right surfaces in mono perspective for those graphical content sources exhibiting 2D content. Rather, the stereo controller may command and/or otherwise cause the mono controller to render right surfaces from graphical content sources, directing those right surfaces into the right surface buffer.

Still with reference to FIG. 2B, rendering is invoked 220B2 of left surfaces for each 3D graphical content source, in left perspective, with the stereo controller. As noted previously the stereo controller may or may not itself perform the task of rendering 220B2 such left surfaces.

Rendering is also invoked 220C2 of right surfaces for each 3D graphical content source, in right perspective, with the stereo controller. Again the stereo controller may or may not itself perform the task of rendering 220C2 the right surfaces.

With regard collectively to steps 220B1, 220B2, 220C1, and 220C2, it is emphasized that rendering may be carried out differently based the dimensionality of a given graphical content source. That is, for 2D content rendering is carried out from a mono perspective when rendering to both left and right surface, while for 3D content rendering is carried out from a left (e.g. left stereo) perspective when rendering left surfaces, and is carried out from a right (e.g. right stereo) perspective when rendering right surfaces. Thus the perspectives of various renders/various surfaces may be different within the left image buffer and the right image buffer.

Continuing in FIG. 2B, compositing is invoked 222B of the left surfaces in the left surface buffer, with the stereo controller. Again, the stereo controller may not necessarily perform the task of compositing the left surfaces (though this is not prohibited), but may instead command and/or otherwise cause the mono controller to composite the left surfaces. As also noted with regard to FIG. 1, a mono controller may already include suitable capabilities for compositing surfaces. While similar capabilities may be present within the stereo controller, it may be suitable to rely on already-existing capabilities within the mono controller, rather than duplicating functions.

In other words, the mono controller may already be capable of compositing surfaces, and thus the stereo controller may cause the mono controller to composite the left surfaces, rather than the stereo controller itself compositing the left surfaces internally. The command to composite the surfaces may come from the stereo controller, but the work of compositing may be performed by the mono controller.

Compositing is also invoked 222C of the right surfaces in the right surface buffer, with the stereo controller. Again, the stereo controller may not necessarily perform the task of compositing the right surfaces (though this is not prohibited), but may instead command and/or otherwise cause the mono controller to composite the right surfaces.

Merging is invoked 224B of the left surfaces in the left surface buffer with the stereo controller, so as to yield a left image in the left image buffer. Again, the stereo controller may not necessarily perform the task of merging the left surfaces into a left image in the left image buffer (though this is not prohibited), but may instead command and/or otherwise cause the mono controller to merge the left surfaces. As noted with regard to FIG. 1, a mono controller may already include suitable capabilities for merging surfaces to yield an image. While similar capabilities may be present within the stereo controller, it may be suitable to rely on already-existing capabilities within the mono controller, rather than duplicating functions.

In other words, the mono controller may already be capable of merging surfaces to form an image, and thus the stereo controller may cause the mono controller to merge the left surfaces, rather than the stereo controller itself margining the left surfaces internally. The command to merge the surfaces may come from the stereo controller, but the work of merging may be performed by the mono controller.

Merging is also invoked 224C of the right surfaces in the right surface buffer with the stereo controller, so as to yield a right image in the right image buffer. Again, the stereo controller may not necessarily perform the task of merging the right surfaces into a right image in the right image buffer (though this is not prohibited), but may instead command and/or otherwise cause the mono controller to merge the right surfaces.

Moving on to FIG. 2C, the stereo controller then outputs 126B the left image to the left display of the stereo display, such that the left image is potentially visible thereon to the left eye of a viewer. The stereo controller also outputs 126C the right image to the right display of the stereo display, such that the right image is potentially visible thereon to the right eye of a viewer. With the stereo display adapted to display stereo image pairs (as noted above with regard to step 204BC) and a suitable stereo configuration established (as noted above with regard to step 210), the stereo display may output imagery such that a viewer thereof may perceive that imagery as appearing three dimensional.

Although FIG. 2C shows the method therein as being complete following steps 226B and 226C it is emphasized that the method in FIG. 2A through FIG. 2C is an example only. Other steps, other functions, etc. may be incorporated into the method, and/or other methods may be executed in combination with various embodiments, including but not limited to repetition of steps already shown, e.g. in an ongoing loop that continues so as to display a succession of left and right images to a stereo display.

Now with regard to FIG. 3 through FIG. 9, reference has been made herein to features and steps such as surfaces and the rendering, compositing, and merging thereof. Some additional description thereof may be useful, and FIG. 3 through FIG. 9 also present illustrations thereof. However, it is noted that this is presented for explanatory purposes, and that surfaces, etc. shown are not necessarily representative of any particular embodiment. For example, although surfaces are illustrated as being visible entities, surfaces may in at least some embodiments be non-visual, e.g. instead existing as digital data. Likewise, a buffer may be a defined group of memory addresses in a digital electronic processor, rather than a visible arrangement of visible surfaces. Thus, surfaces may not may not be visible within a buffer, the buffer itself may not be visible, etc.

Figure 3:
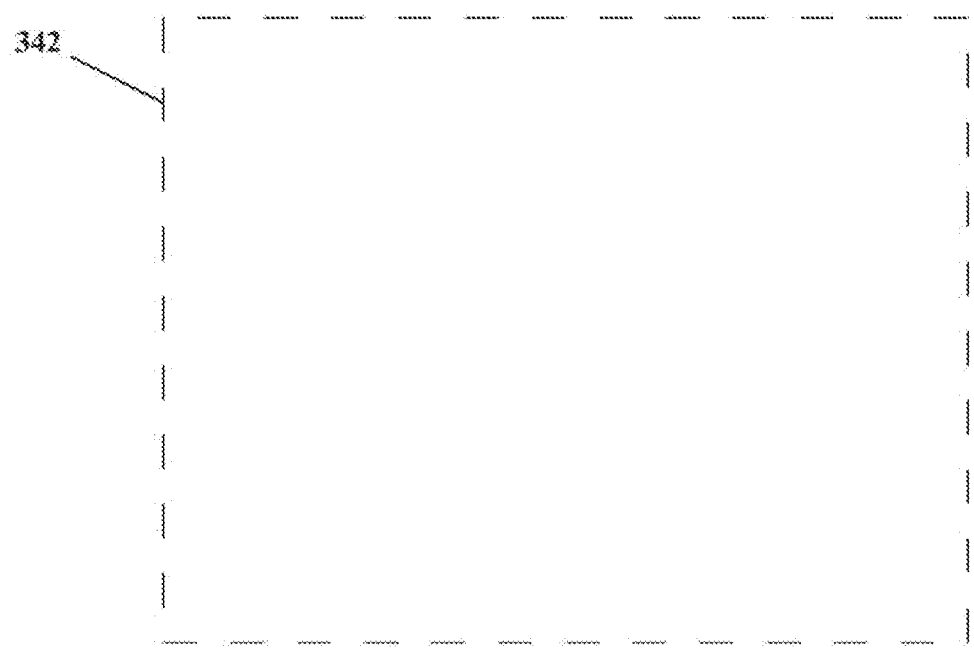
FIG. 3 shows an example conceptual illustration of a surface, in top-down view.

With reference now to FIG. 3, therein is shown a conceptual illustration of a surface 342. As shown, a surface 342 is a defined space, that space being adapted to receive therein a render of graphical content. A surface 342 may also be considered to be a "blank slate" upon which graphical content may be rendered. Typically though not necessarily, as the name suggests a surface 342 may be represented by a flat, two-dimensional plane or some portion thereof. The surface 342 shown in FIG. 3 is an empty or null surface, that is, no graphical content is rendered therein. Once graphical content is rendered to a surface, the rendered content therein also may in some sense be considered to "be" the surface (perhaps in the same sense as a sheet of paper may be considered to be the drawing thereupon), but for simplicity FIG. 3 shows only an empty surface 342.

Embodiments are not limited with regard to what graphical content may be rendered thereto. Suitable graphical content (and thus the render thereof) may include but is not limited to text, photographs, illustrations, icons, interactive controls, etc. A surface may have some, all, or none of the space thereof occupied by rendered content.

Embodiments also are not limited with regard to the configuration of surfaces. In FIG. 3, the surface 342 therein is illustrated as a rectangular space defined by a dashed outline. However, in practice a surface 342 is not necessarily rectangular, is not necessarily of a particular size or proportion, and is not necessarily bounded (visibly or otherwise); in principle a surface may be hexagonal, circular, of infinite extent (and thus in some sense having no defined shape), etc.

In certain instances herein, a surface 342 may be referred to as a "thing" in itself. However, it may also be valid to consider a surface 342 in as a container. That is, a surface 342 may be considered to be a graphical render in itself, or may be considered to contain a graphical render, being a defined space that may accept a graphical render therein. However, it should be understood that to at least some extent, such descriptions of surfaces (and certain other elements referred to herein) may be metaphorical. That is, since a surface 342 may be, and typically is, defined within digital memory, a surface 342 may not be either an actual physical space or an actual physical thing, but may rather be a memory address or group of memory addresses, etc.

In addition, although certain examples herein may reference the use of surfaces, the use of surfaces (and/or surface buffers, etc.) is an example only, and is not necessarily required for all embodiments. Surfaces may be conceptually useful, e.g. in understanding how graphical content may be handled. Surfaces also may be computationally useful, e.g. as a particular mechanism for handling graphical content. However, other arrangements may be equally suitable. For example, description and/or use of a render buffer, wherein renders may be disposed, composited, etc. as "naked" renders, i.e. not necessarily in or as surfaces but directly as renders, may be suitable for at least certain embodiments.

Figure 4:
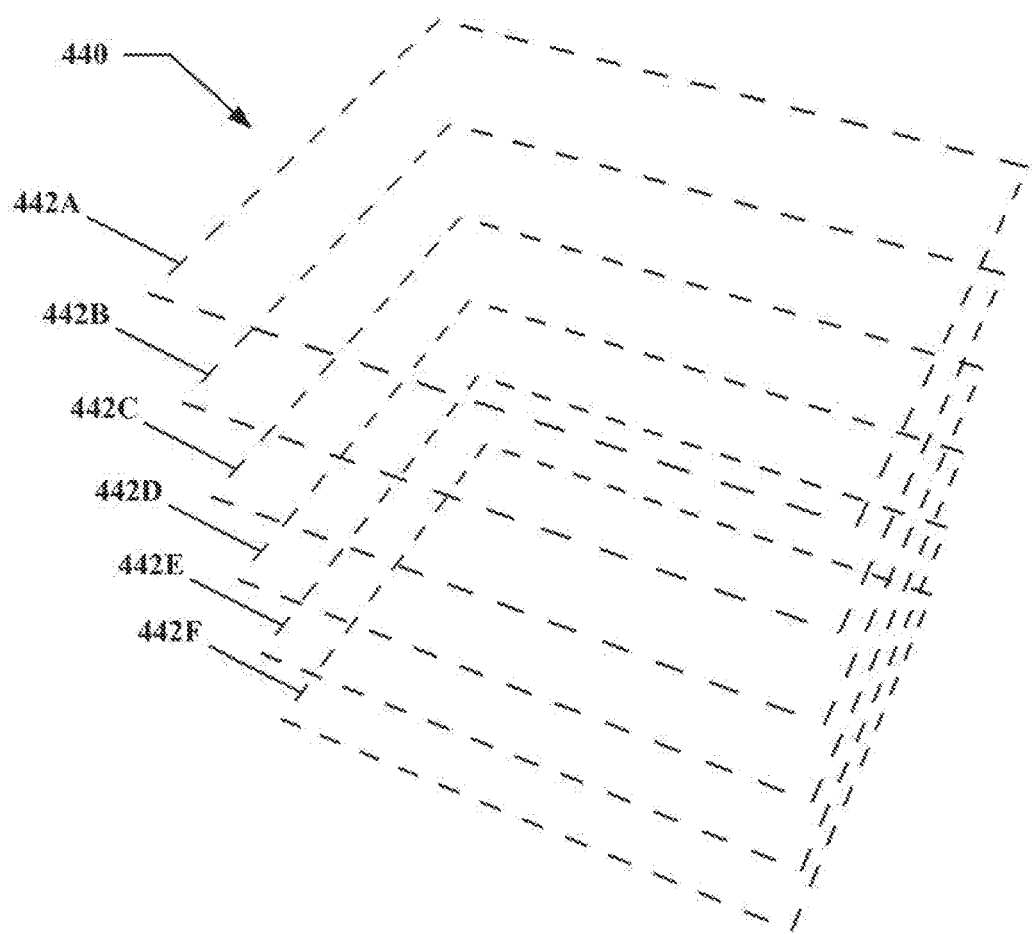
FIG. 4 shows an example conceptual illustration of a surface buffer, in perspective view.

Now with reference to FIG. 4, therein conceptual illustrations of several surfaces 442A through 442F are shown. As may be seen, the surfaces 442A through 442F are shown to be grouped together in a stack configuration, though this is an example only, and other arrangements may be equally suitable. With regard to the stack configuration of buffer 440 as shown, it is noted that for certain embodiments there may be no literal geometric configuration, for example if the buffer 440 and surfaces 442A through 442F are in the form of digital data there may be no geometry associated therewith.

Collectively, the surfaces 442A through 442F form a surface buffer 440. In the example of FIG. 4, the surfaces 442A through 442F are all empty, though this is for illustration only.

Embodiments are not limited with regard to the number of surfaces that may be in a surface buffer 440. As shown in FIG. 4, the surface buffer 440 is shown having six surfaces 442A through 442F, but this is an example only. Indeed, a surface buffer 440 may not have any surfaces therein; a surface buffer 440 may for example be merely a defined set of memory addresses, with surfaces being disposed therein. Alternately, each surface maybe considered to be disposed within its own buffer, or other arrangements may be equally suitable.

In addition, although the arrangement in FIG. 4 shows a surface buffer 440 wherein all of the surfaces 442A through 442F therein are of equal size, this too is an example only, and other arrangements may be equally suitable.

Furthermore, although FIG. 4 shows the surfaces 442A through 442F therein arranged in a vertical stack formation, this is illustrative only. Although it may be useful to consider surfaces 442A through 442F as being stacked in such fashion (e.g. when envisioning compositing of surfaces, described subsequently herein), embodiments are not limited to such arrangements. Indeed, for embodiments wherein the surface buffer 440 is a logical construct, e.g. a defined group of memory addresses, it may not even be possible to geometrically arrange surfaces 442A through 442F therein at all (nor is such required).

Figure 5:
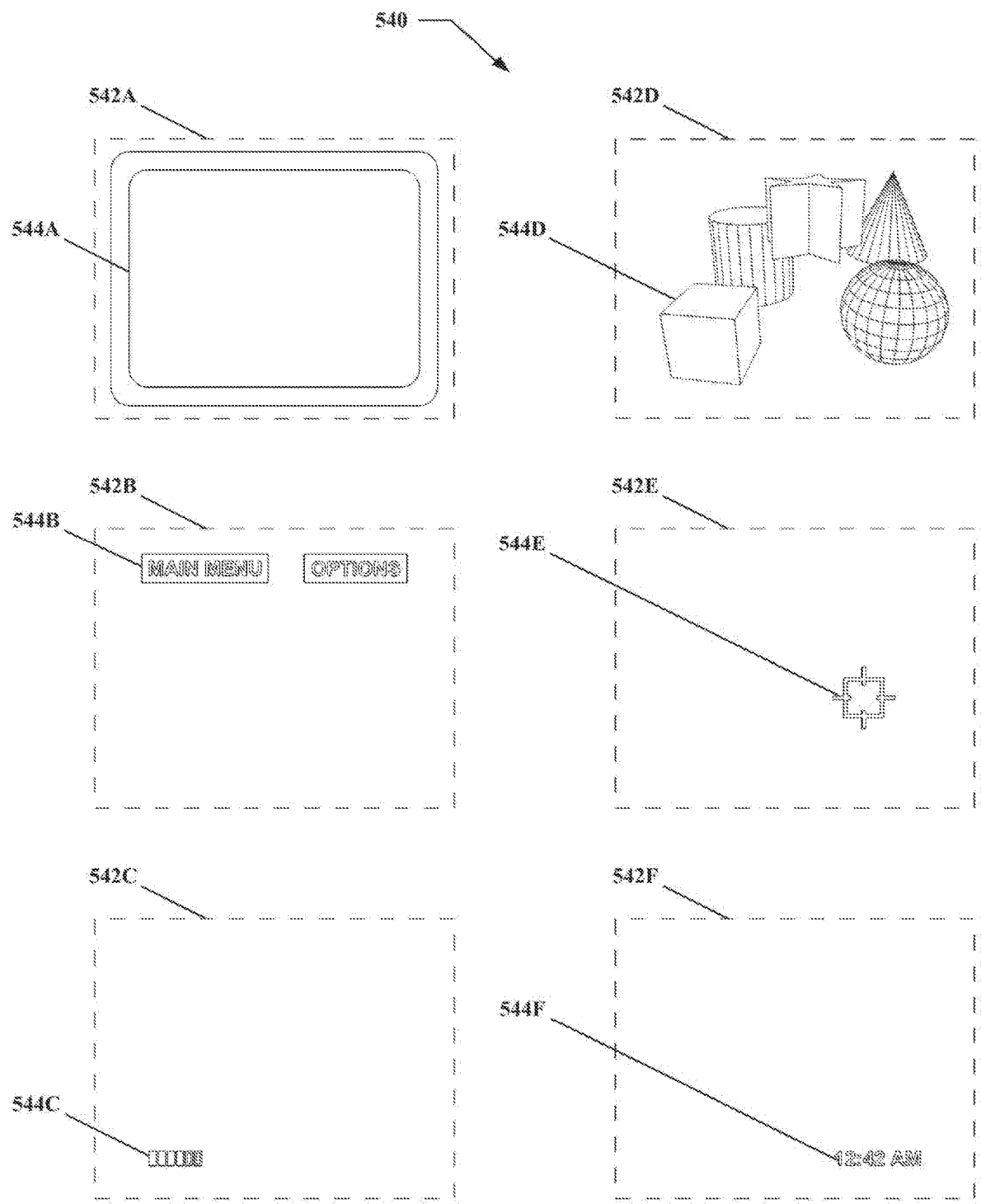
FIG. 5 shows an example conceptual illustration of a group of surfaces in a surface buffer with renders disposed therein, in top-down view.

Now with reference to FIG. 5, therein is shown the contents of a surface buffer 540, namely six surfaces 542A through 542F with renders 544A through 544F disposed therein. In particular, renders 544A through 544F are illustrated as a frame 544A, a menu bar 544B, a battery indicator 544C, a view of 3D objects 544D, a crosshair 544E, and a time indicator 544F, respectively. The renders 544A through 544F are illustrated herein to represent graphical features as may be outputted by a mobile device such as a tablet or smart phone, however the particular renders 544A through 544F shown in FIG. 5 are examples only. Embodiments are not limited only to those renders 544A through 544F shown in FIG. 5, nor to similar renders, nor necessarily even to renders suitable for a mobile device.

As may be seen in FIG. 5, each render 544A through 544F is disposed on a respective surface 542A through 542F. However, it may be reasonable to consider the renders 544A through 544F to in fact be the surfaces 542A through 542F (for example as a piece of paper with a drawing thereon may be considered to be the drawing), or to at least treat renders 544A through 544F as similar or equivalent to surfaces 542A through 542F. Further, for certain embodiments, there may not be such a thing as an empty surface (such as surfaces 442A through 442F shown in FIG. 4), or even an empty buffer (such as buffer 440 also shown in FIG. 4).

Thus, in certain embodiments renders 544A through 544F may be distinct from surfaces 542A through 542F, while in other embodiments it may be equally suitable to consider renders 544A through 544F as being surfaces 542A through 542F. Other arrangements also may be equally suitable.

However, for purposes of clarity renders 544A through 544F are referred to in at least certain instances herein as being distinct unto themselves, and being disposed on surfaces 542A through 542F, rather than necessarily being the surfaces 542A through 542F.

The ordering of surfaces renders 544A through 544F may be organized, may be arbitrary, may be random, etc., and embodiments are not limited with regard thereto. That is, it is not necessarily required that a frame should be part of render 544A, or that a render of a frame 544A should come before or take precedence over a render of a view of 3D objects 544D, etc. Typically, though not necessarily, the ordering (if any) of renders and/or surfaces may be a matter of expedience, for example the first render in a group of renders may simply be the first render to arrive in the buffer.

Figure 6:
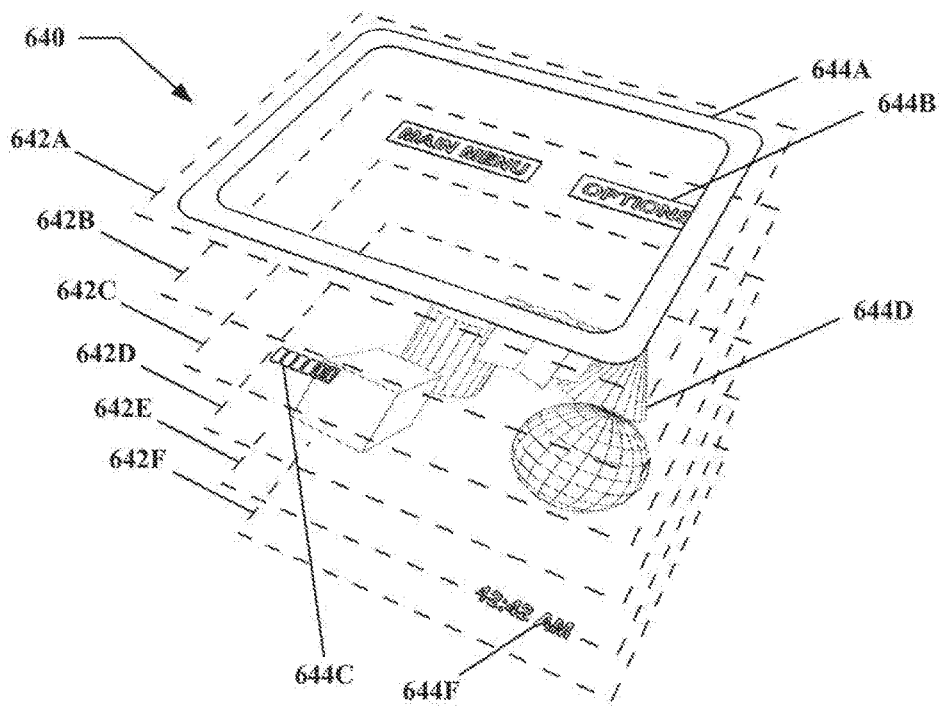
FIG. 6 shows another example conceptual illustration of a group of surfaces in a surface buffer with renders disposed therein, in perspective view.

Now with reference to FIG. 6, therein is shown a conceptual illustration of a buffer 640, including several surfaces 642A through 642F therein, with renders 644A through 644F respectively disposed thereon. It is pointed out that the surfaces 642A through 642F therein and renders 644A through 644F thereon are arranged consecutively from top to bottom, A through F. (More description regarding arrangement of surfaces/renders is presented with regard to FIG. 7, below.) As may be seen, the renders 644A through 644F are shown as resembling renders 544A through 544F from FIG. 5, including a frame 644A, a menu bar 644B, a battery indicator 644C, a view of 3D objects 644D, and a time indicator 644F, respectively. In addition, although the surface 642E may be considered to include thereon a crosshair similar to the crosshair 544E in surface 542E in FIG. 5, no crosshair is visible in FIG. 6 due to occlusion.

Given the arrangement in FIG. 6, the crosshair is occluded by the view of 3D objects 644D, and so is not visible from the perspective in FIG. 6. Given the arrangement of FIG. 6, the crosshair is below the view of 3D objects 644D in the stack representing the buffer 640, and so given the perspective of FIG. 6 the crosshair is not visible. For the arrangement shown in FIG. 6, it may be understood that the view of 3D objects 644D may be opaque, and may include therein blank space, such that the crosshair may be occluded thereby. By contrast, the central window of the frame 644A is not opaque, with the menu bar 644B being visible therethrough. It is permissible for certain surfaces and/or renders thereon to be fully opaque, partly opaque, fully transparent, etc., over some or all of an area thereof. In certain embodiments such opacity (or transparency) may attach to an individual surface and/or render, e.g. a similar view of 3D objects such as in 644D may always be fully opaque over an entire area thereof. However, in other embodiments, opacity and/or other features may be uniform throughout a buffer, such that all surfaces and/or renders exhibit the same degree of opacity. In yet other embodiments, opacity and/or other features may be controlled individually, e.g. as part of compo siting of a buffer.

Figure 7:
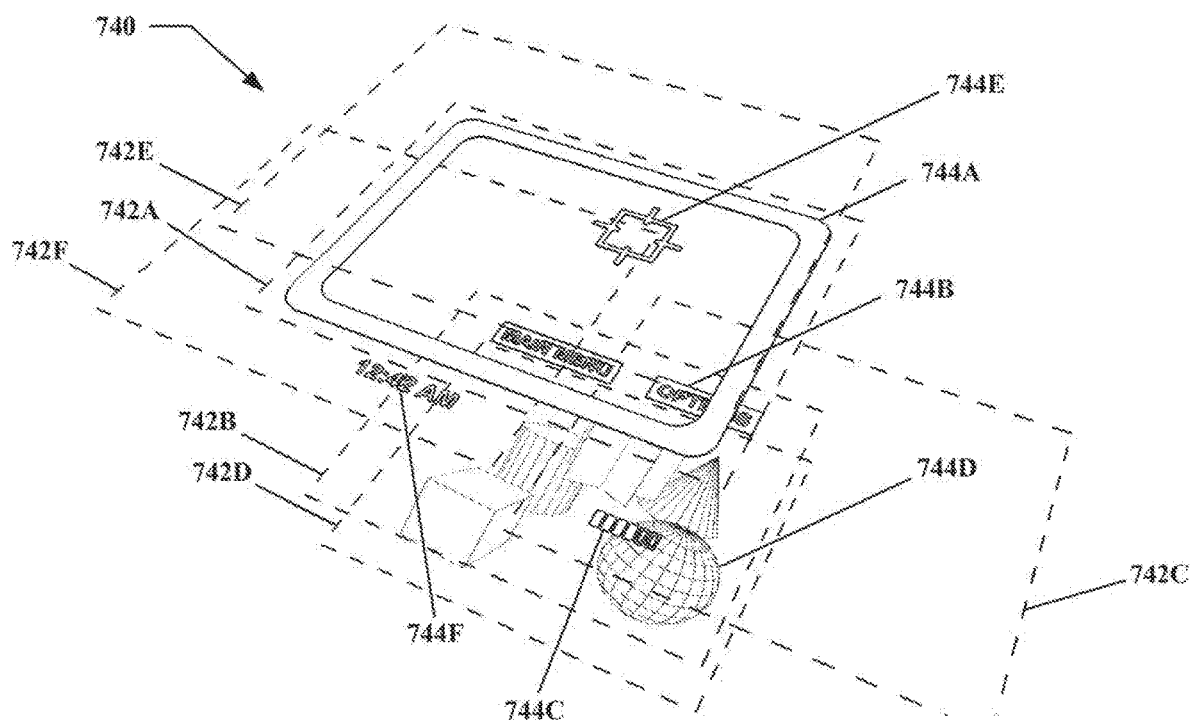
FIG. 7 shows an example conceptual illustration of a group of surfaces in a surface buffer with renders disposed therein, having been composited, in perspective view.

Now with reference to FIG. 7, therein is shown another conceptual illustration of a surface buffer 740, including several surfaces 742A through 742F therein, with renders 744A through 744F respectively disposed thereon, the renders again including a frame 744A, a menu bar 744B, a battery indicator 744C, a view of 3D objects 744D, a crosshair 744E, and a time indicator 744F, respectively. However, although the arrangement in FIG. 7 may bear at least some resembling to the arrangement in FIG. 6, in particular with regard to what features are present, as may be seen the configuration of those features is different in FIG. 7 than in FIG. 6.

Notably, the ordering of the surfaces 742A through 742F with renders 744A through 744F thereon is different than in FIG. 7. In particular, in FIG. 6 surfaces are ordered (top to bottom) as 642A, 642B, 642C, 642D, 642E, and 642F, while in FIG. 7 surfaces are ordered 742E, 742A, 742F, 742C, 742B, and 742D (with renders arranged similarly in both instances). The change in ordering of surfaces 742A through 742F within the surface buffer 740 as shown in FIG. 7 compared with FIG. 6 represents a compositing of the surfaces 742A through 742F.

As used herein, compositing refers to the arrangement of surfaces with respect to one another and/or with respect to some external standard. FIG. 7 illustrates a simple case, wherein individual surfaces are "re-shuffled" to present a different top-to-bottom order.

For example, wherein in FIG. 6 the surface 642E (with a crosshair as may be presumed present, but not visible due to occlusion) is second from the bottom of the stack representing the buffer 640, in FIG. 7 the corresponding surface 742E with the crosshair 744E thereon is now uppermost in the stack representing the buffer 640. That is, in the arrangement shown in FIG. 7 the crosshair 744E may be in some sense "on top" of the other renders. Thus, the crosshair 744E (if opaque) may itself occlude some portion of (for example) the a view of 3D objects 744D, as viewed from above (wherein in FIG. 6 the view of 3D objects 644D occluded the presumed crosshair). However, while the arrangement in FIG. 7 is presented as a geometric stack, this is an example only. A similar effect might be achieved in other embodiments by assigning some "virtual depth" or "occlusion order" feature to various surfaces and/or renders thereon, so as to produce occlusion without necessarily arranging surfaces and/or renders in such a stack.

In addition, as may be seen in FIG. 7 the surface 744C with battery indicator render 744C thereon is displaced to the right relative to surfaces 742A, 742B, 743D, and 742E. In addition, surface 742F with the time indicator render 744F thereon is displaced to the left relative to surfaces 742A, 742B, 743D, and 742E. Thus, considering the arrangement of the renders 744A through 744F, the battery indicator 744C may be considered to have shifted to the left with regard to the frame 744A, etc., while the time indicator 744F may be considered to have shifted to the right with regard to the frame 744A, etc. In more colloquial terms, by rearranging surfaces during composition the apparent positions of time and battery indicators have been reversed.

As may be seen, compositing of surfaces 742A through 742F may include reordering of the surfaces 742A through 742F with respect to one another, and lateral motions of one or more surfaces 742A through 742F within their plane relative to other surfaces 742A through 742F.

However, it should also be understood that compositing may include other features. For example, some or all surfaces 742A through 742F may be moved other than as shown, for example being rotated. Additionally, some or all surfaces 742A through 742F might be shifted to align with some marker or standard other than the rest of the surfaces 742A through 742F, e.g. shifting every surface 742A through 742F so that the right edge thereof (or the right edge of the render 744A through 744F therein) aligns with a guide line. Surfaces may also be scaled, changed in color, etc. Surfaces also may be disregarded, for example if a surface includes content that is only to be displayed under certain circumstances (e.g. a pull down menu that has been pulled down), or surfaces may be deleted from a buffer altogether.

As an illustration of compositing, consider as a metaphor that individual surfaces may be represented by sheets of transparent acetate, renders by images applied to those sheets (e.g. drawn with pens, printed, etc.), and a buffer by the collection of such sheets. Given such an arrangement, in at least certain embodiments compositing may be considered similar to reordering the sheets, moving some upward, some downward, etc., and to repositioning the sheets vertically and/or horizontally so as to align the images thereon as desired. Similarly, surfaces within a buffer may be reordered and/or rearranged, repositioned with regard to one another and/or some external standard, etc.

Such an arrangement may thus begin with the configuration of surfaces 642A through 642F shown in FIG. 6, and produce the configuration of surfaces 742A through 742F shown in FIG. 7 by re-ordering the acetate sheets; that re-ordering of sheets may be at least somewhat analogous to compositing.

However, it is emphasized that such description is an example only, and other arrangements may be suitable. For example, compositing may include operations that are difficult and/or impossible with such a stack of plastic sheets, such as changes to resolution, rotation or mirror-reversal, alteration of coloring, modification of opacity/transparency, upward or downward scaling, changes to certain portions of a surface and/or render while leaving other portions unchanged, etc.

Nevertheless, for at least certain embodiments it may be useful (if perhaps not perfectly precise) to consider compositing of surfaces and/or renders thereon as being similar to rearranging those surfaces and/or renders, in a manner similar to rearranging printed sheets of transparent acetate.

As was noted previously, the opacity/transparency of surfaces and/or renders thereon may be controlled. Such control may take place in various manners and at various levels, and embodiments are not limited with regard thereto. For example, certain renders may be always opaque or always transparent, or may have their opacity/transparency set and/or permanently fixed at creation. Similarly, certain surfaces may be always opaque or always transparent, or may have their opacity/transparency set and/or permanently fixed at creation. Thus opacity/transparency may be controlled at a render and/or a surface level. However, opacity may be controlled in addition or instead for the buffer as a whole, e.g. as part of compositing.

In addition, it is noted that a surface and/or render is not necessarily required to be uniformly transparent. The surface 742A in FIG. 7 and/or the render of a frame 744A thereon may be fully opaque for the frame 744A itself, but fully transparent for the window therein. This may be controlled for example by assigning a color value as being transparent (e.g. black, with shades of gray being partially transparent), by utilizing a channel specific to transparency, or by other approaches.

Opacity may be of particular note, for example insofar as (when considering the stack as a whole) opacity may influence what is and is not occluded, and thus what may or may not be visible. As a more concrete example, if the view of 3D objects 744D in FIG. 7 is opaque, and the crosshair 744E is underneath the a view of 3D objects 744D, then the crosshair 744E may be partly or completely occluded by a view of 3D objects 744D, such that the crosshair 744E is not visible or is only partly visible. Typically, though not necessarily, blank space within a surface may default to full transparency, so that (for example) a frame 744A does not occlude the central window thereof, etc. However, this is an example only, and other arrangements may be equally suitable.

In addition, although control of opacity is described herein in some detail, the foregoing may apply equally to other properties, e.g. resolution may be controlled in various manners and levels, etc. Embodiments are not limited in this regard.

Figure 8:
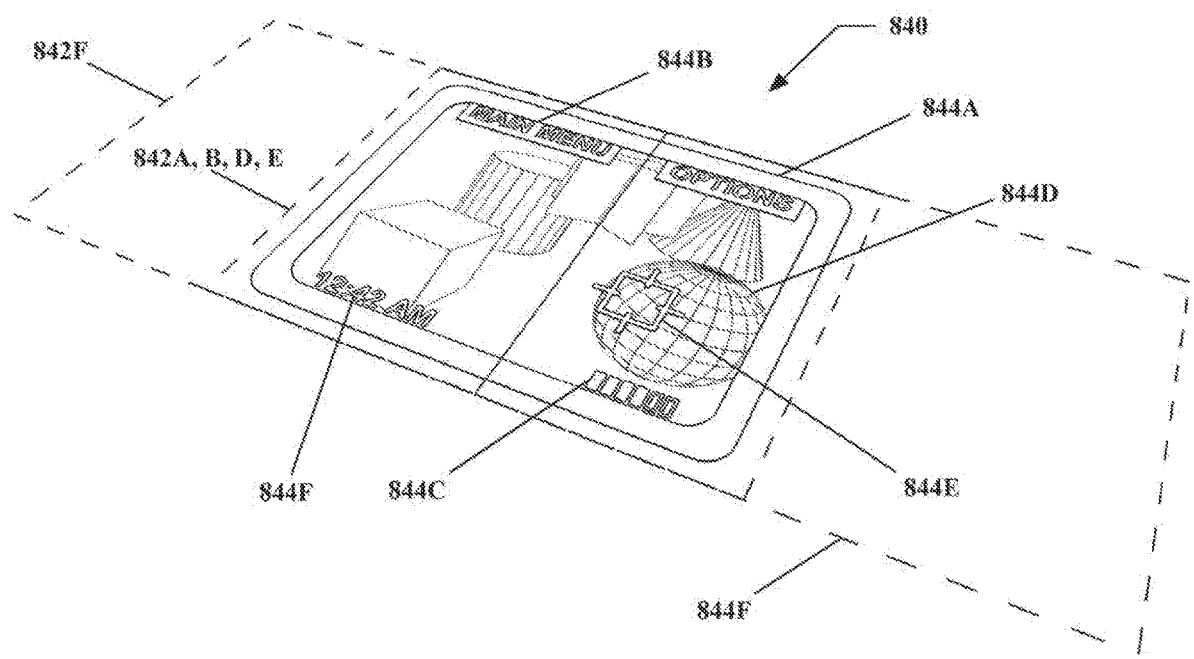
FIG. 8 shows an example conceptual illustration of a group of surfaces in a surface buffer with renders disposed therein, having been composited and spatially collapsed, in perspective view.

Now with reference to FIG. 8, therein is shown another conceptual illustration of a surface buffer 840. The surface buffer includes surfaces 842A through 842F with renders 844A through 844F respectively disposed thereon, the renders again including a frame 844A, a menu bar 844B, a battery indicator 844C, a view of 3D objects 844D, a crosshair 844E, and a time indicator 844F, respectively. However, as may be seen the buffer 840 is not illustrated as a stack, with separation between surfaces 842A through 842F but rather is shown collapsed. Thus the surfaces 842A through 842F shown therein are not visually distinguishable, although the renders 844A through 844F nonetheless may each be seen.

As may be seen, certain of the renders 844A through 844F occlude others of the renders 844A through 844F, for example part of the menu 844B is occluded by the frame 844A, and part of the view of 3D objects 844D is occluded by the crosshair 844E. As has been noted, factors other than being geometrically "on top" may be considered when determining occlusion and other features, for example a logical value (e.g. surfaces with a lower number are to occlude surfaces with a higher number).

However, although the surfaces 842A through 842F in FIG. 8 are collapsed, and may not be visually separable, nevertheless the surfaces 842A through 842F remain distinct. The surfaces 842A through 842F are separate entities from one another, being many entities rather than one. For example, as may be seen surface 842C is displaced right with regard to surfaces 842A, 842B, 842D, and 842E, and surface 842F is displaced left with regard to surfaces 842A, 842B, 842D, and 842E. The surfaces to surfaces 842A through 842F could be further composited, e.g. displaced, reordered, etc. in the arrangement as shown in FIG. 8.

Figure 9:
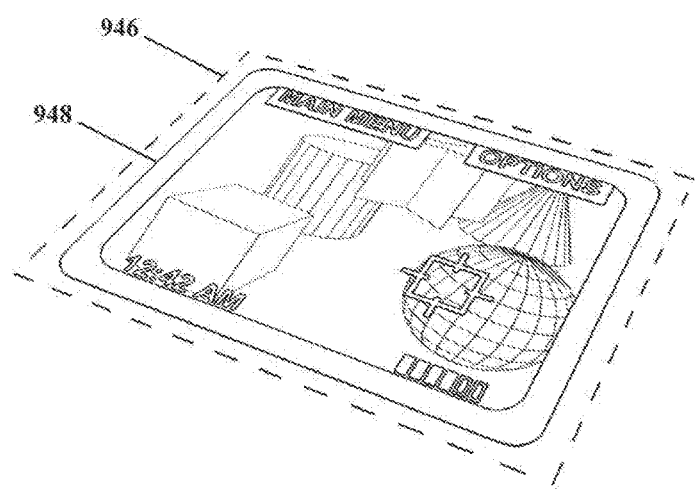
FIG. 9 shows an example conceptual illustration of a merged image in an image buffer, in perspective view.

Turning to FIG. 9, therein an arrangement at least somewhat similar visually to that of FIG. 8 is shown. An image buffer 946 is visible, represented by a dashed outline (though in practice such an outline may not necessarily be present), and a merged image 948 is shown thereon. The relation between the image buffer 946 and the merged image 948 in FIG. 9 may be conceptually similar to that between the surface buffer 840 and the surfaces 842A through 842F in FIG. 8, in that the image buffer 946 is a defined "place" that may accept a merged image 948 therein. However, the particular configuration of the image buffer 946 in FIG. 9 may be different from that of the surface buffer 840 in FIG. 8, e.g. so as to be suited to accommodate an image rather than a group of surfaces.

The arrangement in FIG. 9 also may be visually similar to that in FIG. 8 in that similar graphical features are visible in FIG. 9, e.g. a frame, a menu bar, etc. However, in FIG. 8 these visible features are in individual renders disposed in individual surfaces; by contrast, in FIG. 9 these visible features are not distinct entities, but rather have been combined to form a single merged image 948. As may be seen in FIG. 9, no individual surfaces analogous to those in FIG. 8 (e.g. displaced surfaces 844C and 844F) are present. The arrangement in FIG. 9 is no longer a group of surfaces, but a merged image 948. Thus, further compositing (at least as described previously with regard to the examples in FIG. 7 and FIG. 8 above) may not be possible with the arrangement in FIG. 9; surfaces may not be reordered, etc., because there are no surfaces present in FIG. 9.

The process of merging may be considered to be the combination of multiple surfaces to form one image 948. Information may be lost in merging; where an occluded feature in a surface may still be present, in a merged image 948 any feature that was occluded by some overlying feature no longer exists within the image 948; for example, the part of the sphere that is occluded by the crosshair not only cannot be seen, but is not part of the merged image 948 at all.

Merging may in some sense be considered analogous to the "flattening" operation in certain graphical editing programs. Where such programs may have different features in various layers, e.g. a base image in one layer, added text in another layer, an artificial lighting effect in another layer, a green-screen substitution in yet another layer, etc., flattening reduces all such layers into a single image such as a bitmap (bmp) format image, joint photographics group (jpg) format image, a portable graphics network (png) format image, etc. Similarly, merging the surfaces shown in FIG. 8 may yield a single merged image 948 as shown in FIG. 9.

As noted, merging may result in the loss of data. A merged image also may be more difficult to edit than a stack of surfaces, since individual surfaces may no longer be shifted, moved up or down relative to other surfaces, etc. However, a merged image 948 may exhibit certain advantages as well. For example, a merged image typically may represent a smaller total amount of data than a stack of surfaces, and/or may have a simpler configuration (e.g. a single bitmap rather than multiple surfaces that may include vector graphics, images of various resolution and bit depths, etc.). Also, a merged image may be more expedient for output through a display; certain displays may be specifically adapted to output images, and may either have difficulty with outputting multiple surfaces as surfaces or be incapable of such output altogether.

In sum, with regard collectively to FIG. 3 through FIG. 9, it may be understood that rendering produces a data set for/on a surface, typically though not necessarily having some visual form and/or characteristic (e.g. a vector graphics image, a bitmap, etc.); compositing arranges, alters, and adjusts surfaces; and merging flattens surfaces into a single image, as may be suitable for output through a display.

With reference now collectively to FIG. 10 through 18 therein is presented conceptual illustrations of an example sequence of states for stereo output, as may correspond for example with certain steps analogous to those illustrated in FIG. 2A through FIG. 2C. Although reference is made to FIG. 2A through FIG. 2C for explanatory purposes, neither the individual states shown in FIG. 10 through 18 nor the corresponding steps in FIG. 2A through FIG. 2C are necessarily limiting with regard to various embodiments.

Figure 10:
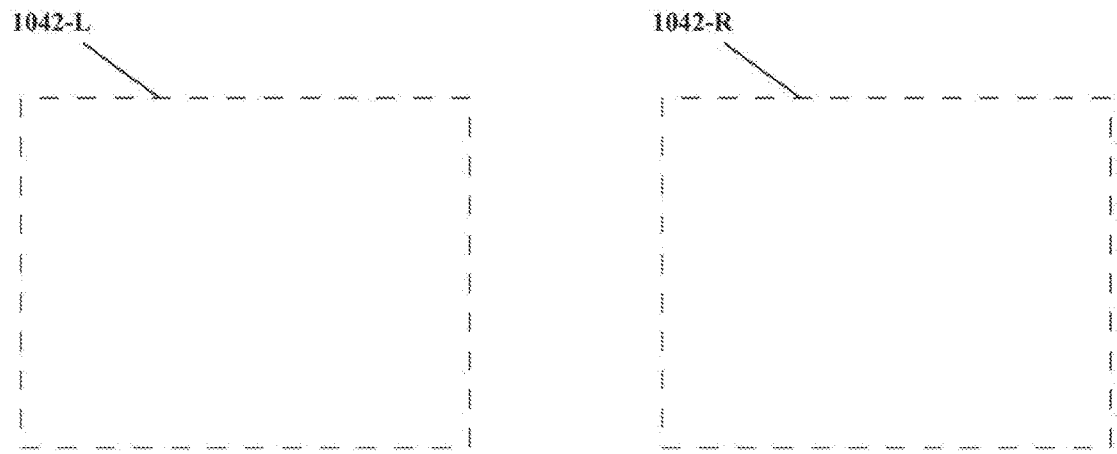
FIG. 10 shows an example conceptual illustration of left and right stereo surfaces, in top-down view.

Turning to FIG. 10, therein is shown conceptual images of surfaces 1042-L and 1042-R (shown empty for simplicity). Surfaces have been described previously herein, however, it is emphasized that in the arrangement of FIG. 10 two distinct surfaces are shown, one left surface 1042-L and one right surface 1042-R. The left surface 1042-L is adapted to receive therein a render from a left perspective, such as a left image in a stereo pair. The right surface 1042-R is adapted to receive therein a render from a right perspective, such as a right image in a stereo pair. In terms of structure (e.g. data configuration, for a surface implemented in a digital processor), the left and right surfaces 1042-L and 1042-R may be similar or even identical. However, the left and right surfaces 1042-L and 1042-R nevertheless may not be interchangeable: because stereo output utilizes two images in a stereo configuration, it may be necessary or at least useful to make a distinction between left and right images (and/or any processes for producing those left and right images).

Figure 11:
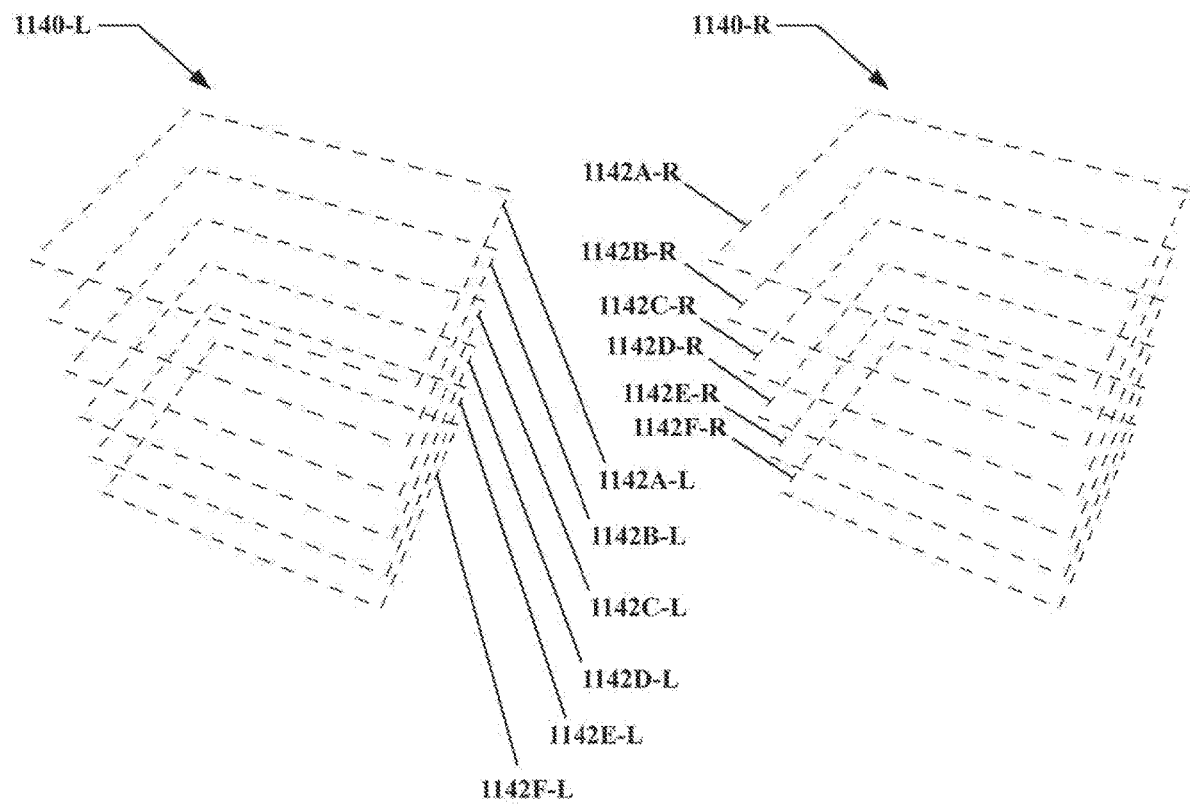
FIG. 11 shows an example conceptual illustration of left and right stereo surface buffers, in perspective view.

With reference now to FIG. 11, therein conceptual illustrations are shown of left and right surface buffers 1140-L and 1140-R. As may be seen, each of the left and right surface buffers 1140-L and 1140-R includes several surfaces, e.g. as similar to the left and right surfaces 1042-L and 1042-R shown in FIG. 10. In particular, in the arrangement shown in FIG. 11 the surface buffers 1140-L and 1140-R include six left surfaces 1142A-L through 1142F-L and six right surfaces 1142A-R through 1142F-R respectively, in similar stack configurations.

The left surfaces 1142A-L through 1142F-L and right surfaces 1142A-R through 1142F-R are shown empty in FIG. 11, as may be the status thereof if surface buffers 1140-L and 1140-R were initially established, e.g. as in step 216B and 216C of FIG. 2B. Thus in at least some sense the arrangement shown in FIG. 11 may be considered to represent conceptually a state during the course of a method as shown in FIG. 2B (though this is an example only, and is not limiting for various embodiments), after steps 216B and 216C have been carried out.

Figure 12:
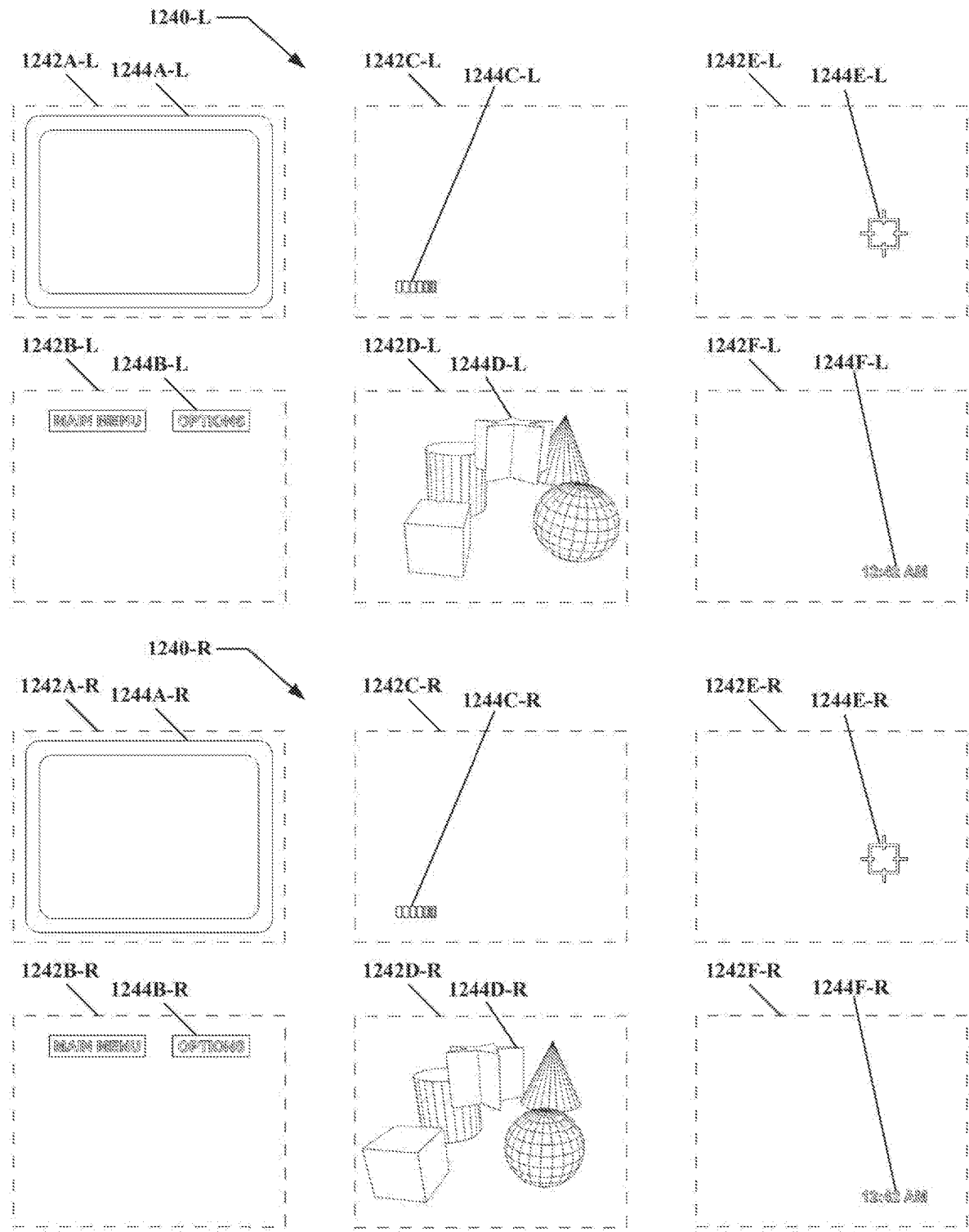
FIG. 12 shows an example conceptual illustration of left and right stereo surfaces in left and right stereo surface buffers with left and right stereo perspective renders disposed therein, in top-down view.

Now with reference to FIG. 12, therein is shown the contents of left and right surface buffers 1240-L and 1240-R. Namely, left surface buffer 1240-L includes six surfaces 1242A-L through 1242F-L with renders 1244A-L through 1244F-L respectively disposed therein, and right surface buffer 1240-R includes six surfaces 1242A-R through 1242F-R with renders 1244A-R through 1244F-R respectively disposed therein.

The renders in the left surface buffer 1240-L are illustrated to represent graphical features, namely a frame 1244A-L, a menu bar 1244B-L, a battery indicator 1244C-L, a view of 3D objects, 1244D-L, a crosshair 1244E-L, and a time indicator 1244F-L.

The renders in the right surface buffer 1240-R likewise are illustrated to represent a frame 1244A-R, a menu bar 1244B-R, a battery indicator 1244C-R, a view of 3D objects, 1244D-R, a crosshair 1244E-R, and a time indicator 1244F-R.

As may be seen, the left renders 1244A-L through 12442-L in the left surfaces 1242A-L through 1242F-L represent similar graphical content to the right renders 1244A-R through 1244F-R in the right surfaces 1242A-R through 1242F-R. That is, both renders 1244A-L and 1244A-R show the same frame, both renders 1244B-L and 1244B-R show the same menu bar, etc.

However, the perspective of the various renders 1244A-L through 1244F-R and 1244A-R through 1244F-R is to be considered.

Mono displays typically may be capable of displaying content only from one perspective at a time. Thus, when developing output for mono displays, typically graphical content likewise may be rendered only from a single perspective. Such a mono perspective may for example represent one that is normal to a plane for 2D content, some selected viewing angle for 3D content (which reveals only a 2D projection of the 3D content at any time), etc. Indeed, 2D graphical content typically may be suitable for view only from such a single mono perspective. That is, it may not be anticipated that a frame such as in renders 1244A-L and 1244A-R would be viewed from the side, or at an angle, etc., rather the expected "norm" may be to view the frame only from a perspective normal to the plane of the frame. In at least some instances no provision may be made in the frame, or other content, for view from any other perspective; there may be nothing to see from perspectives other than a mono perspective, no way to render 2D content from any but a mono perspective, etc.

For a mono display therefor, no distinction may be necessary between 2D and 3D content, since all content necessarily must be displayed from a mono perspective.

By contrast, a stereo display may display content from multiple perspectives, e.g. a stereo pair of left and right perspectives as delivered to left and right displays respectively, so as to produce an appearance of three dimensionality for 3D graphical content. Alternately, identical perspectives may be delivered to both left and right displays, etc. Because multiple perspectives may be outputted, multiple perspectives usefully may be rendered. Thus, the choice of perspective when rendering may become significant.

For various embodiments, 2D graphical content may be rendered from a mono perspective, for both left and right buffers 1240-L and 1240-R. (This has been noted previously with regard to steps 220B1 and 220C1 in FIG. 2B.)

This may be seen by comparing renders 1244A-L, 1244B-L, 1244C-L, 1244E-L, and 1244F-L in the left surface buffer 1240-L against corresponding renders 1244A-R, 1244B-R, 1244C-R, 1244E-R, and 1244F-R in the right surface buffer 1240-R. Renders 1244A-L and 1244A-R both show the same frame, from the same mono perspective, and as such 1244A-L and 1244A-R are visually similar, and may be substantially identical (ignoring rendering variations, errors, noise, etc.). Pairs of renders 1244B-L and 1244B-R, 1244C-L and 1244C-R, 1244E-L and 1244E-R, and 1244F-L and 1244F-R, exhibit similar resemblances, again showing the same respective graphical content sources rendered from the same mono perspective.

However, renders 1244D-L and 1244D-R are visibly different from one another. Render 1244D-L shows a view of 3D objects from a left perspective, while render 1244D-R shows a view of 3D objects from a right perspective. The graphical content source from which renders 1244D-L and 1244D-R derive may be one and the same: it may be observed that both renders 1244D-L and 1244D-R include a cube, cylinder, extruded star, cone, and sphere of similar sizes and shapes and in similar configuration. However, rendering of that graphical content source was from two different perspectives, left and right, producing visibly different renders 1244D-L and 1244D-R.

The visible difference between renders 1244D-L and 1244D-R illustrates that for various embodiments, 3D graphical content may be rendered from left and right perspectives, from a left perspective for a surface 1242D-L in the left surface buffer 1240-L and from a right perspective for a surface 1242D-R in the right surface buffer 1240-R. (This also has been noted previously, with regard to steps 220B2 and 220C2 in FIG. 2B.)

Thus, as may be seen in FIG. 12, in rendering graphical content sources into left and right surface buffers 1240-L and 1240-R, the perspective(s) for rendering are determined at least in part based on the dimensionality of each graphical content source: 2D content may be rendered from a mono perspective for both the left and right surface buffers 1240-L and 1240-R, while 3D content may be rendered from a left perspective for the left surface buffer 1240-L and from a right perspective for the right surface buffer 1240-R. This distinction is of note, and enables certain advantages of various embodiments, about which more is described subsequently herein.

The arrangement shown in FIG. 12 may be considered in at least some sense to represent conceptually a state during the course of a method as shown in FIG. 2B (though this is an example only, and is not limiting for various embodiments), after steps 220B1, 220B2, 220C1, and 220C2 have been carried out.

In particular, although the left and right renders 1244A-L, 1244B-L, 1244C-L, 1244E-L, and 1244F-L and 1244A-R, 1244B-R, 1244C-R, 1244E-R, and 1244F-R that represent mono content are shown as being identical, this is not required. For example, such renders may vary in field of view, or in other aspects; more regarding this is described subsequently herein with regard to FIG. 30 and FIG. 31.

Figure 13:
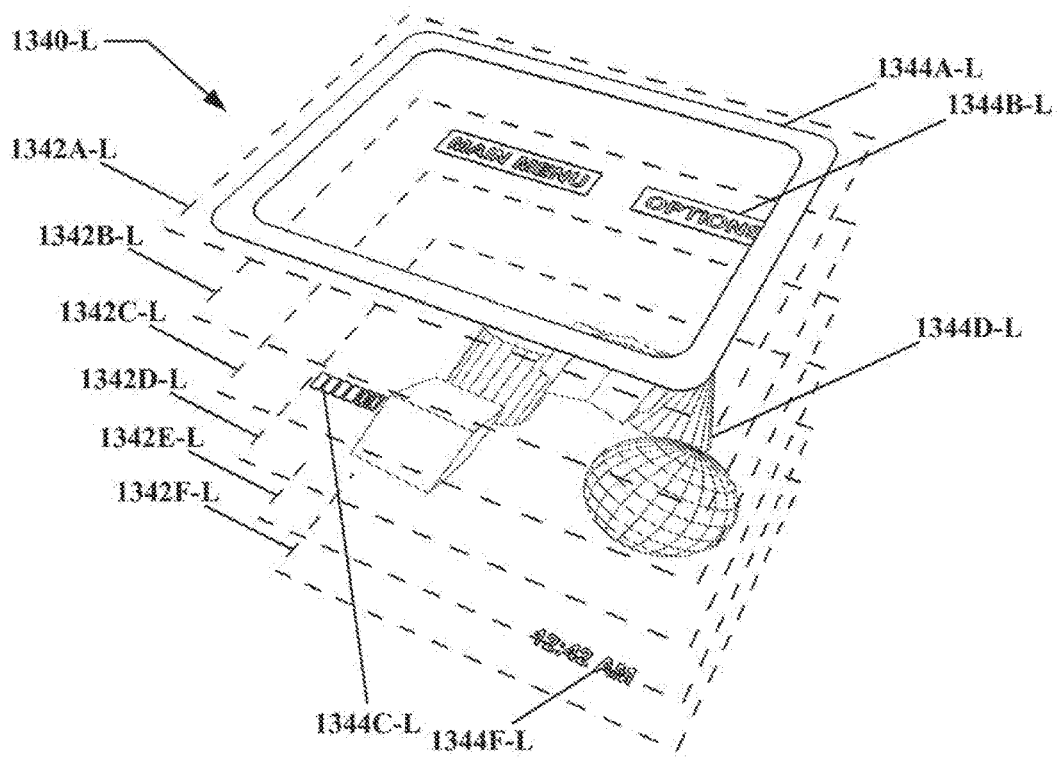
FIG. 13 shows another example conceptual illustration of left and right stereo surfaces in left and right stereo surface buffers with left and right stereo perspective renders disposed therein, in perspective view.
Figure 13:
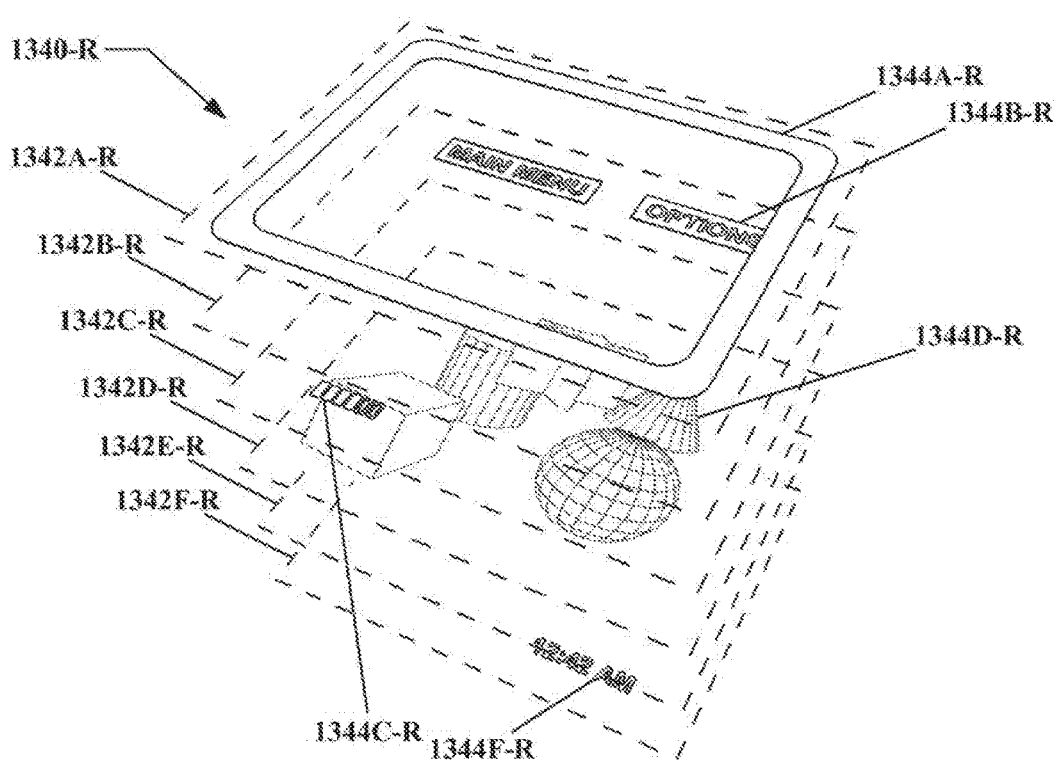

Now with reference to FIG. 13, therein are shown conceptual illustrations of left and right surface buffers 1340-L and 1340-R. The left surface buffer 1340-L includes surfaces 1342A-L, 1342B-L, 1342C-L, 1342D-L, 1342E-L, and 1342F-L with renders 1344A-L, 1344B-L, 1344C-L, 1344D-L, 1344E-L, and 1344F-L respectively disposed thereon. The left surface buffer 1340-R similarly includes surfaces 1342A-R, 1342B-R, 1342C-R, 1342D-R, 1342E-R, and 1342F-R with renders 1344A-R, 1344B-R, 1344C-R, 1344D-R, 1344E-R, and 1344F-R respectively disposed thereon. It is noted that the surfaces 1342A-L through 1242F-L and the renders 1344A-L through 1344F-L disposed thereon, and the surfaces 1342A-R through 1242F-R and the renders 1344A-R through 1344F-R disposed thereon, are arranged consecutively from top to bottom, A through F. As may be seen, renders 1344A-L through 1344F-L and renders 1344A-R through 1344F-R are shown as resembling renders 1344A-L through 1344F-L and renders 1344A-R through 1344F-R (though no crosshair is visible in surfaces 1342E-L or 13442-R due to occlusion).

Although visually different from FIG. 12 in terms of the disposition of the buffers 1340-L and 1340-R, the arrangement shown in FIG. 13 also may be considered in at least some sense to represent conceptually a state during the course of a method as shown in FIG. 2B (though this is an example only, and is not limiting for various embodiments), after steps 220B1, 220B2, 220C1, and 220C2 have been carried out.

Only a limited number of example surfaces 1342A-L through 1342F-L and 1342A-R through 1342F-R are shown in FIG. 13, and likewise in certain other examples herein, so as to maintain clarity of illustration and description. However, embodiments are not limited only to the surfaces and/or renders shown, nor to the number of surfaces and renders shown, nor necessarily even to surfaces and/or to renders only.

For example, as illustrated all of the example surfaces 1342A-L through 1342F-L and 1342A-R through 1342F-R include what may be considered "visible" content therein, that is, renders 1344A-L through 1344F-L and 1344A-R through 1344F-R that show visible imagery. However, surfaces also may accommodate non-visible content. For example, one surface might accommodate a "mask", so as to make renders and/or other content "behind"/"below" that surface translucent, faded, invisible, etc. As a more concrete example, such a mask might prevent visibility of content behind 3D content that is to be displayed in stereo, so that such 3D content is effectively in empty space, with no other content visible in the background. Alternately, a background may be added deliberately within a surface. To continue the example above, the 3D content then may appear to float in front of a pattern, a solid color, a subdued animation, bright light (e.g. if the 3D content is transparent or translucent), etc.

Likewise, such surfaces may be tagged so as to affect only some but not all other surfaces and/or renders. Thus, a surface with a mask for clearing space around 3D content may affect all surfaces exhibiting content rendered from a mono perspective, regardless of the "position" of such surfaces within the buffer. Such a mask might be considered, colloquially, as "punching a hole" through all surfaces that do not include 3D content.

Surfaces also may apply other variations to surfaces, such as illumination, shadowing, distance blur, smoke or fog, highlighting (e.g. a color change to indicate that a 3D object is active or has been selected), etc.

However, although such effects may be achieved through the use of surfaces, such effects are not limited only to being achieved through surfaces. To establish a clear "window" surrounding 3D content, for example, instead of adding a mask surface certain embodiments may instruct content sources, programs, the mono controller, etc. to leave a clear space in some fashion. As a more concrete example, the mono controller for a given embodiment may be instructed (e.g. by the stereo controller) that a certain region is dedicated to some particular 3D content, and that no other content (or perhaps only no 2D content) is to be outputted thereto. In such instance, content that otherwise would be outputted into the region reserved for 3D content may be omitted, may be relocated, etc.

Other arrangements also may be suitable.

Figure 14:
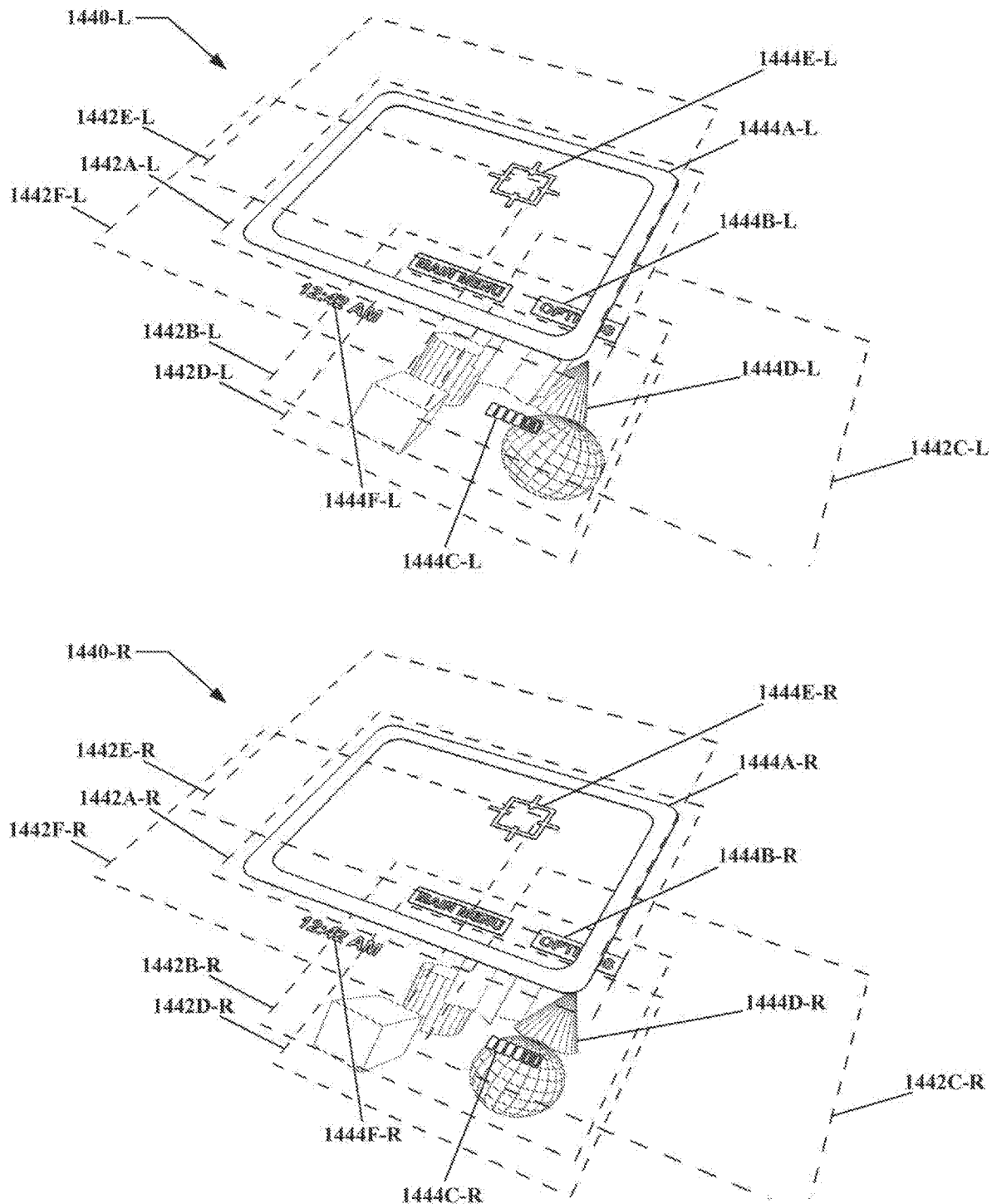
FIG. 14 shows an example conceptual illustration of left and right stereo surfaces in left and right stereo surface buffers with left and right stereo perspective renders disposed therein, having been composited, in perspective view.

Now with reference to FIG. 14, therein is shown another conceptual illustration of left and right surface buffers 1440-L and 1440-R. The left surface buffer 1440-L includes surfaces 1442A-L through 1442F-L therein, with renders 1444A-L through 1444F-L respectively disposed thereon, those renders including a frame 1444A-L, a menu bar 1444B-L, a battery indicator 1444C-L, a view of 3D objects 1444D-L, a crosshair 1444E-L, and a time indicator 1444F-L. The right surface buffer 1440-R also includes several surfaces 1442A-R through 1442F-R therein, with renders 1444A-R through 1444F-R respectively disposed thereon, those renders including a frame 1444A-R, a menu bar 1444B-R, a battery indicator 1444C-R, a view of 3D objects 1444D-R, a crosshair 1444E-R, and a time indicator 1444F-R.

The arrangement in FIG. 14 is at least somewhat similar to FIG. 13, however, the ordering of left surfaces 1442A-L through 1442F-L with renders1444A-L through 1444F-L disposed thereon and of right surfaces 1442A-R through 1442F-R with renders1444A-R through 1444F-R disposed thereon is different than in FIG. 14 than in FIG. 13. In particular, in FIG. 13 surfaces (and renders) are ordered consecutively by letter, top to bottom. However in FIG. 14 left surfaces (and renders) are ordered 1442E-L, 1442A-L, 1442F-L, 1442C-L, 1442B-L, and 1442D-L, and right surfaces (and renders) are ordered 1442E-R, 1442A-R, 1442F-R, 1442C-R, 1442B-R, and 1442D-R In addition, as may be seen in FIG. 14 the left and right surfaces 1444C-L and 1444C-R with battery indicator renders 1444C-L and 1444C-R thereon are displaced to the right relative to the remainder of their respective surface buffers 1440-L and 1440-R. Also, left and right surfaces 1442F-L and 1442F-R with time indicator renders 1444F-L and 1444F-R thereon are displaced to the left relative to the remainder of their respective surface buffers 1440-L and 1440-R.

The change in ordering of left and right surfaces 1442A-L through 1442F-L and 1442A-R through 1442F-R within the left and right surface buffers 1440-L and 1440-R and the translation of left and right surfaces 1442C-L, 1442C-R, 1442F-L, and 1442F-R as shown in FIG. 14 compared with FIG. 13 represents a compositing of the left and right surfaces 1442A-L through 1442F-L and 1442A-R through 1442F-R.

The arrangement shown in FIG. 14 may be considered in at least some sense to represent conceptually a state during the course of a method as shown in FIG. 2B (though this is an example only, and is not limiting for various embodiments), after steps 222B and 222C have been carried out.

It is noted that compositing of the left and right buffers 1440-L and 1440-R as shown in FIG. 14 is substantially identical for both the left and right buffers 1440-L and 1440-R. More particularly, the left surfaces 1442A-L through 1442F-L and 1442A-R through 1442F-R are reordered similarly for both the left and right buffers 1440-L and 1440-R, the left and right surfaces 1442C-L and 1442C-R are translated left in similar directions and to similar degrees, and the left and right surfaces 1442F-L and 1442F-R are translated right in similar directions and to similar degrees. However, while compositing may be substantially identical for left and right buffers 1440-L and 1440-R as shown in FIG. 14, identical compositing of left and right buffers is not necessarily required for all embodiments.

Similarly, the number of surfaces in a surface buffer, the particular configuration of surfaces within a surface buffer, etc. may not necessarily be identical or substantially identical for left and right surface buffers in any particular embodiment (although for simplicity left and right surface buffers are shown as similar herein).

Figure 15:
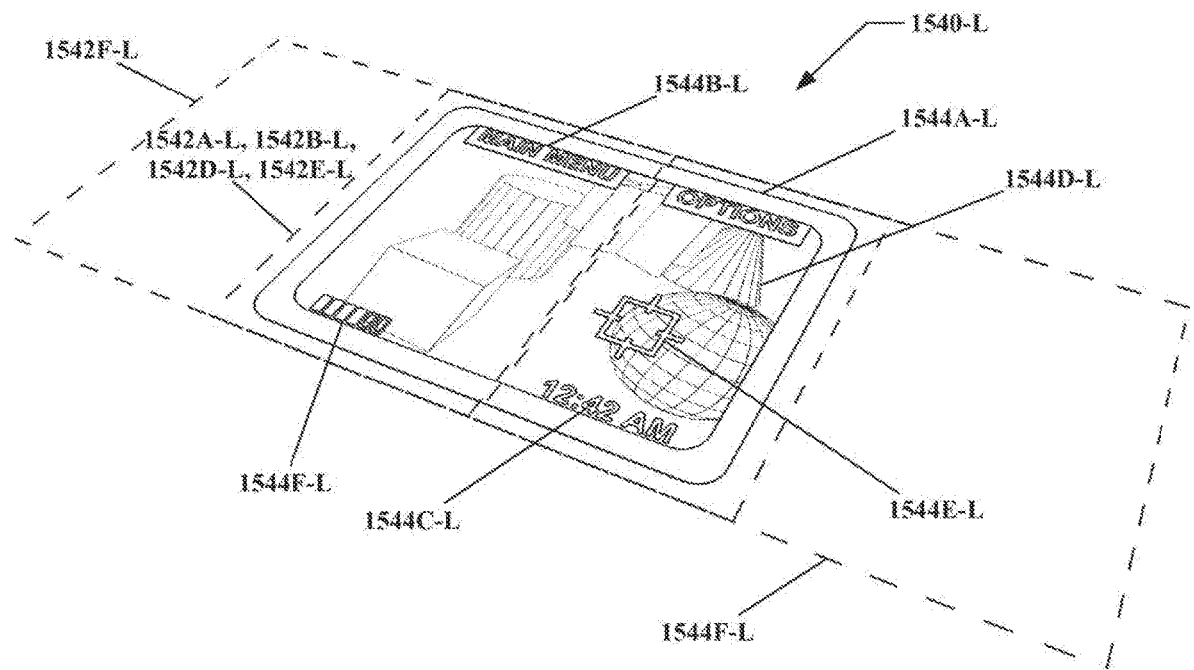
FIG. 15 shows an example conceptual illustration of left and right stereo surfaces in left and right stereo surface buffers with left and right stereo perspective renders disposed therein, having been composited and spatially collapsed, in perspective view.
Figure 15:
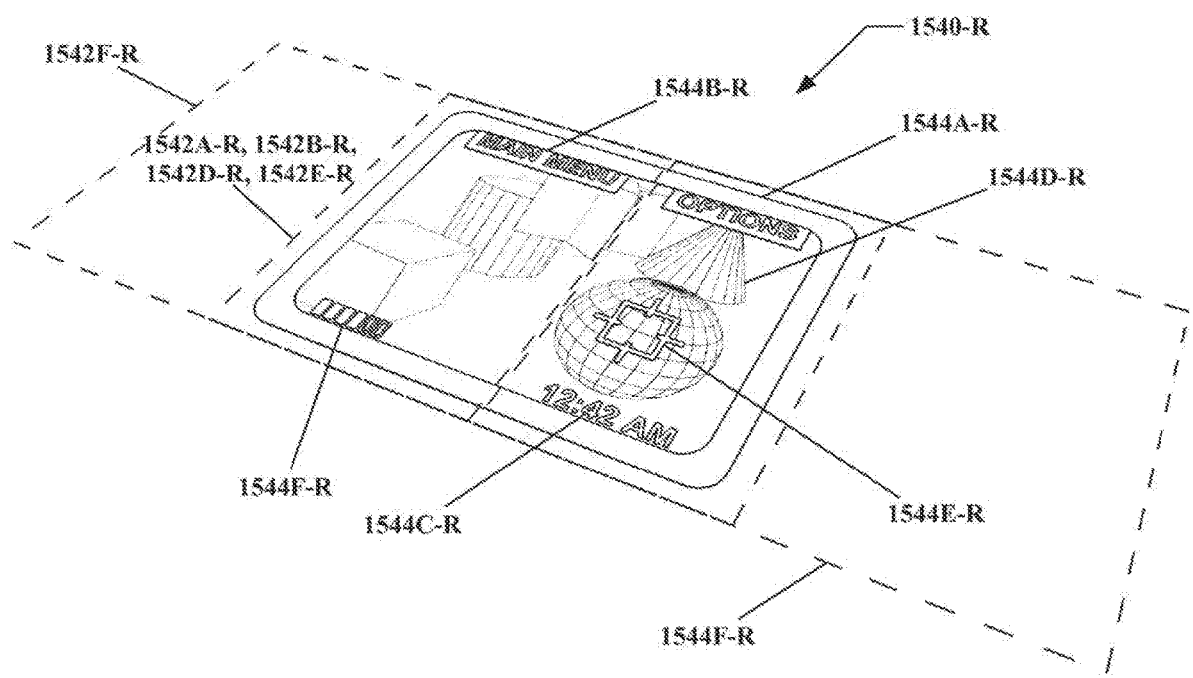

Now with reference to FIG. 15, therein is shown another conceptual illustration of a left and right surface buffers 1540-L and 1540-R. As illustrated, the left and right surface buffers 1540-L and 1540-R include surfaces 1542A-L through 1542F-L with renders 1544A-R through 1544F-R and surfaces 1542A-L through 1542F-R with renders 1544A-L through 1544F-R disposed thereon, respectively. However, as may be seen the left and right surface buffers 1540-L and 1540-R are not configured as stacks, with separation between surfaces 1542A-L through 1542F-L and 1542A-R through 1542F-R; rather, the left and right surface buffers 1540-L and 1540-R are shown collapsed.

However, although the surface buffers 1540-L and 1540-R are shown as visually collapsed in FIG. 15, and may not be visually separate therein, nevertheless the surfaces 1542A-L through 1542F-L and 1542A-R through 1542F-R remain distinct.

It is noted that the arrangement in FIG. 15 does not necessarily uniquely represent a particular step from FIG. 2A through FIG. 2C distinct from FIG. 14; either or both of FIG. 14 and FIG. 15 may be taken as conceptually representing a state during the course of a method as shown in FIG. 2B, after steps 222B and 222C have been carried out, that is, after invoking compositing left surfaces in a left surface buffer with a stereo controller, and after invoking compositing right surfaces in a right surface buffer with the stereo controller. As noted previously, surface buffers may not necessarily exist as geometric constructs, e.g. "stacks" of surfaces, but may rather be digital information, logical structures, etc. Thus, the distinction between FIG. 14 and FIG. 15 may be one of illustration, rather than FIG. 14 and FIG. 15 necessarily representing two distinct steps, states, etc.

Figure 16:
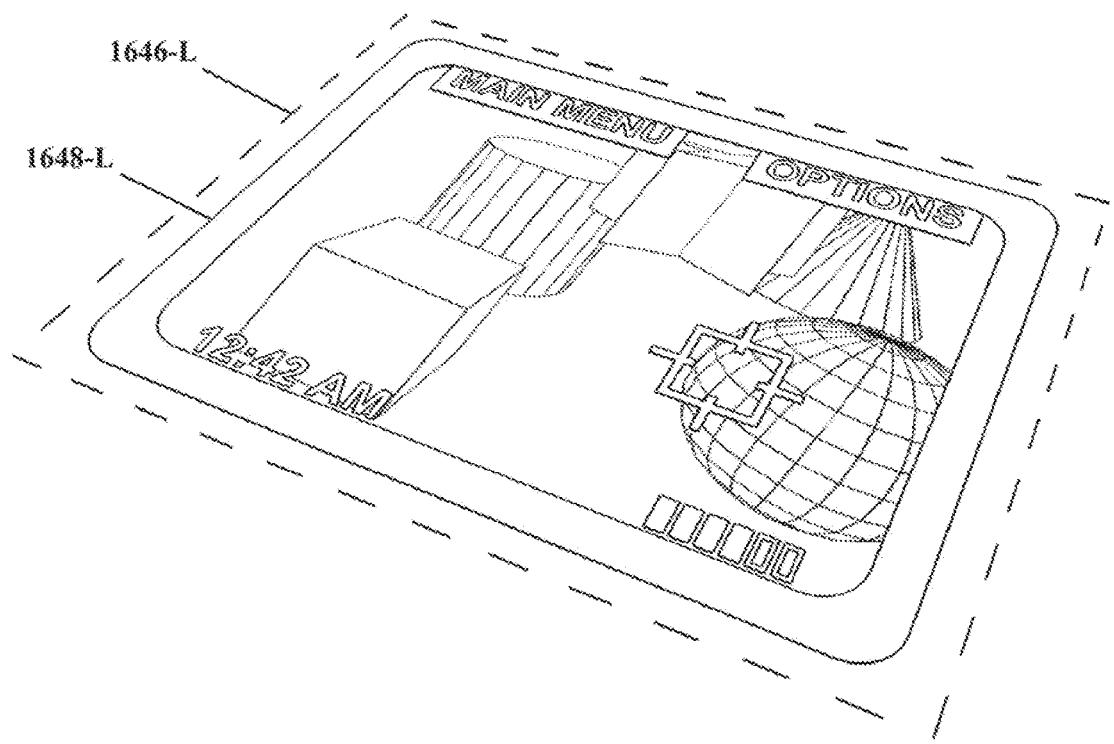
FIG. 16 shows an example conceptual illustration of merged left and right stereo images in left and right stereo image buffers, in perspective view.
Figure 16:
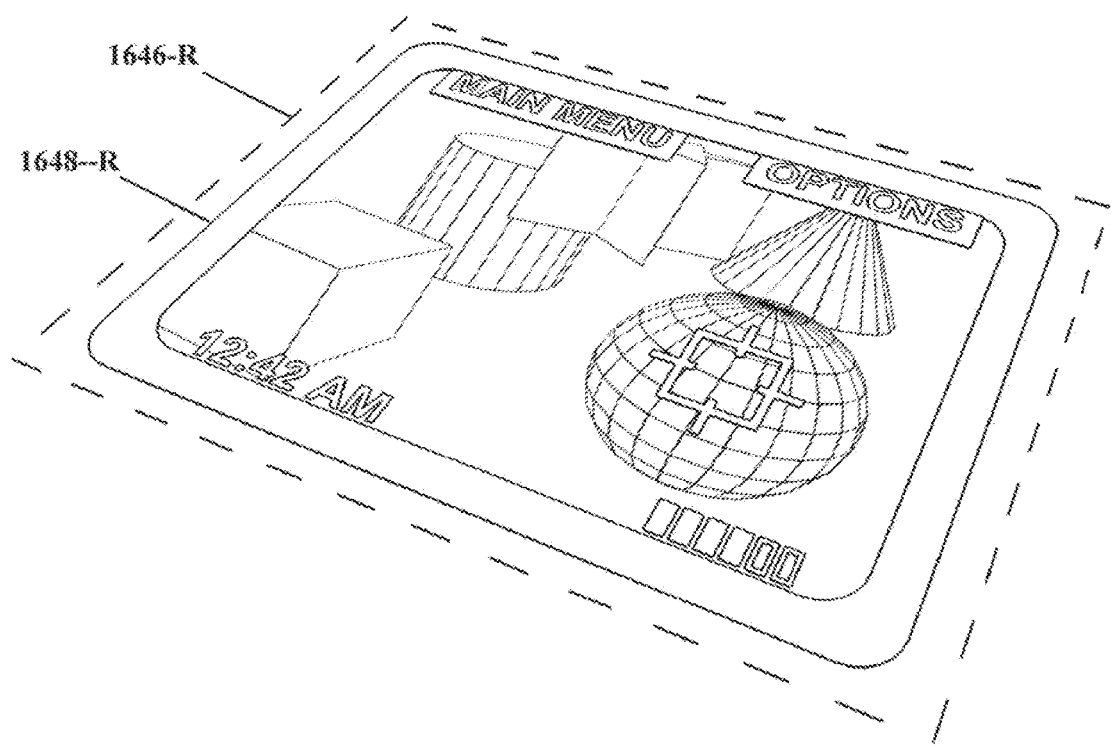

Now with reference to FIG. 16, therein an arrangement at least somewhat similar visually to that of FIG. 15 is shown. Left and right image buffers 1646-L and 1646-R are visible, represented by dashed outline (though in practice such an outline may not necessarily be present), and left and right merged images 1648-L and 1648-R are shown thereon.

The arrangement in FIG. 16 also may be visually similar to that in FIG. 15 in that similar graphical features are visible in FIG. 15 and FIG. 16, e.g. a frame, a menu bar, etc. However, in FIG. 15 such visible features are in individual renders disposed in individual surfaces, while in FIG. 16 these visible features are not distinct entities, but rather have been combined to form merged. More particularly, left renders have been merged to form a left image 1648-L, and right renders have been merged to form a right image 1648-R. The arrangement in FIG. 16 thus is not left and right surfaces, but left and right merged images 1648-L and 1648-R. Thus, further compositing of surfaces and/or renders may not be possible with the arrangement in FIG. 16 because there are no individual surfaces and/or renders present in FIG. 16.

The arrangement shown in FIG. 16 may be considered in at least some sense to represent conceptually a state during the course of a method as shown in FIG. 2B (though this is an example only, and is not limiting for various embodiments), after steps 224B and 224C have been carried out.

Figure 17:
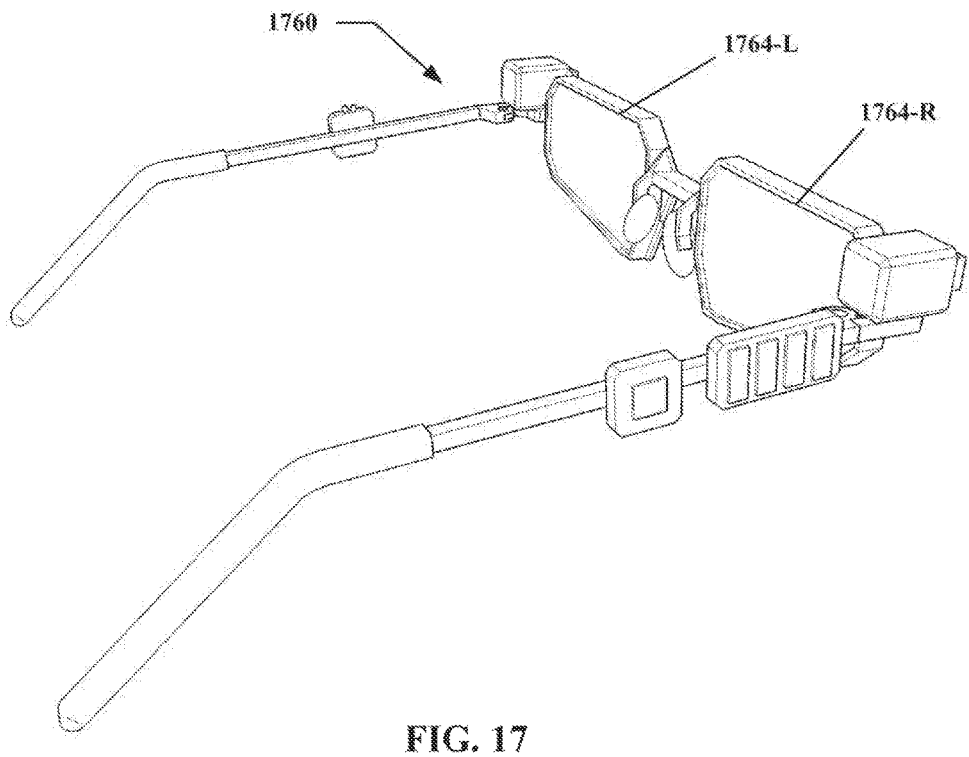
FIG. 17 shows an example stereo display, in perspective view.

Now with reference to FIG. 17, therein a stereo display 1760 is shown, including left and right displays 1764-L and 1764-R. The stereo display 1760 is illustrated as a near-eye stereo head mounted display, in a form similar to and/or adapted to be worn in similar fashion to a pair of glasses. However, this is an example only.

Figure 18:
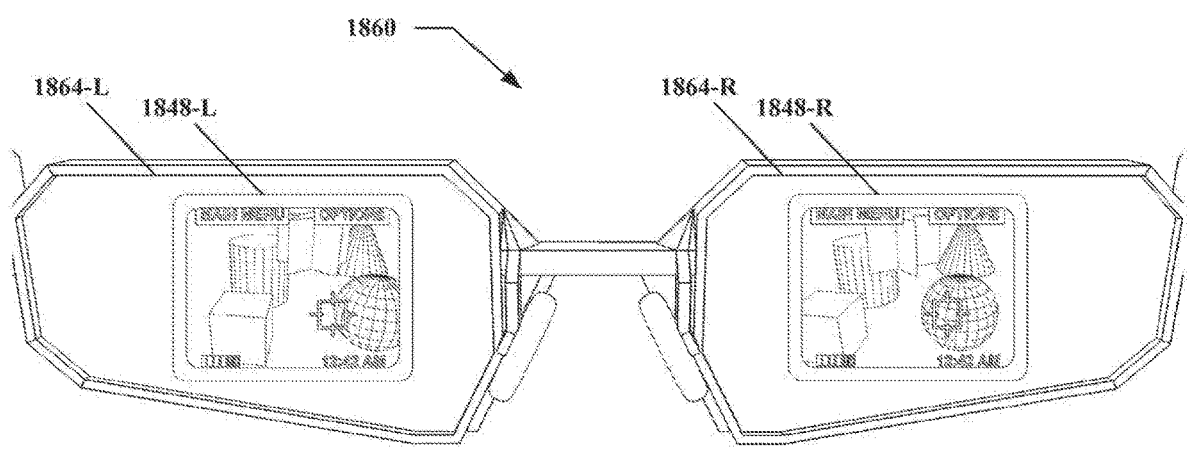
FIG. 18 shows an example stereo display with left and right stereo images outputted therefrom, in perspective view.

Turning to FIG. 18, another view of a stereo display 1860 again is shown, also including left and right displays 1864-L and 1864-R. In addition, in the arrangement of FIG. 18 the left display 1864-L is shown with a left image 1848-L thereon, e.g. as being outputted thereto; the right display 1864-R likewise is shown with a right image 1848-R thereon, e.g. as being outputted thereto. Thus a person wearing the stereo display 1860 may, given suitable content to images 1848-L and 1848-R, view at least some portion of the images 1848-L and 1848-R outputted to the left and right displays 1864-L and 1864-R in stereo, e.g. viewing 3D content with an appearance of three dimensionality.

The arrangement shown in FIG. 18 may be considered in at least some sense to represent conceptually a state during the course of a method as shown in FIG. 2C (though this is an example only, and is not limiting for various embodiments), after steps 226B and 226C have been carried out.

At this point it may be illuminating to point out certain functions and/or advantages of various embodiments, in view of the preceding description. It should not be considered that the functions and/or advantages are necessarily the only such, however.

Figure 19:
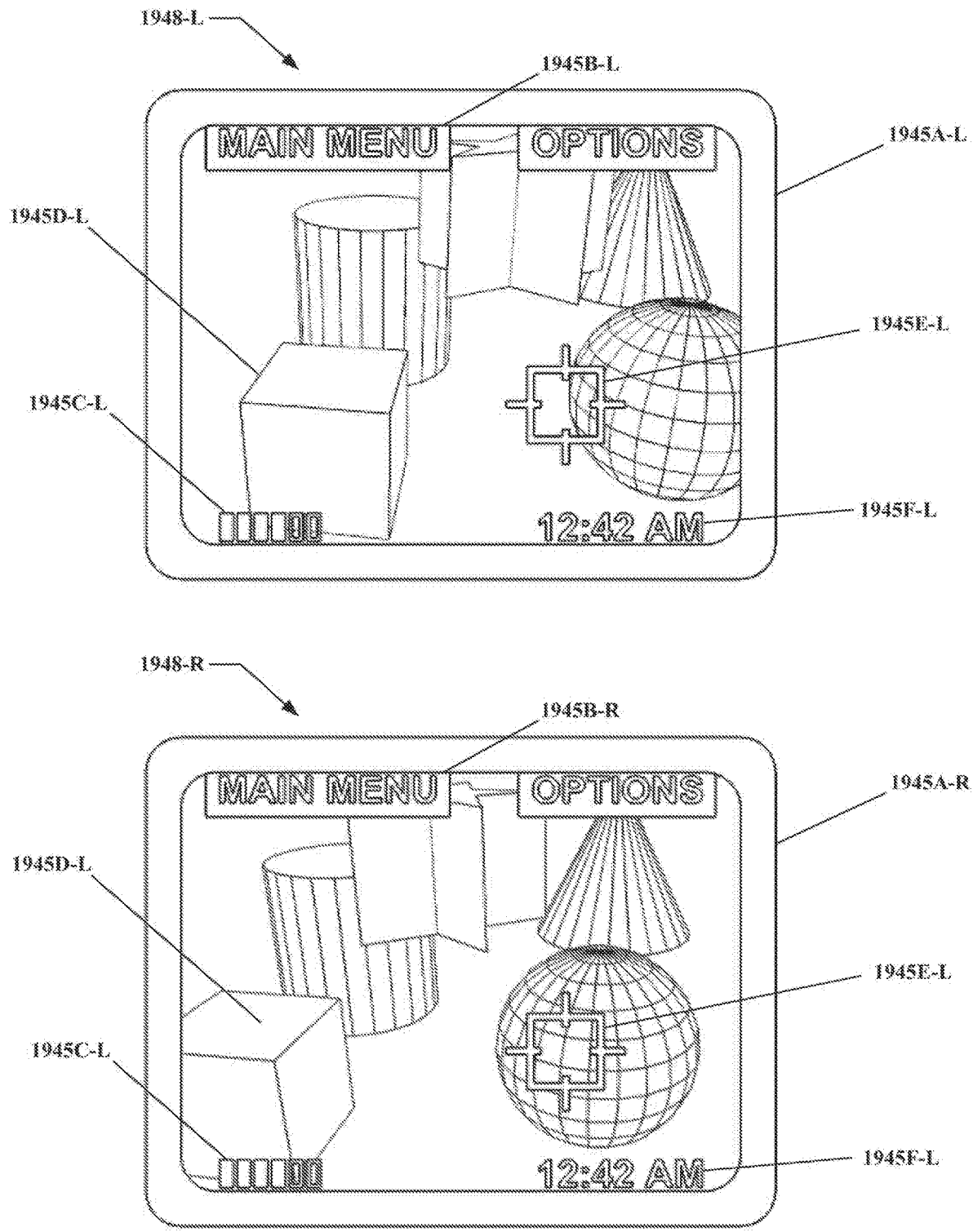
FIG. 19 shows left and right stereo images exhibiting mixed left and mono perspectives and mixed right and mono perspectives respectively, in top-down view.

With reference to FIG. 19, therein is shown a left image 1948-L and a right image 1948-R. As may be seen, various features are visible in each of the left and right images 1948-L and 1948-R, such as a frame 1945A-L and 1945A-R, a menu bar 1945B-L and 1945B-R, a battery indicator 1945C-L and 1945C-R, 3D objects 1945D-L and 1945D-R, a crosshair 1945E-L and 1945E-R, and a time indicator 1945F-L and 1945F-R.

Through comparison of the left and right images 1948-L and 1948-R, it may be observed therein that the frames 1945A-L and 1945A-R, menu bars 1945B-L and 1945B-R, battery indicators 1945C-L and 1945C-R, a crosshairs 1945E-L and 1945E-R, and time indicators 1945F-L and 1945F-R are at least substantially identical in the left and right images 1948-L and 1948-R. For example, the size, shape, relative positions, perspective, etc. of such features is visibly the same in both the left and right images 1948-L and 1948-R.

Also by comparison of the left and right images 1948-L and 1948-R, it may be observed therein that the 3D objects 1945D-L and 1945D-R therein are visibly different between the left and right images 1948-L and 1948-R. For example, the 3D objects 1945D-L in the left image 1948-L exhibits a left perspective, that is a perspective some distance to the right of the perspective of the 3D objects 1945D-R in the right image 1948-R. In other words, the left image 1948-L represents those 3D objects 1945D-L from a point of view some distance to the left, as compared with the right image 1948-R (equivalently, the right image 1948-R may be considered as representing the 3D objects 1945D-R from a point of view some distance to the right as compared with the left image 1948-L).

For purposes of illustration, the 3D objects 1945D-L and 1945D-R as appearing in the left and right images 1948-L and 1948-R may be taken to represent left and right stereo views of the cube, cylinder, star extrusion, cone, and sphere. Thus, if the left and right images 1948-L and 1948-R were configured for stereo viewing, the 3D objects 1945D-L and 1945D-R may appear to a viewer as exhibiting three dimensionality.

However, the frame 1945A-L and 1945A-R, menu bar 1945B-L and 1945B-R, battery indicator 1945C-L and 1945C-R, crosshair 1945E-L and 1945E-R, and time indicators 1945F-L and 1945F-R may simultaneously appear to exhibit two dimensionality, despite the various features appearing together in the same images 1948-L and 1948-R. Thus, the frame 1945A-L and 1945A-R, menu bar 1945B-L and 1945B-R, battery indicator 1945C-L and 1945C-R, crosshair 1945E-L and 1945E-R, and time indicators 1945F-L and 1945F-R may appear as mono content with the 3D objects 1945D-L and 1945D-R appearing as stereo content.

In more colloquial terms, the images 1948-L and 1948-R shown in FIG. 19 may enable some content therein to appear as "flat", and other content therein to appear as "3D".

Thus, it is noted that various embodiments may deliver stereo output of graphical content, and simultaneously may deliver mono content. The viewer may see a single stereoscopically combined view derived from images 1948-L and 1948-R, with portions of that combined view appearing as stereo 3D content, and with other portions of that same combined view appearing as mono 2D content.

It is emphasized that the distinctions between 2D and 3D output are not arbitrary, inherent, or fixed. Rather, through selective rendering from different perspectives (e.g. mono, left, right), controlled compositing and merging, etc., graphical content may be selectively displayed as 2D or 3D. Some portions, features, windows, etc. within a screen may be selected for output so as to exhibit a 2D appearance, while other portions, features, windows, etc. within that screen may be selected for output so as to exhibit a 3D appearance, with 2D and 3D features thus appearing together on the same screen.

In practice, it may not necessarily be desirable to output 2D content in 3D, e.g. by rendering left and right perspectives thereof, etc. For example, a flat frame such as features 1945A-L and 1945A-R in left and right images 1948-L and 1948-R may in principle be rendered from left and right perspectives for the left and right images 1948-L and 1948-R respectively, rather than from a mono perspective for both left and right images 1948-L and 1948-R (as shown in FIG. 19). Such an arrangement may be possible, and is not excluded, but may not be considered to be of sufficient visual interest as to merit the effort involved, i.e. a 2D object portrayed in 3D may still "look flat", and so may lack visual interest. Typically, though not necessarily, features that are mainly or entirely two dimensional may be rendered in mono perspective and outputted in 2D, while features that are partially or entirely three dimensional may be rendered in stereo perspective and outputted in 3D or rendered in mono perspective and outputted in 2D, depending on preferences, circumstances, etc.

It is also noted that for various embodiments, certain steps for delivering mono and/or stereo output to a stereo display may be carried out partly or entirely by utilizing existing systems that already may be available, but that may be dedicated wholly to mono output (and incapable of stereo output). For example, a mono controller as described with regard to FIG. 1 and FIG. 2A through FIG. 2C may include therein executable instructions (and/or other "machinery", whether physical or data based) for rendering, for compositing, for merging, etc. Even though such executable instructions may themselves lack any capability for stereo output, nevertheless those executable instructions may be re-purposed according to various embodiments so as to facilitate stereo output, as described herein (e.g. through additional instructions incorporated within a stereo controller).

Thus, it may not be necessary to modify an existing mono controller, or related libraries, applications, utilities, hardware, etc. Various embodiments may enable stereo and/or mixed mono/stereo output as an "add on" feature, e.g. through the overlay of a stereo controller onto a mono controller on an existing device, with little or no modification to the mono controller itself.

It is further noted that for at least certain embodiments, given existing executable instructions or other systems as may already be available for mono output, such repurposing to enable stereo and/or mixed mono/stereo output may not necessarily affect the function of the existing executable instructions/systems. That is, overlaying a stereo controller onto a mono controller may not necessarily interfere with the functions of the mono controller itself. The mono controller may still continue to deliver mono output to mono displays, may still carry out other designed functions, etc., even as the stereo controller utilizes certain resources within the mono controller for other purposes (such as stereo and/or mixed mono/stereo output).

As a more concrete example, consider a smart phone with a mobile operating system instantiated on a processor thereof, the mobile operating system serving as a mono controller so as to enable output of mono content to a mono display on the smart phone. Disposing a stereo controller in communication with the mobile operating system and disposing a stereo display in communication with the stereo controller may enable output of stereo and/or mixed mono/stereo content to the stereo display, and may do so without necessarily interfering with the ability of the mobile operating system to deliver mono output to the smart phone's mono display, or other functions of the mobile operating system (communications, data storage and recall, running applications, etc.).

Thus, adding a stereo controller may not necessarily interfere with existing applications, functions, etc. of the mobile operating system/smart phone (nor of other mono controllers).

Furthermore, it is noted that an arrangement wherein functions such as rendering, compositing, merging, etc. are repurposed from a mono controller so as to produce stereo and/or mixed mono/stereo output, may achieve certain advantages e.g. in terms of providing and/or supporting stereo and/or mixed mono/stereo output. For example, if the mono controller supports creating objects, windows, etc. for output with a mono display, such a feature may carry over for stereo and/or mixed mono/stereo display.

As a more concrete example, if the mono controller supports creating a window showing a view therein of a 3D model of a beating human heart from a mono perspective, then outputting that heart model in stereo may be facilitated by the stereo controller selectively invoking rendering of the heart model from left and right perspectives into left and right surfaces in left and right surface buffers, etc., as previously described herein. From the point of view of a program in communication with the mono controller (e.g. an application running under a mobile operating system on a smart phone), the little or no change in how the window is created, addressed, and otherwise "handled" may be necessary, as the "stereo part" may be overseen by the stereo controller without modifying the mono controller, the heart model, the application displaying the window, etc.

Similarly, from the standpoint of program languages and/or protocols, and/or a programmer utilizing program languages and/or protocols, writing a new program or modifying an existing program also may require little or no change in how such a window is to be created, addressed, etc. For example, the process for creating a window may not be sensitive to whether that window eventually may be selected for stereo 3D output; for at least certain embodiments the interpretation of 3D content as 3D, and the selection of some or all 3D content for stereo display with an appearance of three dimensionality, may be handled within the stereo controller at the time the content is displayed, without necessarily requiring specific forethought or preparation on the part of a programmer when writing an application.

As a more concrete example, consider a mobile operating system (or other mono controller) with some form of "wizard" or help function for "dropping in" a window of a given size, showing some form of content. To continue the example of the heart above, the wizard/help function may facilitate creation and placement of a window simply by specifying a few parameters such as size, corner position, etc., rather than requiring a programmer to write executable instructions specific to each window that is to be created. (Such an arrangement may be referred to in some instances by the term "syntactical sugar", and may serve both as an aid to programmers and as a tool for standardizing behaviors, e.g. so that all windows have certain common basic behaviors.) Given such an arrangement, a programmer may, for at least certain embodiments, still simply specify the size, corner position, etc., for outputting the heart model as stereo and/or mixed mono/stereo content from a stereo display as for outputting the heart model as purely mono content from a mono display.

That is, the conventions for operating, viewing, programming, etc. may not change, or may change only minimally, despite the addition of an ability to output stereo and/or mixed mono/stereo content.

As another example, inputs for controlling an object, such as the aforementioned model of a beating heart, also may remain unchanged or only minimally changed. That is, if a swipe across a touch-sensitive mono screen may rotate the heart model within the window, then that swipe command and associated response of rotating the heart model also may apply equally to the heart as outputted to a stereo display. For example, "rotate" command may remain, may still be associated with a "swipe" input, etc. In at least certain embodiments some support may be necessary or at least useful within the stereo controller to maintain a "swipe to rotate" arrangement, e.g. defining parameters to identify swipes in three dimensional free space (where the swipe originally may have been defined as a specific series of contacts, motions, etc. across a touch-sensitive screen). However, at least insofar as the mono controller is concerned, commands for manipulating the heart model, the responses to those commands, etc., may be similar or identical regardless of whether output is ultimately mono to a mono display or stereo and/or mixed mono/stereo to a stereo display.

Thus, analogs to inputs for controlling 2D content may serve similarly for controlling 3D content. For example considering a stereo display, free space swipes may function as input similarly to how a surface swipe may function as input for a touch screen mono display. In addition, the inputs for controlling 2D content may continue to serve for controlling 2D content. To continue the example above, a surface swipe to a touch screen may still serve as input to content on the mono display, as well as potentially also serving as input to content on the stereo display (e.g. if the content of the mono and stereo display are linked, such that changing one changes the other, and/or such that mono and stereo displays are in essence showing different views of the same content).

More concretely, a touch screen swipe may rotate a 3D heart visible in 2D on a mono display and/or visible in 3D on a stereo display; a free space swipe likewise may rotate a 3D heart visible in 3D on a stereo display and/or visible in 2D on a mono display. This may in certain embodiments reflect a connection (e.g. the same content is being displayed, in 2D on a mono display and also in 3D on a stereo display), but in other embodiments may reflect symmetry of control (e.g. similar inputs produce similar results whether interacting with mono or stereo output), and other arrangements also may be suitable.

Such similarities may facilitate transparency of use and or programming when considering stereo and/or mixed mono/stereo content to a stereo display as compared with mono content on a mono display. For users, programmers, etc. the appearance, manipulation, use, interfacing, control, programming, etc. for graphical content may be similar for mono and stereo systems, regardless of the display or the dimensionality of displayed content. If a programmer or a user is already familiar with either a mono or a stereo environment, experience therewith may in at least some degree carry over. As noted with regard to the example of the heart model, for a user if a screen swipe rotates a mono view of the heart on a mono display, a free space swipe likewise may rotate a stereo view of the heart on a stereo display; similarly, for a programmer if a "wizard" produces a functioning window for a mono view of the heart on a mono display, that same window (or a similar window output of by the "wizard") likewise may be a functioning window for a stereo view of the heart on a stereo display.

However, these are examples only, and it is not required that inputs and/or behaviors for mono and stereo content be identical or even similar. Also, even for embodiments that are similar in such fashion, changes nevertheless may be necessary, may be implemented within the stereo controller, etc., whether to make mono and stereo interaction more similar, less similar, or to make changes that do not affect similarity.

In addition, it is noted that in an arrangement wherein 2D mono and 3D stereo content is handled as described herein, for at least some embodiments what is being displayed may be readily varied while "hot". That is, what is displayed in mono and/or stereo may be modified while displays are active. For example, a window outputting a view of a 3D model in mono to a stereo display may be switched "on the fly" to be output in stereo. Likewise, a mono or stereo window may be added, removed, changed in size or shape, etc.

Although content may be displayed in both 2D and 3D on a stereo display, content is not limited to a "2D region" and a "3D region". Rather, a stereo display may selectively and/or controllably deliver content having an appearance of either two-dimensionality (mono) or three-dimensionality (stereo) without regard to limiting 2D or 3D content to certain portions of the display. The full field of view of the stereo display may be mono, the full field of view may be stereo, or some combination thereof may be exhibited; for example as shown in FIG. 16 the view of 3D shapes in the left and right images 1648-L and 1648-R may appear three dimensional (being rendered from left and right perspectives, respectively), but the crosshair in front of the 3D shapes may appear two dimensional (being rendered only from a mono perspective). Thus, what portion(s) of the display area and/or the displayed content may vary actively, as controlled and selected in various embodiments.

Figure 20A:
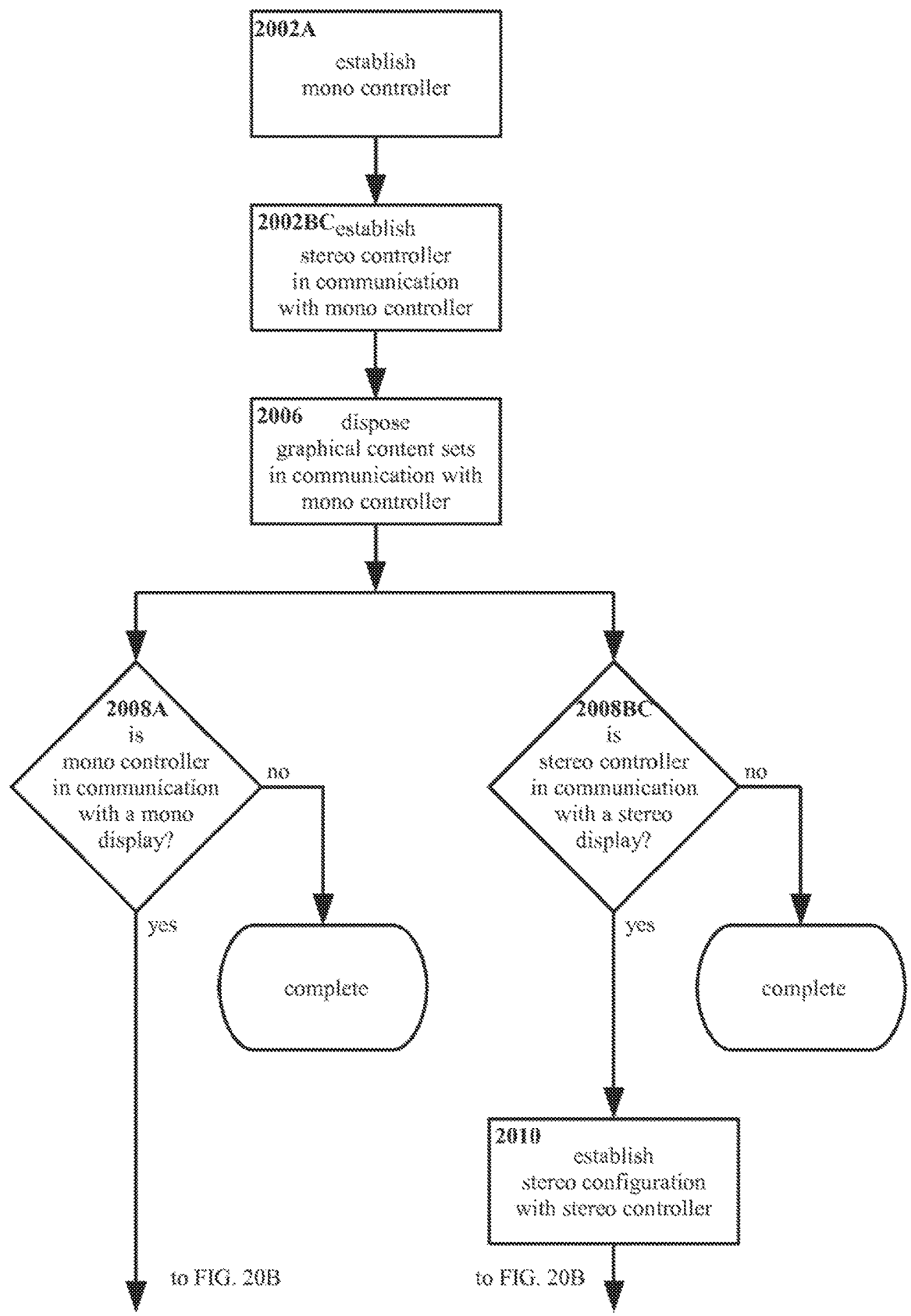
FIG. 20A through FIG. 20C show an example method for delivering mono, stereo and/or mixed mono/stereo content from a mono display and/or a stereo display, in flow chart form.
Figure 20B:
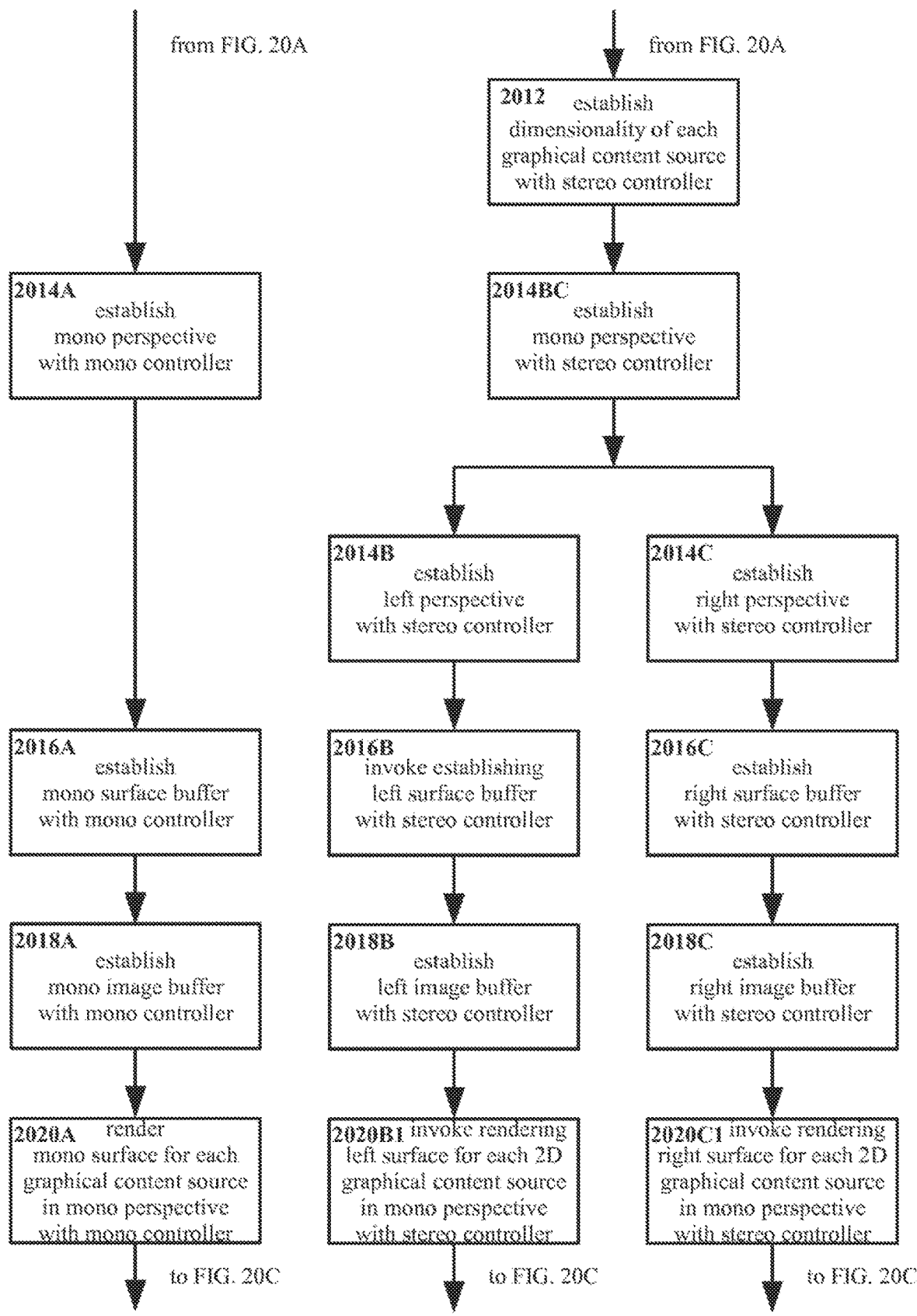
Figure 20C:
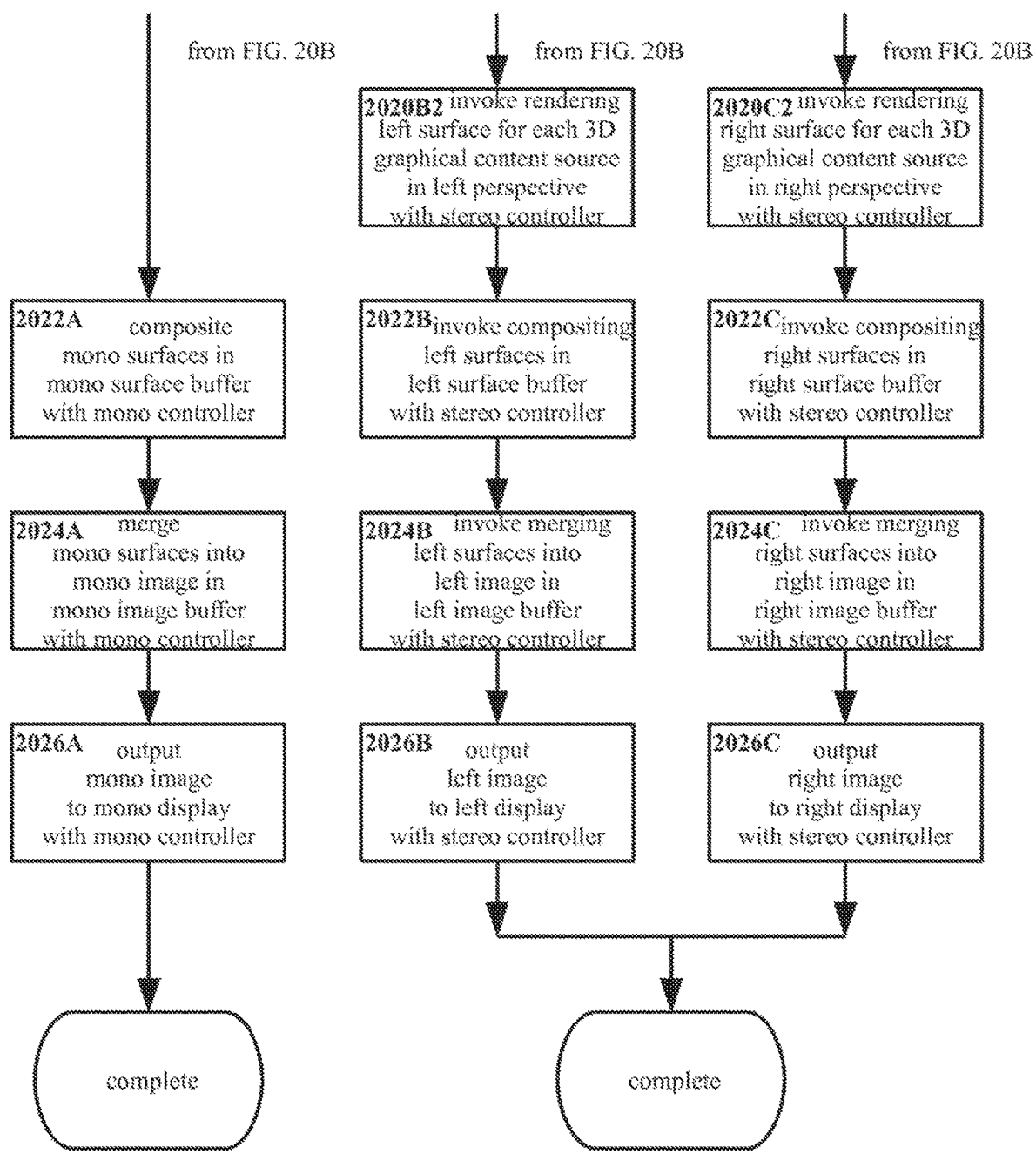

Now with regard to FIG. 20A through FIG. 20C, therein is shown an example method for selectively delivering mono, stereo, and/or mixed mono/stereo content to a mono display and/or a stereo display.

In FIG. 20A, a mono controller is established 2002A. A stereo controller also is established 2002BC in communication with the mono controller. Graphical content sets are disposed 2006 in communication with the mono controller.

Certain previous discussions herein (e.g. FIG. 2A through FIG. 2C) may assume the existence of a stereo display, etc. However, this is an example only. Various embodiments may selectively perform steps enabling output of mono content to a mono display, and/or steps enabling stereo and/or mixed mono/stereo content to a stereo display, based on whether such displays are present. For example, given an arrangement wherein no stereo display is present, it may be that no stereo content is generated for output, even if the stereo controller is present and could in principle generate stereo output. Such a situation may arise, for example, if the mono controller and stereo controller are instantiated on the processor of a smart phone, and the stereo display is physically detachable from the smart phone. For such an arrangement, if the stereo display is not attached to the smart phone (or otherwise is not in communication with the stereo controller, e.g. through a wireless link), then actions necessary for stereo output may not be carried out. Thus, resources such as processor power may not be used to generate stereo output, when such output cannot be displayed (due to the absence of the stereo display).

As an illustrative example of such arrangements, in FIG. 20A the method shown therein splits into two branches, beginning with steps 2008A and 2008BC respectively. For purposes of reference, the branch beginning with step 2008A is referred to herein as the A branch, while the branch beginning with step 2008BC is referred to herein as the BC branch (the BC branch subsequently also may be further divided for reference, as B and C branches described below). However, it is emphasized that the branching structure of the method in FIG. 20A through FIG. 20C is illustrative only, and that other arrangements may be equally suitable. Steps need not necessarily be subdivided as shown into multiple branches.

A determination is made 2008A as to whether the mono controller is in communication with a mono display. If no mono display is present—if the determination 2008A is negative—then the A branch of the method ends. Simply put, if there is no mono display, there may be no advantage in generating output for a mono display. Similarly, a determination is made 2008BC as to whether the stereo controller is in communication with a stereo display. If no stereo display is present—if the determination 2008BC is negative—then the BC branch of the method ends. Again, if there is no stereo display, there may be no advantage in generating output for a stereo display.

Embodiments are not limited with regard to how or by what entity the determinations 2008A and 2008BC may be made. Typically though not necessarily, a mono controller may include therein some capability for determining whether a mono display is in communication therewith. Also typically though not necessarily, the stereo controller may include therein some capability for determining whether a stereo display is in communication therewith. However, other arrangements, including but not limited to arrangements wherein the stereo controller determines and both whether a mono display is present 2008A and whether a stereo display is present 2008BC, may be equally suitable.

In addition, although the example method in FIG. 20A through FIG. 20C explicitly addresses only one mono display and one stereo display, embodiments are not necessarily so limited. Multiple mono displays and/or multiple stereo displays may be supported, and similarly multiple determinations 2008A and 2008BC may be made for multiple displays.

Still with reference to FIG. 20A, if the determination 2008A as to the presence of a mono display is positive—if a mono display is indeed in communication with the mono controller—then the A branch of the method continues in FIG. 20B. If the determination 2008BC as to the presence of a stereo display is positive—if a stereo display is in communication with the stereo controller—then the BC branch of the method continues with establishing 2010 a stereo configuration with the stereo controller. (No analogous step to 2010 is shown explicitly in FIG. 20A, although configuring mono output in some fashion is not prohibited, as previously noted. Typically though not necessarily, such mono configuring, if present, may be carried out transparently by the mono controller. That is, insofar as the mono controller is concerned, mono output may proceed normally, regardless of whether stereo output is also being generated.)

Now with reference to FIG. 20B, in the BC branch the dimensionality of each graphical content source is established 2012 with the stereo controller. (Again, no analogous step to 2012 is shown explicitly in FIG. 20B for the A branch, though such is not prohibited. The A branch addresses mono content for a mono display, thus the dimensionality may not affect how graphical content is handled in the A branch. That is, if everything must be delivered as mono output, determining whether that output is 2D, 3D, etc. may be of limited consequence.)

Continuing in FIG. 20B, in the A branch a mono perspective is established 2014A with the mono controller. In the B branch a mono perspective also is established 2014BC with the stereo controller. The mono perspectives established in steps 2014A and 2014BC are not required to be identical, but may be identical or at least similar. Indeed, in certain embodiments the mono perspective may be established 2014BC by the stereo controller by querying the mono controller for the mono perspective established 2014A thereby, by querying the mono controller as to how the mono perspective was established 2014A thereby, etc. Such an arrangement may be useful in at least some instances, for example if both a mono display and a stereo display are present then the mono content may be handled similarly for output to both the mono display and the stereo display. In such instances, mono content outputted from the mono display may be visually similar or even indistinguishable from mono content outputted from the stereo display. In more colloquial terms, the mono and stereo displays may show mono content "the same way", so that viewers may perceive such content as being likewise "the same".

However, other arrangements also may be suitable.

Again for illustrative purposes, in FIG. 20B the BC branch splits into B and C branches, with the B branch referring to output for the left display of a stereo display, and the C branch referred to output for the right display of a stereo display. Again, this is illustrative only.

In the B branch, a left perspective is established 2014B with the stereo controller. In the C branch, a right perspective is established 2014C with the stereo controller. The left and right perspectives are established 2014B and 2014C so as to enable stereo viewing of output generated in accordance therewith. (No analogous step to 2014B and 2014C is explicitly shown for the A branch in FIG. 20B. Typically a mono controller is not adapted to formulate and/or address multiple perspectives, as mono rendering typically uses, by definition, a single "mono" perspective.

Continuing in FIG. 20B, in the A branch a mono surface buffer is established 2016A with the mono controller. In the B branch a left surface buffer is invoked 2016B to be established with the stereo controller. In the C branch a right surface buffer is invoked 2016C to be established with the stereo controller.

Again in the A branch, a mono image buffer is established 2018A with the mono controller. In the B branch a left image buffer is invoked 2018B to be established with the stereo controller. In the C branch a right image buffer is invoked 2018C to be established with the stereo controller.

In the A branch, a mono surface is rendered 2020A for each graphical content source, in mono perspective, with the mono controller. In the B branch, a left surface is invoked 2020B1 to be rendered for each 2D graphical content source, in mono perspective, with the stereo controller. In the C branch, a right surface is invoked 2020C1 to be rendered for each 2D graphical content source, in mono perspective, with the stereo controller.

Now with reference to FIG. 20C, in the B branch, a left surface is invoked 2020B2 to be rendered for each 3D graphical content source, in left perspective, with the stereo controller. In the B branch, a right surface is invoked 2020C2 to be rendered for each 3D graphical content source, in right perspective, with the stereo controller. (No step directly analogous to 2020B2 and 2020C2 is explicitly shown in the A branch, though such is not prohibited. Typically for a mono source, rendering from multiple perspectives may be impossible and/or of limited interest, e.g. the mono content may "look the same" regardless of view point, mono content may not be visually improved through rendering from two perspectives as opposed to one, etc.)

It is at this point noted that embodiments do not necessarily require that all 3D content sources be rendered in left and right perspectives. It may be equally suitable that some or even all 3D content sources be rendered as if those content sources were entirely 2D. Thus, not all nominally 3D content necessarily will be delivered to a stereo display as stereo 3D output. Certain 3D content may be rendered in mono for so as to de-emphasize that 3D content, or due to limited processing resources, or for other reasons.

Furthermore, 3D content may be only partially rendered from left and right perspectives. For example, a large 3D environment may be split into several regions, such that if delivered as stereo output the central portion of the field of view will appear in stereo 3D, but left and right portions of the field of view will appear in mono (2D). Again, this may serve various functions, e.g. to emphasize the central portion of the field of view, to provide an appearance of 3D output without consuming the resources required for full-screen 3D output, etc.

Thus, 3D content may, in at least certain embodiments, be rendered for mono output (even to a stereo display) rather than for stereo 3D output.

Other arrangements also may be equally suitable.

Still with reference to FIG. 20C, in the A branch the mono surfaces in the mono surface buffer are composited 2022A by the mono controller. In the B branch the compositing of the left surfaces in the left surface buffer is invoked 2022B by the stereo controller. In the C branch the compositing of the right surfaces in the right surface buffer is invoked 2022C by the stereo controller.

In the A branch the mono surfaces are merged 2024A into a mono image in the mono image buffer, by the mono controller. In the B branch the merging of the left surfaces into a left image in the left image buffer is invoked 2024B by the stereo controller. In the C branch the merging of the right surfaces into a right image in the right image buffer is invoked 2024C by the stereo controller.

In the A branch the mono image is outputted 2026A to a mono display with the mono controller. In the B branch the left image is outputted 2026B to the left display (of a stereo display) with the stereo controller. In the C branch the right image is outputted 2026C to the right display (of a stereo display) with the stereo controller.

Subsequent to steps 2026A, 2026B, and 2026C respectively in branches A, B, and C, the method as shown in FIG. 20A through FIG. 20C is shown as complete. However, as noted previously, other steps, repetition of steps, etc. also may be carried out. For example, certain steps shown may be repeated so as to output a sequence of mono, left, and right images so as to update graphics over time, display video, etc.

With mono output, left output, and right output deriving from similar graphical content sources, and processed and outputted as shown, for at least certain embodiments the appearance of the output may be similar on the mono display and the stereo display. That is, the elements that are shown (e.g. the frame, menu bar, battery indicator, 3D objects, crosshair, and time indicator as referred to in certain previous examples) all may be present in both the mono and the stereo display, and may be configured similarly, even if on the mono display all elements are shown in 2D, while on the stereo display elements may be selectively shown in 2D and/or 3D.

Figure 21:
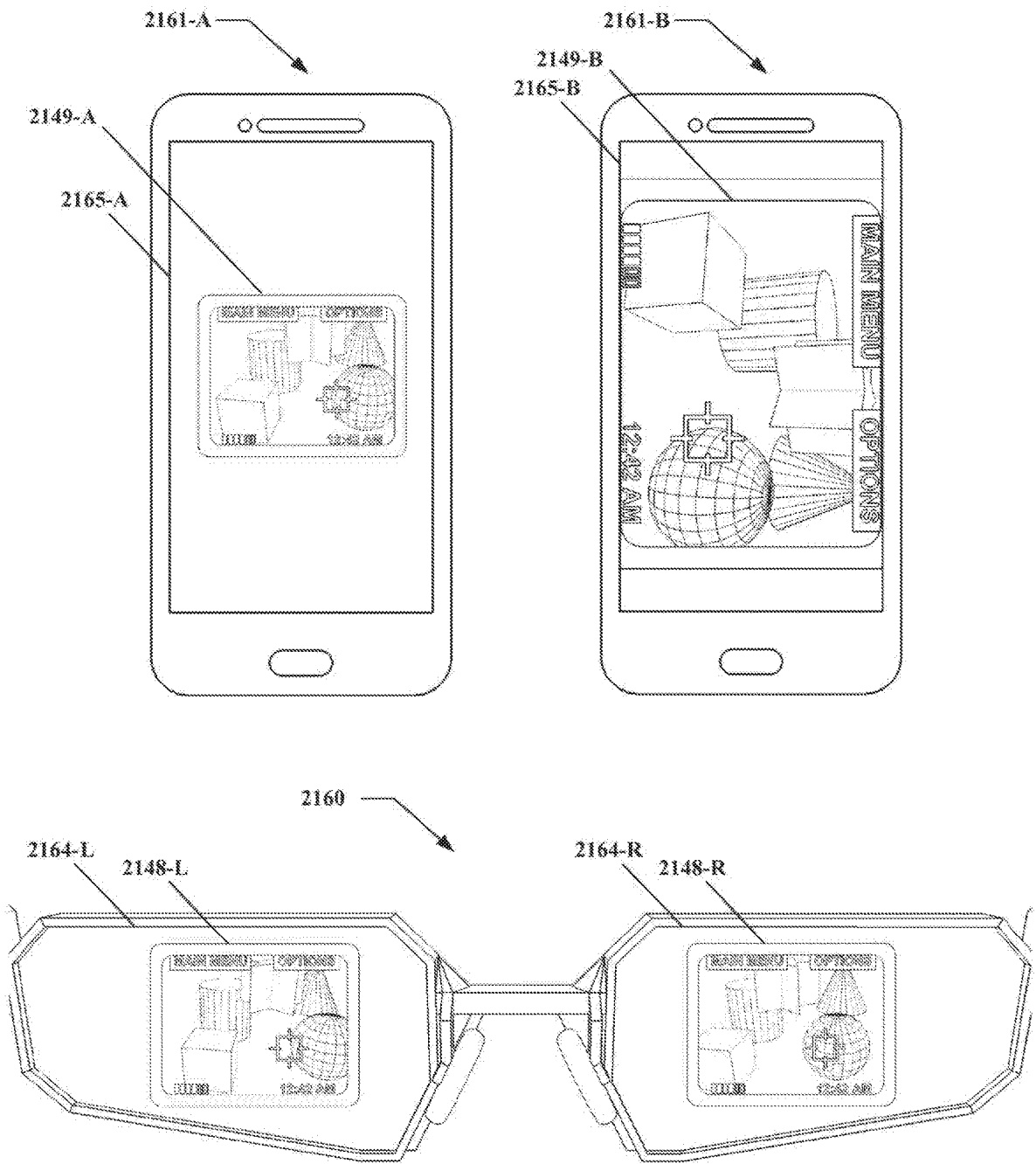
FIG. 21 shows example mono and stereo displays with mono and stereo images outputted therefrom, in perspective view.

For example, with reference to FIG. 21, a smart phone 2161-A is shown therein, with a mono display 2165-A and a mono image 2149-A thereon. A head mounted display 2160 also is shown in FIG. 21, with left and right displays 2164-L and 2164-R and left and right images 2148-L and 2148-R thereon. As may be seen, the mono image 2165-A on the mono display 2165-A appears visually similar to the left and right images 2148-L and 2148-R on the left and right displays 2164-L and 2164-R, e.g. exhibiting similar image content, similar configuration, similar vertical/horizontal ratio, similar size, etc. (although as may be observed, the mono image 2149-A, left image 2148-L, and right image 2148-R each exhibit different perspectives, e.g. a mono, left, and right perspective respectively).

Such similarity of output among displays may be useful for at least certain embodiments. Output from different displays may for example be readily comparable in such instance, if the output "looks similar" or "looks the same" regardless of whether outputted from a stereo or mono display (or likewise whether outputted from one of two or more mono displays, one of two or more stereo displays, etc.). As a more particular example, consider an arrangement wherein output is being viewed simultaneously by multiple persons with multiple devices, some devices having mono displays and some having stereo displays. If that output is similar in appearance regardless of device and/or regardless of display dimensionality (mono or stereo), then at least in principle all persons involved may receive essentially the same imagery. Certain persons may view the imagery in mono, while others view the imagery in stereo and/or mixed mono/stereo, but the imagery itself may be at least sufficiently visually similar as to facilitate common understanding. In more colloquial terms, if everyone sees something similar, everyone may have common ground for purposes of discussion, etc.

However, such similarity is an example, and is not required. As may also be seen in FIG. 21, another smart phone 2161-B is shown therein, with mono display 2165-B and a mono image 2149-B thereon. Although mono image 2149-B bears at least some visual resemblance to left and right images 2148-L and 2148-R, the mono image 2149-B is rotated 90 degrees clockwise, is larger in size, is disposed on the mono display 2165-B such that not all of the mono image 2149-B is visible (e.g. the frame being "clipped off" at the left and right edges of the mono display 2165-B), etc.

Figure 22A:
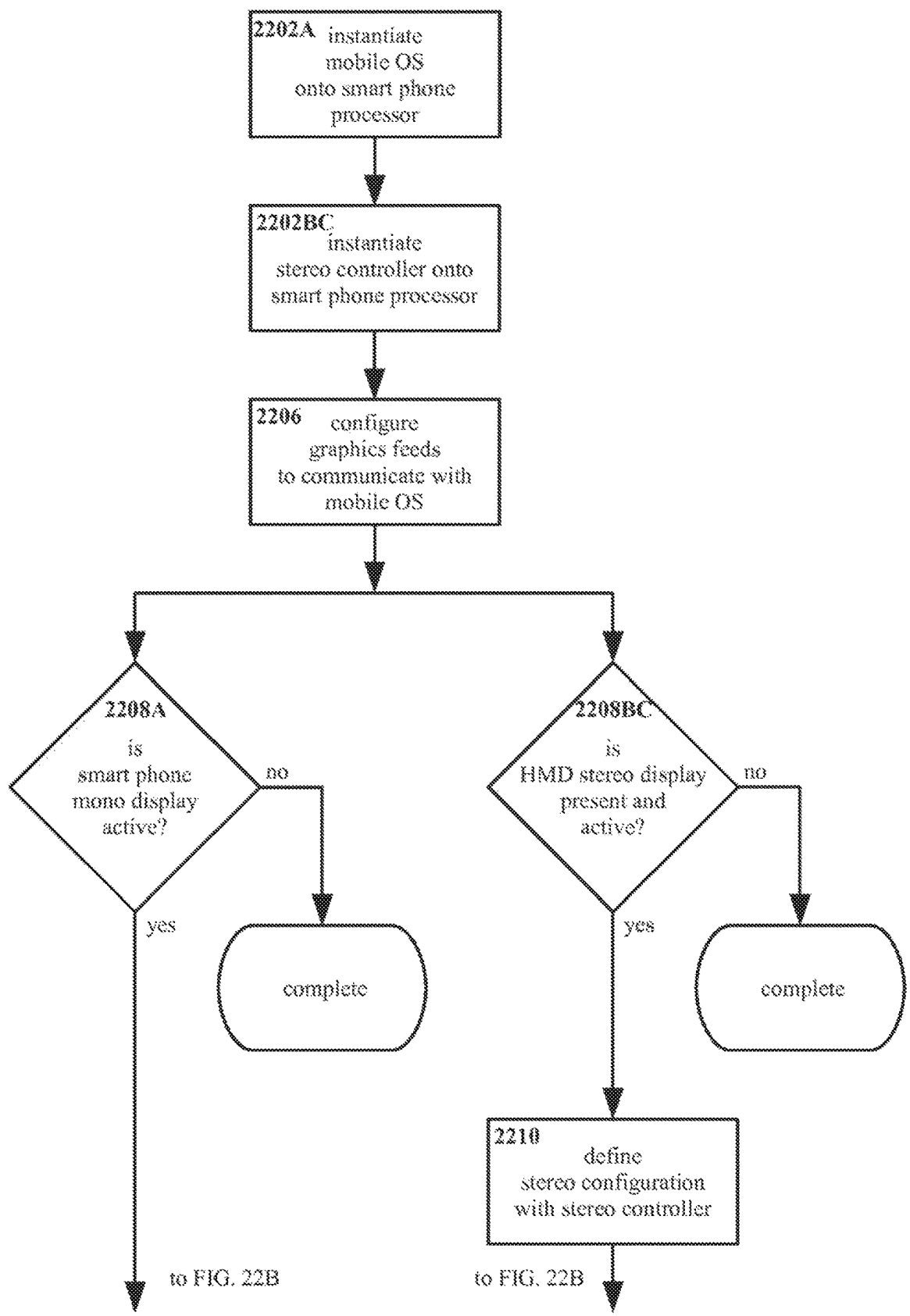
FIG. 22A through FIG. 22C show another example method for delivering mono, stereo and/or mixed mono/stereo content from a mono display and/or a stereo display, in flow chart form.
Figure 22B:
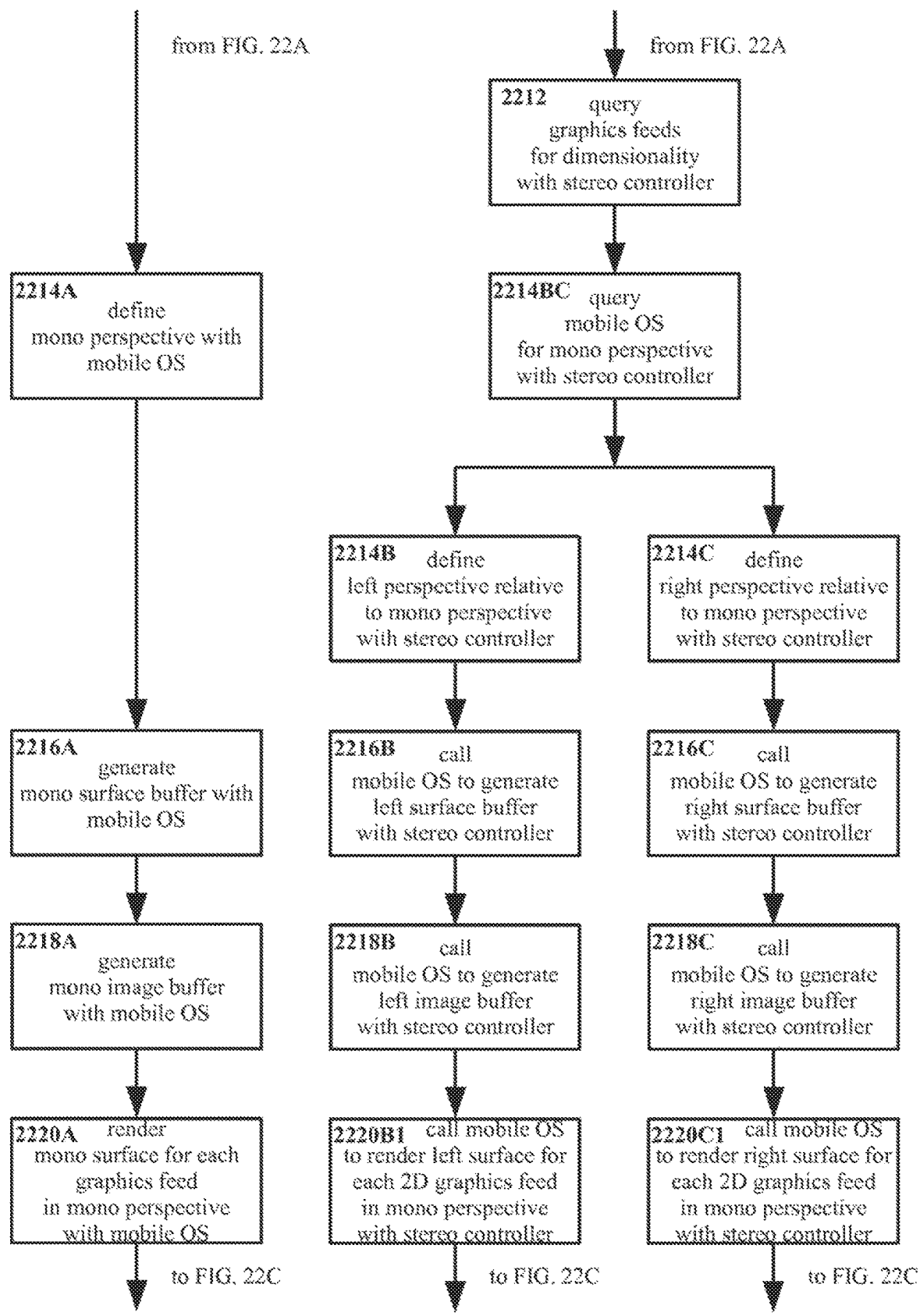
Figure 22C:
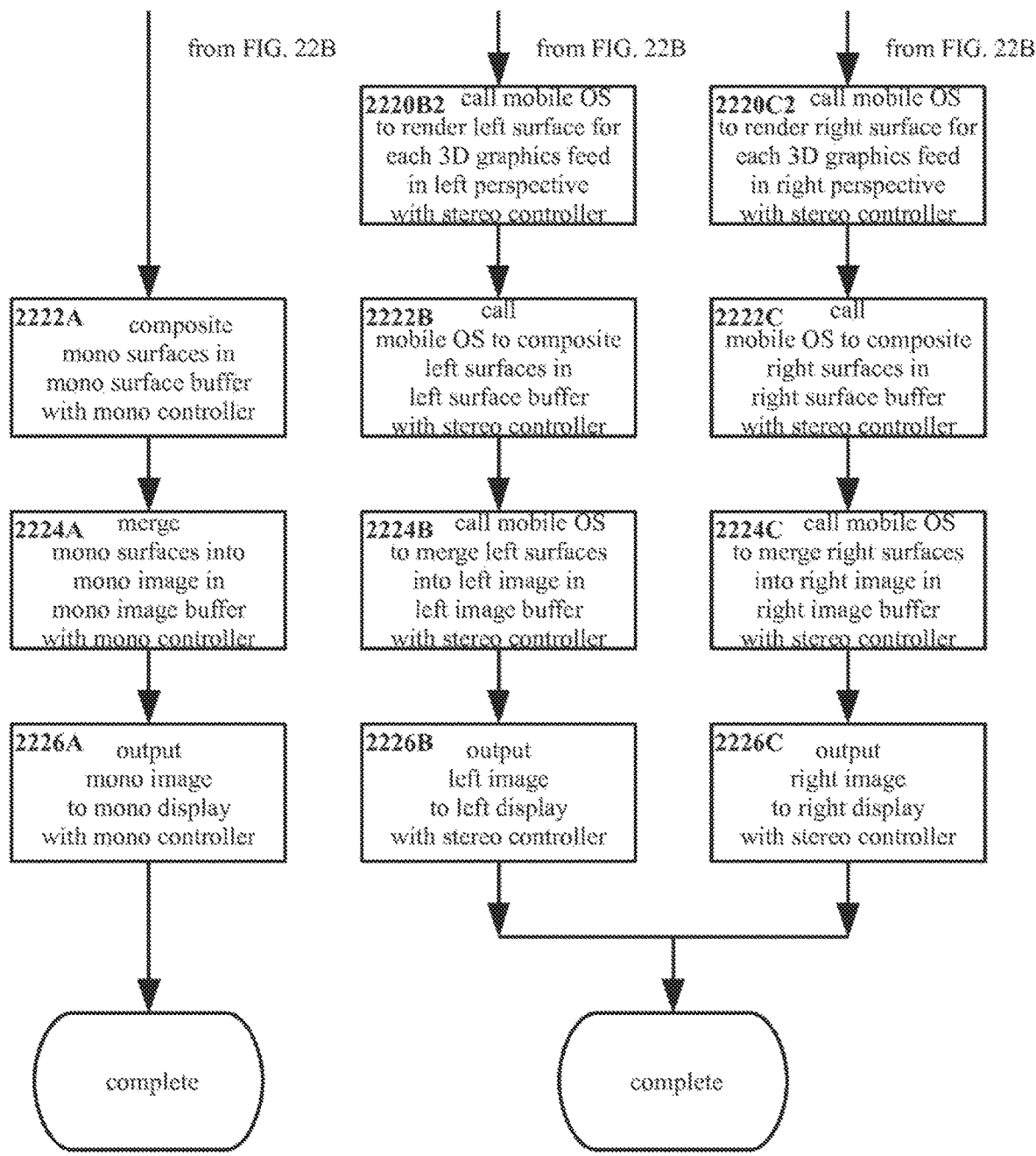

Now with regard to FIG. 22A through FIG. 22C, another example method for selectively delivering mono, stereo, and/or mixed mono/stereo content is presented. Where certain examples described previously herein have addressed such presentation in conceptual terms, FIG. 22A through FIG. 22C and the description thereof address a more concrete example of implementation of such a method. The structure of FIG. 22A through FIG. 22C may be at least somewhat similar to that of FIG. 20A through FIG. 20C, though descriptions in FIG. 22A through FIG. 22C may address more narrowly-defined, concrete embodiments. However, it is emphasized that the arrangement in FIG. 22A through FIG. 22C is also an example only, that embodiments are not limited only thereto, and that other arrangements may be suitable.

In FIG. 22A, a mobile operating system (OS) is instantiated 2202A onto the internal digital processor controlling a smart phone. The smart phone may be, but is not required to be, a conventional electronic device, except as otherwise specified herein (e.g. the presence of a stereo controller according to various embodiments, etc.). Certain smart phones include integral mono displays therein, and such a mono display is considered to be present for purposes of the example herein. A mobile operating system typically may include therein functions adapted for controlling such a mono display, and for carrying out certain actions such as rendering, etc., and/or otherwise functioning as a mono controller. Suitable mobile operating systems may include, but are not limited to, Android, Windows Mobile, and iOS.

Typically though not necessarily, a mobile operating system may be instantiated onto a smart phone processor as part of a boot routine, for example with executable instructions being read from data storage within the phone, and loaded onto the processor. However, the manner by which the mobile operating system is instantiated onto the process is not limiting for various embodiments.

A stereo controller is instantiated 2202BC onto the processor of the smart phone, and disposed in communication with the mobile operating system (e.g. through the processor both are instantiated upon). The stereo controller is an assembly of executable instructions, adapted to be instantiated onto a digital processor. The stereo controller may be considered an overlay onto the mobile operating system, and/or an extension thereto, in that the stereo controller may interface with, control certain functions of, and/or send information to and from, the mobile operating system.

A stereo controller may be specific to a particular mobile operating system. That is, a given stereo controller may be adapted to communicate with a particular mobile operating system such as Android, while a different stereo controller may be adapted to communicate with some other mobile operating system, etc. However, stereo controllers adapted to communicate with multiple distinct mobile operating systems are not excluded.

Typically though not necessarily, the stereo controller may be instantiated onto a smart phone processor similarly to the mobile operating system, e.g. as part of a boot routine with executable instructions being read from data storage within the phone, and loaded onto the processor. However, the manner by which the stereo operating system is instantiated onto the process is not limiting for various embodiments. Indeed, although in the particular example of FIG. 22A the stereo controller is instantiated onto the same processor as the mobile operating system, in other embodiments a stereo controller may be instantiated onto a different processor and/or a different physical device (such as a piece of hardware connected to a smart phone or other system), may be instantiated onto a cloud system that is in communication with the mobile operating system, etc.

Continuing in FIG. 22A, the graphics feeds are configured 2206 to communicate with the mobile operating system. That is, whatever graphics are to be displayed, the sources of those graphics are to be made available to the mobile operating system. This may represent reading data from a flash drive or other data store within the smart phone, connecting the smart phone to some other device through a wired port, communicating wirelessly with some other system, etc. In certain instances configuration may simply amount to advising the mobile operating system that the graphics in question are available and/or are to be displayed, while in others configuration may involve matching communication protocols, converting file types, accessing databases, etc. The particular details are not limiting, so long as the relevant graphics feeds are in some manner made available for use by the mobile operating system.

However, as a more concrete example, the mobile operating system may access a video provider, so as to download streaming video therefrom through a wireless network. As another example, a 3D model of a heart may be located on from a flash drive or other data store by the mobile operating system, accessed by the mobile operating system, and made available for rendering (e.g. by opening an appropriate modeling application, reading a relevant model file directly, etc.). As yet another example, standard graphics and protocols for generating frames, buttons, text boxes, etc. present within the mobile operating system may be called within the mobile operating system so as to enable display of such screen features. The particulars may vary considerably from one embodiment to another, and embodiments are not limited with regard to how graphics feeds are configured 2206, or what entity (the mobile operating system, a user, some other entity, etc.) carries out the configuring.

Still with reference to FIG. 22A, the method as illustrated branches into an A branch and a BC branch. In the A branch, a determination 2208A is made as to whether the integral mono display of the smart phone is active. In certain instances the mono display may be inactive, for example a user may disable a mono display while using a stereo display to save power. If the mono display is inactive—if the determination 2208A is negative—then the A branch of the method as shown in FIG. 22A through FIG. 22C is complete.

If the mono display is active—if the determination 2208A is positive—then the A branch of the method continues in FIG. 22B.

In the BC branch, a determination 2208BC is made as to whether a head mounted display with stereo capability is present and active, e.g. is in communication with the stereo controller. In certain instances such a stereo display may not be present, and/or may be inactive. For example, even if the stereo controller is already instantiated on the smart phone processor, at times a user may choose not to use a stereo display, and may deactivate or even disconnect the stereo display. The stereo controller nevertheless may remain instantiated on the smart phone processor, in the event that a stereo display is again made available. Regardless, if the head mounted stereo display is not present or is inactive—of the determination 2208BC is negative—then the BC branch of the method is complete.

It is noted that although the arrangement in FIG. 22A shows branches of the method as being complete in the event of negative determinations in 2208A and/or 2208BC, it is not necessarily required that further steps in the relevant branches be excluded. Even if no suitable displays are available for mono, stereo, and/or mixed mono/stereo content, processing of such content is not prohibited. Such content may be recorded in a data store, transmitted externally, etc., or even simply ignored/deleted. However, for purposes of clarity, the example arrangement of FIG. 22A through FIG. 22C considers that if suitable displays are not present, then content for such displays is not necessarily generated.

It is also noted that although a head mounted stereo display is presented as an example, embodiments are not limited thereto, any more than embodiments are limited to a smart phone, etc.

If the head mounted stereo display is present and active—if the determination 2208BC is positive—then the BC branch of the method continues with step 2210.

In the BC branch, the stereo controller defines 2210 a stereo configuration. This stereo configuration may represent considerations such as the display size of the head mounted stereo display, the eye separation of the user, the desired apparent stereo baseline of content to be displayed, the degree of stereo overlap between left and right eyes (which may be but is not required to be 100%), the brightness of the display and/or regions thereof, the transparency of the display (if controllable), etc. Stereo vision may be affected by numerous factors, and defining the stereo configuration may include any or all such factors.

Typically, though not necessarily, stereo configuration may be determined at least partially by a user, for example through manipulation of settings made available through the stereo controller. For example, a stereo controller may include therein settings for adjusting the effective eye spacing of displayed content (or even for determining such information automatically by scanning the user). However, regardless of precisely how the information may originate, so long as the stereo controller and/or some entity in communication therewith in some fashion acquires suitable information sufficient for enabling stereo output with a stereo display, this may be considered to represent defining 2210 stereo configuration.

Now moving to FIG. 22B, in the BC branch the stereo controller queries 2212 graphics feeds to determine the dimensionality thereof. Typically though not necessarily, graphics feeds and/or the graphics delivered thereby may include therein an explicit identification of whether the content thereof is two dimensional, three dimensional, etc. Thus, for at least certain embodiments querying 2212 the graphics feeds may include reading metadata, file information, a flag, etc. associated with the graphics feeds, with the dimensionality indicated explicitly therein. However, other approaches, including but not limited to recognizing file types as 2D or 3D, or otherwise inspecting the files, data therein, sources of files and/or data, etc., may be equally suitable.

In addition, the mobile operating system itself may include therein some mechanism for determining the dimensionality of data. For example, it may be useful to a mobile operating system to determine whether content is a simple 2D button, or a complex 3D environment, so as to more effectively render and/or otherwise handle that content (e.g. by accessing suitable rendering tools for the particular content, etc.). Thus, querying 2212 may in certain embodiments include the stereo controller accessing such information from the mobile operating system, rather than the stereo controller directly evaluating the graphics feeds.

Typically, though not necessarily, a mobile operating system may include some protocol for accepting and/or responding to queries about graphical content. For example various programs, libraries, hardware components, etc. may query a mobile operating system in at least a somewhat similar fashion. Thus, for at least certain embodiments the query 2212 may represent the stereo controller sending a common and preconfigured command to the mobile operating system.

Continuing in FIG. 22B, in the A branch the mobile operating system defines 2214A a mono perspective. In practice the mobile operating system may define 2214A more than one mono perspective, for example defining mono perspectives for two or more graphics feeds. As a more concrete example, if two different 3D objects are to be addressed by the mobile operating system, it is not necessarily required that both such 3D objects be viewed from the same direction, the same apparent distance, etc. Furthermore, mono perspectives may vary over time, for example panning, zooming, etc. in response to a command delivered by a user. However for simplicity, the mono perspective may be referred to herein in at least certain instances as being unitary and/or static.

In the BC branch, the stereo controller queries 2214BC the mobile operating system for the mono perspective. Typically though not necessarily, a mobile operating system may include some protocol for accepting and/or responding to queries about mono perspective. For example, various rendering utilities, programs, etc. may perform some or all rendering work on behalf of the mobile operating system, and such entities may require or at least benefit from access to some common mono perspective for rendering content.

By querying the mobile operating system, the stereo controller thus may utilize the same or a similar mono perspective for mono content, such that mono content may appear the same or similar on both the mono and stereo displays. However, other arrangements, including but not limited to the stereo controller determining a mono perspective internally and/or independently of the mobile operating system, also may be suitable.

At this point in FIG. 22B the BC branch is shown as splitting into individual B and C branches. As noted with regard to FIG. 20B, this is illustrative, and should not be taken as limiting.

In the B branch, the stereo controller defines 2214B a left perspective relative to the mono perspective (as queried in step 2214A). In the C branch, the stereo controller defines 2214C a right perspective relative to the mono perspective.

Definition 2214B and 2214C of left and right stereo perspectives may depend at least in part on the definition 2210 of stereo configuration. For example, if the stereo configuration were defined 2210 as having a baseline of 10 cm, then the left and right stereo perspectives may be defined 2214B and 2214C such that a distance between base points thereof is likewise 10 cm.

Left and right stereo perspectives may be fixed for a particular stereo controller and/or a particular stereo head mounted display. However, left and right stereo perspectives also may be variable, and so may be defined 2214B and 2214C more than once (though for simplicity it is considered in FIG. 22A through FIG. 22C that such repetition is not present). Variations may include, but are not limited to, changes in angle and changes in base point separation.

Typically though not necessarily, the left and right perspectives will be offset similarly from the mono perspective, but in opposite directions. For example, if the left perspective is defined as proceeding from point a 3 centimeters to the left of the mono perspective and angled 1.5 degrees to the right, the right perspective may be defined as proceeding from a point 3 centimeters to the right of the mono perspective and angled 1.5 degrees to the left. (This is an example only, and embodiments are not limited thereto with regard either to particular perspectives or forms of definition thereof.)

However, other arrangements, including but not limited to an arrangement wherein the left or right perspective is similar or identical to the mono perspective, also may be suitable.

In addition, for certain embodiments it may be suitable to determine left and right perspectives other than through definition explicitly by the stereo controller. For example, if a system is present within a mobile operating system that is adapted to define a perspective (e.g. the mono perspective), that function may be called by the stereo controller.

Continuing in FIG. 22B, in branch A the mobile operating system generates 2216A a mono surface buffer. Such capability typically may be present in a mobile operating system adapted for mono output to a mono display, such as flat display on a smart phone. For example, executable instructions and/or data may be present within the mobile operating system, sufficient to define a region of memory as a mono surface buffer and to address the buffer e.g. by rendering graphical content to surfaces therein.

In branch B the stereo controller calls 2216B the mobile operating system to generate a left surface buffer, and in branch C the stereo controller calls 2216C the mobile operating system to generate a right surface buffer. That is, in the example of FIG. 22B the stereo controller communicates with the mobile operating system, and activates such functionality in the mobile operating system as may be present for creating surface buffers, such that two surface buffers are generated and designated (e.g. by the stereo controller) as left and right surface buffers.

Thus, where the mobile operating system itself may be capable of only supporting only a mono display, the stereo controller may support additional surface buffers sufficient for stereo display. It may be considered that the stereo controller in some fashion accesses whatever portion of the mobile operating system generates a mono surface buffer, and that the stereo controller utilizes the mobile operating system to further generate left and right surface buffers. The stereo controller may in some sense re-use or re-purpose existing "machinery" in the mobile operating system, so as to produce a function—the output of stereo and/or mixed mono/stereo content—that may be beyond the reach of (and that may never even have been contemplated for) the mobile operating system itself.

Embodiments are not limited with regard to how the surface buffer generation functions of the mobile operating system may be called by the stereo controller. The term "call" refers to communication between the stereo controller and the mobile operating system, so as to access functions present within the mobile operating system, but this may include a broad range of approaches in various embodiments.

Typically, though not necessarily, such approaches may in some manner re-purpose existing capabilities of the mobile operating system. That is, if the mobile operating system has the capability to create a mono surface buffer, then the stereo controller may activate that capability, causing the mobile operating system to create a surface buffer, but with the stereo controller having set aside memory space for that surface buffer, identifying that surface buffer as a left (or right) stereo surface buffer, subsequently addressing left or right stereo renders thereto, etc. Put differently, the stereo controller may in at least some embodiments rely on the ability of the mobile operating system to create a mono surface buffer, but may re-purpose that surface buffer for delivering stereo output.

One example of such an approach may be to "spoof" the mobile operating system, such that the mobile operating system considers that additional displays are present in addition to the integral mono display of the smart phone (e.g. defining "virtual" displays and advising the mobile operating system of the presence of such virtual displays as if the virtual displays were real/physical displays). As noted, certain mobile operating systems may include therein functionality for creating a surface buffer. In addition, certain mobile operating systems may include command paths, protocols, etc. for external agents to cause the mobile operating system to create a surface buffer. For example, although the integral mono display of a smart phone may indeed be part of the smart phone itself, in strict terms that mono display may be an external device insofar as the mobile operating system is concerned, in that the mobile operating system is instantiated on the processor and the mono display is external thereto. Thus some arrangement may be provided within the mobile operating system such that if a display is placed in communication therewith, the mobile operating system may then recognize and create surface buffers (and perform other functions) for that display.

Thus, command pathways, protocols, etc. may be readily available for the use of the stereo controller. In such instance the stereo controller may identify the presence of two additional displays, and request that surface buffers be created to support those additional displays. Those additional displays may be real left and right stereo displays (e.g. on the head mounted display referenced for the example of FIG. 22A through FIG. 22C), but may also be virtual displays, for example existing only as data constructs.

Alternately, a command path and/or protocol may be present in the mobile operating system for prompting the generation of surface buffers without necessarily indicating the presence of additional displays (real or virtual). As another alternative, if no convenient avenue for calling 2216B and 2216C the mobile operating system to generate additional surface buffers is present within the mobile operating system, the stereo controller instead may directly activate whatever executable instructions in the mobile operating system are adapted to generate surface buffers. As yet another alternative, executable instructions for generating surface buffers in the mobile operating system may be copied by the stereo controller, and then executed to generate left and right surface buffers.

Other arrangements also may be equally suitable.

It is noted that although the mobile operating system may be carrying out the direct work of generating the left and right surface buffers, that generation is called 2216B and 2216C and overseen by the stereo controller. Typically a mobile operating system dedicated to mono display may lack provision for handling such additional (e.g. left and right) surface buffers as may be utilized for stereo display. Thus, the stereo controller may set aside memory for the left and right surface buffers, may identify surface buffers as left and right surface buffers, etc. The mobile operating system may not even be "aware" of the creation of the left and right surface buffers, despite carrying out the actual generation thereof.

Other embodiments wherein the stereo controller directly generates left and right surface buffers are not prohibited. However, in calling 2216B and 2216C the mobile operating system to generate left and right surface buffers, it is not necessary for the stereo controller to include executable instructions for generating left and right surface buffers. In more colloquial terms, if the mobile operating system already has the code to produce surface buffers, then there may be no need to duplicate such functions in the stereo controller.

In addition, if the mobile operating system is called 2216B and 2216C to generate the left and right surface buffers, then it may be anticipated with at least reasonable confidence that the left and right surface buffers will correspond with the mono surface buffer in terms of format, data protocols, etc. Consistency among mono, left, and right buffers thus may be facilitated, which in turn may facilitate similar-appearing output from both the mono display (on the smart phone) and the stereo display (on the head mounted display).

However, these are examples only, and other arrangements may be equally suitable. Any function that may be accomplished through calling the mobile operating system may be permitted to be accomplished by calling the mobile operating system, regardless of whether such a function is called in FIG. 22A through FIG. 22C (or elsewhere herein). Thus, determining left and right perspectives, outputting left and right images, etc. may in certain embodiments by carried out through calling a mobile operating system (or other mono controller) rather than necessarily being carried out more directly by the stereo controller. Conversely, any function that may be accomplished directly by the stereo controller rather than by calling the mono controller also may be permitted to be accomplished directly by the stereo controller. Embodiments are not limited in this regard, unless specifically noted herein.

Still with reference to FIG. 22B, in the A branch the mobile operating system generates 2218A a mono image buffer. In the B branch the stereo controller calls 2218B the mobile operating system to generate a left image buffer. In the C branch the stereo controller calls 2218C the mobile operating system to generate a right image buffer.

As noted with regard to the generation of surface buffers above, functionality may already be present within the mobile operating system to generate a suitable image buffer. However, the mobile operating system typically may be unsuited to and/or incapable of supporting additional image buffers. Rather, the stereo controller may make provision for left and right image buffers, but may rely on any existing functionality for actually generating the image buffers as may be present within the mobile operating system.

Similarly to calling 2216B and 2216C generation of left and right surface buffers described above, calling 2218B and 2218C generation of image buffers may be carried out in a variety of manners for various embodiments. For example, the mobile operating system may be informed (correctly or not) of the presence of additional displays by the stereo controller; the mobile operating system may be commanded to generate image buffers by the stereo controller without necessarily indicating the presence of displays; the executable instructions in the mobile operating system responsible for generating image buffers may be activated directly by the stereo controller; the executable instructions in the mobile operating system responsible for generating image buffers may be copied; etc.

Also similarly, calling 2218B and 2218C the mobile operating system to generate image buffers may exhibit advantages. For example, the stereo controller may be freed from duplicating already-existing functions within the mobile operating system, consistency of the image buffers and/or displayed content may be facilitated, etc.

However, again, it is not prohibited for other embodiments to generate image buffers directly with the stereo controller and/or other entities, without recourse to the mobile operating system (or other mono controller), and other arrangements may be suitable.

Continuing in FIG. 22B, in the A branch the mobile operating system renders 2220A a mono surface for each graphics feed, from the mono perspective. In the B branch the stereo controller calls 2220B1 the mobile operating system to render a left surface for each 2D graphics feed, from a mono perspective. In the C branch the stereo controller calls 2220C1 the mobile operating system to render a right surface for each 2D graphics feed, from a mono perspective.

As noted above with regard to certain other steps in FIG. 22A through FIG. 22C, functionality may already be present within the mobile operating system to render surfaces from some perspective, although the mobile operating system typically may be unsuited to and/or incapable of addressing multiple surface buffers, etc. The stereo controller may make provision for addressing renders to left and right surface buffers, but may rely partly or entirely on existing functionality for actually rendering surfaces as may be present within the mobile operating system.

Similarly certain other steps in FIG. 22A through FIG. 22C, calling 2220B 1 and 2220C1 the mobile operating system to render to surfaces may be carried out in a variety of manners for various embodiments, by "spoofing" the mobile operating system, by calling rendering routines, by commanding the execution of particular instructions, by copying executable instructions, etc.

In addition, although for simplicity FIG. 22B refers to rendering as being carried out by the mobile operating system, in practice it also may be acceptable for the mobile operating system to in turn call other entities, for example calling a rendering engine that may not be considered part of the mobile operating system proper, etc. Similar "extended calling" and other use of additional entities and/or resources is not prohibited for rendering, nor for other steps herein, unless specifically noted.

Also similarly to certain previous steps, calling 2220B1 and 2220C1 the mobile operating system to render graphics feeds to left and right surfaces may exhibit advantages over (for example) rendering graphics feeds to surfaces directly by the stereo controller. For example, duplication of effort, consistency may be facilitated, etc. However it also is not prohibited for the stereo controller to render surfaces directly.

Now with reference to FIG. 2C, in the B branch the stereo controller calls 2220B2 the mobile operating system to render a left surface for each 3D graphics feed, from a left perspective. In the C branch the stereo controller calls 2220C2 the mobile operating system to render a right surface for each 3D graphics feed, from a right perspective.

As noted above, functionality may already be present within the mobile operating system to render surfaces from some perspective, although the mobile operating system typically may be unsuited to and/or incapable of addressing multiple surface buffers, addressing multiple perspectives (e.g. left and right), etc. The stereo controller may make provision for addressing renders to left and right surface buffers, for advising the mobile operating system as to the perspectives (left and right) for rendering, etc., but may rely partly or entirely on existing functionality for actually rendering surfaces as may be present within the mobile operating system.

Similarly to certain other steps in FIG. 22A through FIG. 22C, calling 2220B2 and 2220C2 the mobile operating system to render to surfaces may be carried out in a variety of manners for various embodiments, by "spoofing" the mobile operating system, by calling rendering routines, by commanding the execution of particular instructions, by copying executable instructions, etc.

It is also noted in various embodiments, 3D content may for example be rendered as 2D content. Thus, some or all of a graphics feed that includes 3D content may instead be rendered in 2D, e.g. as mono surfaces. Although for simplicity the arrangement in FIG. 22A through FIG. 22C refers to graphics feeds as being either 2D or 3D, and being rendered on that basis, embodiments are not necessarily limited to such strictly-defined arrangements.

Also similarly to certain previous steps, calling 2220B2 and 2220C2 the mobile operating system to render graphics feeds to left and right surfaces may exhibit advantages over (for example) rendering graphics feeds to surfaces directly by the stereo controller. For example, duplication of effort, consistency may be facilitated, etc. However it also is not prohibited for the stereo controller to render surfaces directly.

Continuing in FIG. 22C, in the A branch the mobile operating system composites 2222A the mono surfaces in the mono surface buffer. In the B branch the stereo controller calls 2222B the mobile operating system to composite the left surfaces in the left surface buffer. In the C branch the stereo controller calls 2222C the mobile operating system to composite the right surfaces in the right surface buffer.

As noted with regard to other steps in FIG. 22A through FIG. 22C, functionality may already be present within the mobile operating system to composite surfaces, although the mobile operating system typically may be unsuited to and/or incapable of addressing multiple surface buffers for compositing. For example, the mobile operating system may already be adapted to rearrange surfaces in a mono surface buffer, to reposition surfaces with respect to one another, etc., but may have no provision for retaining multiple buffers in memory, addressing and/or synchronizing compositing for multiple buffers, etc. Rather, the stereo controller may make provision for addressing the left and right surface buffers for compositing, but may rely partly or entirely on existing functionality in the mobile operating system for actual compositing.

The stereo controller also may, but is not required to, support additional functions, for example synchronizing compositing for mono, left, and right surface buffers such that surfaces have similar orders in the mono, left, and right surface buffers once composited, that surfaces in the mono, left, and right surface buffers are spatially arranged in similar manner, etc.

Similarly to certain other steps in FIG. 22A through FIG. 22C, calling 2222B and 2222C the mobile operating system to composite surfaces may be carried out in a variety of manners for various embodiments, by "spoofing" the mobile operating system, by calling compositing routines, by commanding the execution of particular instructions, by copying executable instructions, etc.

Also similarly to certain previous steps, calling 2222B and 2222C the mobile operating system to composite left and right surfaces may exhibit advantages over (for example) compositing left and right surfaces directly by the stereo controller. For example, duplication of effort may be avoided, consistency may be facilitated, etc. However it also is not prohibited for the stereo controller to composite surfaces directly.

Still with reference to FIG. 22C, in the A branch the mobile operating system merges 2224A the mono surfaces into a mono image in the mono image buffer. In the B branch the stereo controller calls 2224B the mobile operating system to merge the left surfaces into a left image in the left image buffer. In the C branch the stereo controller calls 2224C the mobile operating system to merge the right surfaces into a right image in the right image buffer.

Again as noted with regard to other steps, functionality may already be present within the mobile operating system to merge surfaces into an image, although the mobile operating system typically may be unsuited to and/or incapable of addressing multiple surface buffers and/or image buffers for merging. The stereo controller may make provision for addressing the left and right surface buffers and/or left and right image buffers for merging, but may rely partly or entirely on existing merge functionality in the mobile operating system.

Similarly to certain other steps, calling 2224B and 2224C the mobile operating system to merge surfaces may be carried out in a variety of manners for various embodiments, by "spoofing" the mobile operating system, by calling merging routines, by commanding the execution of particular instructions, by copying executable instructions, etc.

Also similarly to certain previous steps, calling 2224B and 2224C the mobile operating system to merge left and right surfaces may exhibit advantages over (for example) merging left and right surfaces directly by the stereo controller. For example, duplication of effort may be avoided, consistency may be facilitated, etc. However it also is not prohibited for the stereo controller to composite surfaces directly.

Continuing in FIG. 22C, in the A branch the mobile operating system outputs 2226A the mono image from the mono image buffer to the integral mono display of the smart phone. In the B branch the stereo controller outputs 2226B the left image from the left image buffer to the left display of the stereo head mounted display. In the C branch the stereo controller outputs 2226C the left image from the left image buffer to the left display of the stereo head mounted display.

Functionality may already be present within the mobile operating system to output a mono image to the mono display. The stereo controller thus may include functionality to output left and right images to left and right displays, respectively. However, although the arrangement in FIG. 22C indicates that the stereo controller directly outputs left and right images to left and right displays, other arrangements may be equally suitable, including but not limited to calling the mobile operating system to output left and right images to left and right displays.

Figure 23:
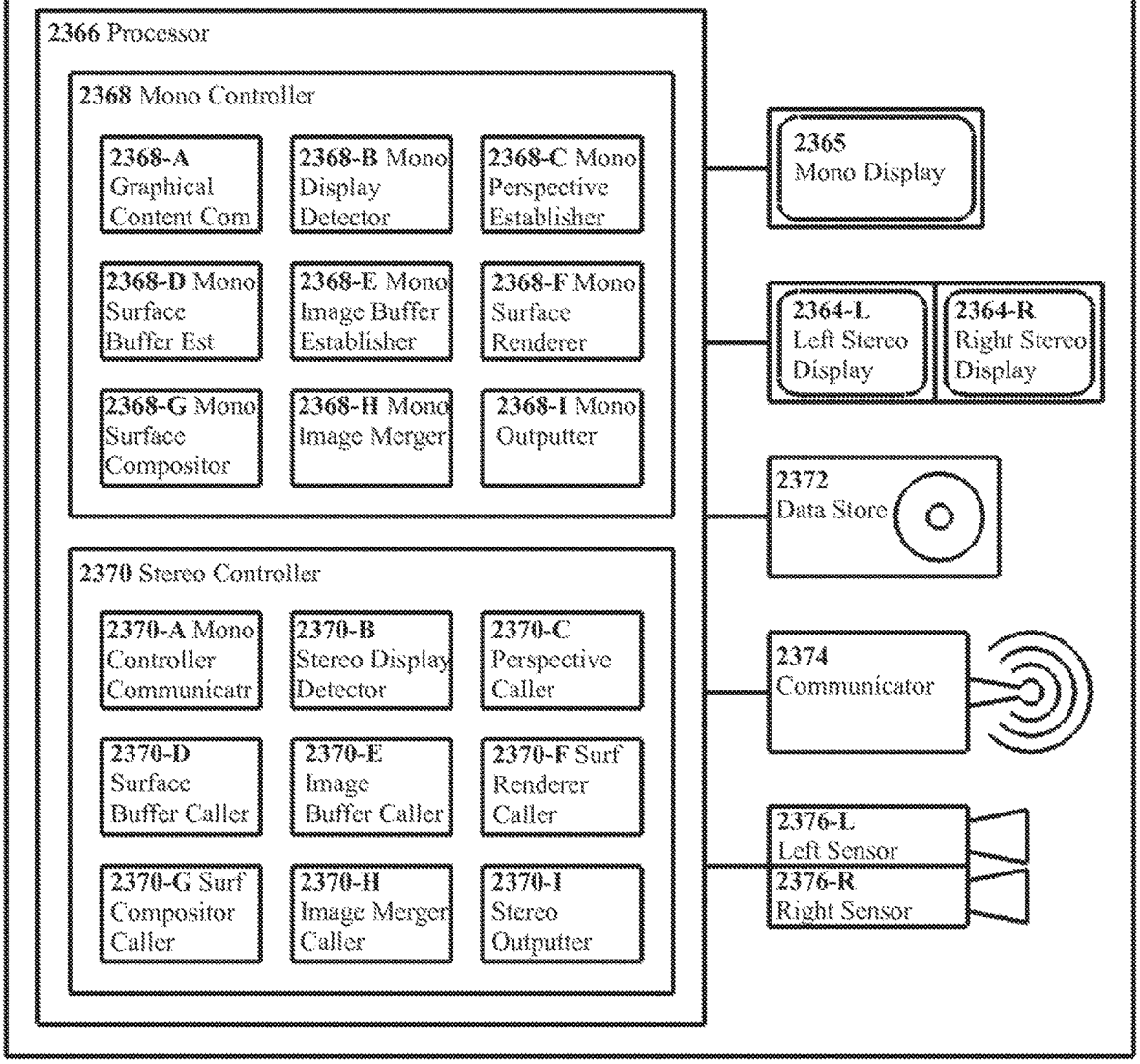
FIG. 23 shows an example integral apparatus for delivering mono, stereo and/or mixed mono/stereo content from a mono and/or a stereo display, in schematic form.

Now with reference to FIG. 23, therein is shown an example embodiment of an apparatus 2360 for stereo and/or mixed mono/stereo output, in schematic form. As shown, the apparatus 2360 includes a processor 2366, adapted to execute executable instructions instantiated thereon. The processor 2366 is not limited with regard to form, structure, etc. The processor 2366 may for example be a digital electronic processor, such as may be present in a smart phone, tablet, laptop computer, desktop computer, etc., but other arrangements also may be suitable.

The apparatus 2360 also includes a mono display 2365, and left and right stereo displays 2364-L and 2364-R; although identified separately in FIG. 23, the pair 2364-L and 2364-R may be considered, in at least some sense, to form a single display. The mono display 2365 is adapted to deliver graphical output in mono form, and the left and right stereo displays 2364-L and 2364-R are adapted to deliver graphical output in mono forma and/or in stereo form. Embodiments are not limited with regard to the form, structure, etc. of the mono display 2365 and/or the stereo display 2364-L and 2364-R. For example, the displays 2365, 2364-L, and 2364-R may include LED or OLED displays, CRT displays, plasma displays, laser displays, etc., though other arrangements may be equally suitable.

In addition, the example apparatus 2360 as-illustrated also includes a data store 2372, a communicator 2374, and left and right sensors 2376-L and 2376-R. The data store 2372, communicator 2374, and left and right sensors 2376-L and 2376-R may serve for example as sources of graphical content, e.g. images, video, text, icons, etc. may be read from the data store 2372, received via the communicator 2374, captured with the left and right sensors 2376-L and 2376-R, etc. However, other graphical content sources may be equally suitable; a data store 2372, communicator 2374, and/or left and right sensors 2376-L and 2376-R are not necessarily required for all embodiments, nor are the data store 2372, communicator 2374, and left and right sensors 2376-L and 2376-R necessarily limited only to operating as graphical content sources.

In addition, where such features are present embodiments are not limited with regard to the form, structure, etc. of a data store 2372, a communicator 2374, and/or left and right sensors 2376-L and 2376-R. A data store 2372 may for example include a hard drive, flash memory, etc. A communicator 2374 may include a hardwired connection, wireless modem, etc. Left and/or right sensors 2376-L and 2376-R may include digital or analog cameras, depth cameras, depth sensors, etc. Other arrangements also may be equally suitable.

Still with reference to FIG. 23, as may be seen data entities 2368 and 2370 are shown disposed on the processor 2366, namely a mono controller 2368 and a stereo controller 2370. The mono controller 2368 and stereo controller 2370 may include executable instructions instantiated on the processor, non-executable data, some combination thereof, etc. With regard to the example shown in FIG. 23 the mono controller 2369 and stereo controller 2370 are described as including executable instructions, but other arrangements may be equally suitable.

The mono controller 2368 is shown as further including therein a number of data entities 2368-A through 2368-I. Likewise, the stereo controller 2370 is shown as further including therein a number of data entities 2370-A through 2370-I. Although as illustrated the data entities 2368-A through 2368-I and 2370-A through 2370-I are shown as being disposed within and/or components of larger data entities, i.e. the mono controller 2368 and stereo controller 2370 respectively, this is illustrative only. Embodiments are not limited with regard to the organization and/or structure of the mono controller 2368 and stereo controller 2370, nor with regard to elements thereof. For example in certain embodiments data entities 2370-A through 2370-I may be independent data entities, e.g. separate programs, with the stereo controller 2370 being only a collective term applied thereto rather than an integrated data entity or other structure in itself. Likewise, data entities as shown in FIG. 23 may be combined, further split, etc. in various embodiments, so long as suitable functions are carried out. In addition, data entities may be added to and/or deleted from what is shown in FIG. 23. For example, for an embodiment wherein the presence of a mono display may be assumed, the mono display detector 2368-B may be omitted. Conversely, though the mono surface renderer 2368-F is shown as a single data entity, embodiments may include multiple rendering elements, such as rendering engines, libraries, other resources, etc. Moreover, entities referenced but not explicitly illustrated may be present; for example, a mono surface buffer, e.g. as established by the mono surface buffer establisher 23368-D, may be part of and/or considered with the mono controller 2368, for example being assigned memory space within the memory controller/occupied by the mono controller 2368 itself (though such is not required).

With regard individually to the data entities 2368-A through 2368-I in the mono controller 2368 in FIG. 23, a graphical content communicator 2368-A is disposed on the processor 2366; the graphical content communicator 2368-A is adapted to communicate with graphical content sources, for example so as to send requests and/or instructions thereto, to receive graphical content therefrom, to query regarding the form or status of graphical content, etc. A mono display detector 2368-B is disposed on the processor 2366; the mono display detector 2368-B is adapted to detect the presence of one or more mono displays in communication with the mono controller 2368, the processor 2366, the apparatus 2360 as a whole, etc. The mono display detector 2368-B also may determine additional information regarding mono displays as may be present, such as display resolution, color bit depth, dimensions, etc., though this is not required.

A mono perspective establisher 2368-C is disposed on the processor 2366; the mono perspective establisher 2368-C is adapted to define or otherwise establish one or more mono perspectives for graphical content, e.g. so as to facilitate rendering of graphical content from a mono perspective. A mono surface buffer establisher 2368-D is disposed on the processor 2366; the mono surface buffer establisher 2368-D is adapted to assign memory for, define, and/or otherwise establish a surface buffer adapted to receive one or more renders onto surfaces thereof, e.g. renders from a mono perspective. A mono image buffer establisher 2368-E is disposed on the processor 2366; the mono image buffer establisher 2368-E is adapted to assign memory for, define, and/or otherwise establish an image buffer adapted to receive one or more images therein.

A mono surface renderer 2368-F is disposed on the processor 2366; the mono surface renderer 2368-F is adapted to render graphical content, e.g. from a mono perspective, onto surfaces such as may be present within a surface buffer. A mono surface compositor 2368-G is disposed on the processor 2366; the mono surface compositor 2368-G is adapted to composite surfaces such as may be present in a mono surface buffer, for example ordering surfaces, realigning surfaces, scaling surfaces, etc. A mono image merger 2368-H is disposed on the processor 2366; the mono image merger 2368-H is adapted to merge one or more surfaces, such as may be present in a mono surface buffer, into an image, and/or to deliver such an image to a mono image buffer.

A mono outputter 2368-I is disposed on the processor 2366; the mono outputter 2368-I is adapted to output an image, such as may be present in a mono image buffer, to a mono display 2365.

With regard individually to the data entities 2370-A through 2370-I in the stereo controller 2370 in FIG. 23, a mono controller communicator 2370-A is disposed on the processor 2366; the mono controller communicator 2370-A is adapted to communicate with a mono controller 2368, for example to receive graphical content therefrom, to send commands and/or queries thereto, etc. The mono controller communicator 2370-A also may be adapted to determine a dimensionality of graphical content, e.g. by querying the graphical content communicator 2368-A in the mono controller 2368. In certain embodiments the mono controller communicator 2370-A may be adapted to address the mono controller 2368 in a manner other than may be typical for the operation of the mono controller 2368, for example the mono controller communicator 2370-A may be adapted to "spoof" the mono controller 2368 by sending spurious instructions thereto, calling or otherwise accessing functions within the mono controller 2368 not normally available to external entities, etc.

It is emphasized that the configuration for the processor 2366, the mono controller 2368, and the stereo controller 2370 as shown in FIG. 23 is an example only. As shown, the mono controller 2368 and the stereo controller 2370 are both disposed on the same processor 2366, mono controller 2368 and the stereo controller 2370 are distinct from one another, and mono controller 2368 and the stereo controller 2370 each integrate all of their respective elements. However, none of these arrangements are required (and certain alternatives, though not necessarily the only alternatives, are shown elsewhere herein).

For example, in certain embodiments the mono controller 2368 and the stereo controller 2370 may themselves be integrated, e.g. as part of a single piece of software. As a more concrete example, an existing mono controller 2368 such as Android or another a mobile operating system may be modified, so as to include some or all functions and/or elements of a stereo controller 2370. In such instance, if the stereo controller 2370 were to call the mono controller 2368, the mono controller may in fact only be calling other instructions within a single program, rather than calling another program. Given such an arrangement, it may not be necessary or useful to "spoof" or otherwise access functions in the mono controller 2368 that are not normally available to external entities, since in such an arrangement the stereo controller 2370 may not in fact be an external entity but rather part of the same operating system, program, etc.

Similarly, the mono controller 2368 and the stereo controller 2370 may be broken down into segments, spread across multiple processors, distributed throughout a cloud, etc. Although the mono controller 2368 and the stereo controller 2370 are described in at least some instances herein as clearly distinct entities for clarity in explaining certain functions thereof, embodiments are not so limited, nor are embodiments limited only to the arrangements shown and described herein.

Still with reference to FIG. 23, a stereo display detector 2370-B is disposed on the processor 2366; the stereo display detector 2370-B is adapted to detect the presence of one or more stereo displays in communication with the stereo controller 2370, the processor 2366, the apparatus 2360 as a whole, etc. The stereo display detector 2370-B may establish a stereo configuration, e.g. at least in part through communicating with the stereo display so as to determine features such as display resolution, color bit depth, dimensions, spacing between left and right displays (or otherwise establishing stereo configuration), etc., and/or through reading settings therefrom and/or to be applied thereto such as degree of overlap of left and right stereo fields of view, etc.

A perspective caller 2370-C is disposed on the processor 2366; the perspective caller 2370-C is adapted to call the mono controller 2368, e.g. the mono perspective establisher 2368-C in particular, to define or otherwise establish one or more pairs of left and right stereo perspectives for graphical content, for example so as to facilitate rendering of graphical content from a mono perspective. The perspective caller 2370-C may also be adapted to provide additional information, oversight, control, etc. as needed to an extent that the mono controller 2368 may not be sufficient to establish left and right stereo perspectives. Thus, in the arrangement of FIG. 23 the perspective caller 2370-C may call upon an existing ability of the mono controller 2368 to define perspectives, repurposing that ability so as to accomplish the definition of left and right stereo perspectives (which task the mono controller on its own may be insufficient to carry out).

A surface buffer caller 2370-D is disposed on the processor 2366; the surface buffer caller 2370-D is adapted to call the mono controller 2368, e.g. the mono surface buffer establisher 2368-D in particular, to define or otherwise establish left and right surface buffers adapted to receive one or more left and right renders respectively onto surfaces thereof, e.g. renders from left and right perspectives. The surface buffer caller 2370-D may also be adapted to provide additional information, oversight, control, etc. as needed to an extent that the mono controller 2368 may not be sufficient to establish left and right surface buffers. Thus, in the arrangement of FIG. 23 the surface buffer caller 2370-D may call upon an existing ability of the mono controller 2368 to create surface buffers, repurposing that ability so as to accomplish the creation of left and right stereo surface buffers (which task the mono controller on its own may be insufficient to carry out).

An image buffer caller 2370-E is disposed on the processor 2366; the image buffer caller 2370-E is adapted to call the mono controller 2368, e.g. the mono image buffer establisher 2368-E in particular, to define or otherwise establish left and right image buffers adapted to receive one or more left and right images respectively therein, e.g. merged from left and right surfaces. The image buffer caller 2370-E may also be adapted to provide additional information, oversight, control, etc. as needed to an extent that the mono controller 2368 may not be sufficient to establish left and right image buffers. Thus, in the arrangement of FIG. 23 the image buffer caller 2370-E may call upon an existing ability of the mono controller 2368 to create image buffers, repurposing that ability so as to accomplish the creation of left and right stereo image buffers (which task the mono controller on its own may be insufficient to carry out).

A surface renderer caller 2370-F is disposed on the processor 2366; the surface renderer caller 2370-F is adapted to call the mono controller 2368, e.g. the mono surface renderer 2368-F in particular, to render graphical content from left and right perspectives into left and right surfaces respectively. The surface renderer caller 2370-F may also be adapted to provide additional information, oversight, control, etc. as needed to an extent that the mono controller 2368 may not be sufficient to render from multiple perspectives (e.g. left and right stereo perspectives), address multiple surface buffers, etc. Thus, in the arrangement of FIG. 23 the surface renderer caller 2370-F may call upon an existing ability of the mono controller 2368 to render graphical content to surfaces, repurposing that ability so as to accomplish the rendering of graphical content to left and right surfaces respectively (which task the mono controller on its own may be insufficient to carry out).

A surface compositor caller 2370-G is disposed on the processor 2366; the surface compositor caller 2370-G is adapted to call the mono controller 2368, e.g. the mono surface compositor 2368-G in particular, to composite left and right surfaces. The surface compositor caller 2370-G may also be adapted to provide additional information, oversight, control, etc. as needed to an extent that the mono controller 2368 may not be sufficient to address multiple groups of surfaces (e.g. left and right stereo surfaces), etc. Thus, in the arrangement of FIG. 23 the surface compositor caller 2370-G may call upon an existing ability of the mono controller 2368 to composite surfaces, repurposing that ability so as to accomplish the compositing of left and right surfaces (which task the mono controller on its own may be insufficient to carry out).

An image merger caller 2370-H is disposed on the processor 2366; the image merger caller 2370-H is adapted to call the mono controller 2368, e.g. the mono image merger 2368-H in particular, to merge left and right surfaces. The image merger caller 2370-H may also be adapted to provide additional information, oversight, control, etc. as needed to an extent that the mono controller 2368 may not be sufficient to merge multiple groups of surfaces into images (e.g. left and right stereo surfaces into left and right images respectively), etc. Thus, in the arrangement of FIG. 23 the image merger caller 2370-H may call upon an existing ability of the mono controller 2368 to merge surfaces into images in an image buffer, repurposing that ability so as to accomplish the merging of left and right surfaces into left and right images in left and right image buffers respectively (which task the mono controller on its own may be insufficient to carry out).

A stereo outputter 2370-I is disposed on the processor 2366; the stereo outputter 2370-I is adapted to output left and right images, such as may be present in left and right stereo image buffers respectively, to a stereo display such as left and right stereo displays 2364-L and 2364-R.

It is emphasized that the arrangement in FIG. 23 is an example only, and that many variations may be possible for various embodiments. Certain variations, though not necessarily the only suitable variations, are shown and described with regard to FIG. 24 through FIG. 27.

Figure 24:
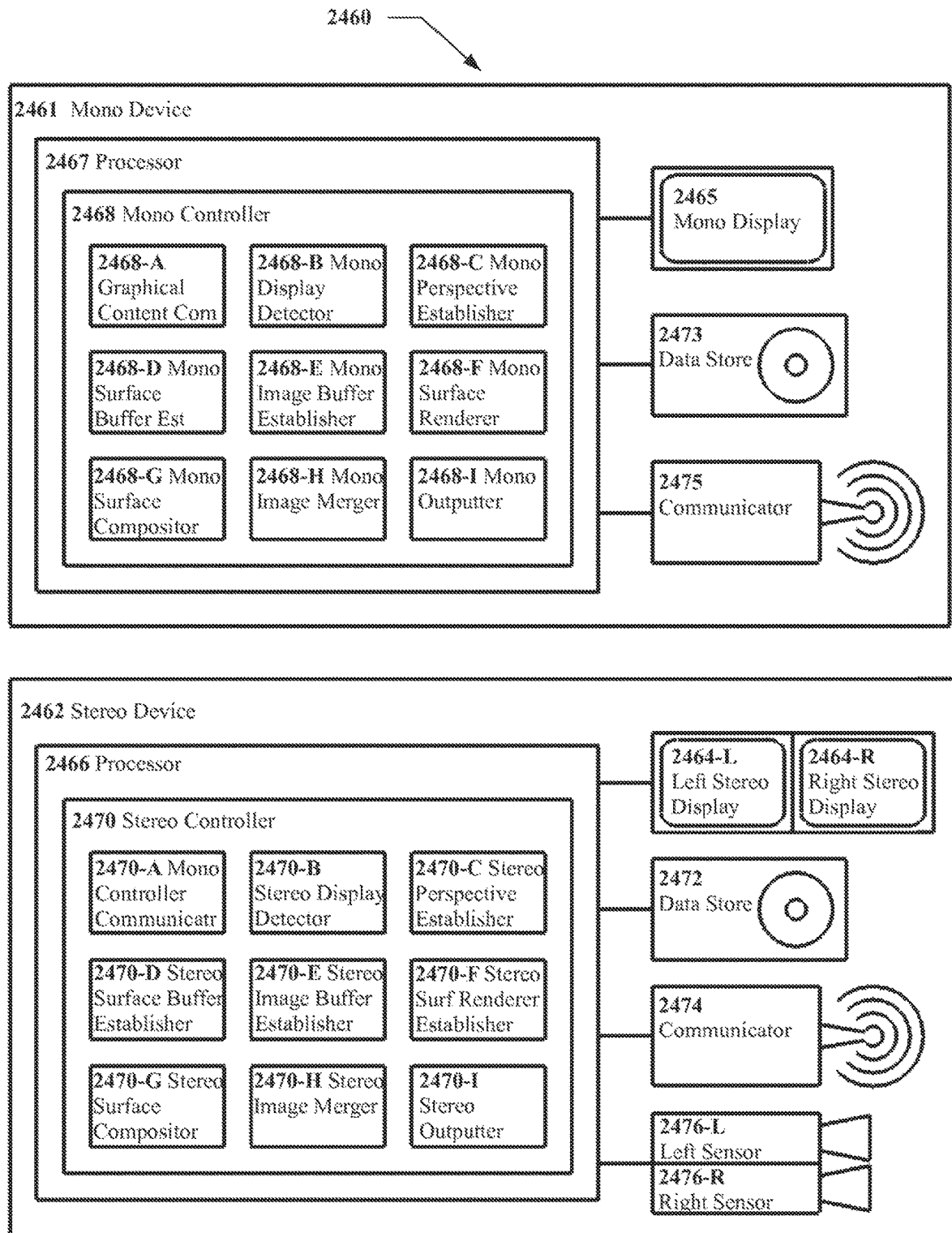
FIG. 24 shows an example multi-part apparatus for delivering mono, stereo and/or mixed mono/stereo content from a mono and/or a stereo display, in schematic form.

Now with reference to FIG. 24, therein is shown another example embodiment of an apparatus 2460 for stereo and/or mixed mono/stereo output, in schematic form. Where the example in FIG. 23 showed an integrated apparatus 2360, the apparatus 2460 in FIG. 24 includes two distinct units, a mono device 2461 and a stereo device 2462. For example, such an arrangement may reflect an embodiment wherein a mobile device such as a smart phone hosts a mono controller 2468 thereon, while a physically separate device such as a stereo head mounted display hosts a stereo controller 2470 thereon. Embodiments are not limited with regard to whether an apparatus 2460 includes multiple physical (and/or logical) divisions such as the mono device 2461 and stereo device 2462 of FIG. 24, or is integrated as the apparatus 2360 in FIG. 23, nor with regard to the particulars of such divisions (if any).

In the example of FIG. 24, the mono device 2461 includes a processor 2467, along with a mono display 2465, a data store 2473, and a communicator 2475 in communication with the processor 2467. Although as noted with regard to FIG. 23, the communicator 2475 may be adapted to serve as a graphical content source, as shown in the example of FIG. 24 the communicator 2475 may serve to communicate otherwise, e.g. the communicator 2475 in the mono device 2461 may communicate with the communicator 2474 in the stereo device 2462, such that processors 2466 and 2467 are in communication, etc., though this may not be required for all embodiments.

As may be seen, the mono controller 2468 includes a graphical content communicator 2468-A, a mono display detector 2468-B, a mono perspective establisher 2468-C, a mono surface buffer establisher 2468-D, a mono image buffer establisher 2468-E, a mono surface renderer 2468-F, a mono surface compositor 2468-G, a mono image renderer 2468-H, and a mono outputter 2468-I. Similar data entities were described with regard to FIG. 23, although as noted embodiments are not necessarily limited only thereto.

The stereo controller 2470 includes a mono controller communicator 2470-A, a stereo display detector 2470-B, and a stereo outputter 2470-I; similar entities were described with regard to FIG. 23, although as noted embodiments are not necessarily limited only thereto.

In addition, the stereo controller 2470 as shown in FIG. 24 includes data entities 2470-C through 2470-H; although data entities 2470-C through 2470-H may in some sense be analogous to data entities already described with regard to FIG. 23, certain differences are now noted.

The stereo perspective establisher 2470-C in FIG. 24 is adapted to define or otherwise establish one or more left and right stereo perspectives for graphical content, e.g. so as to facilitate rendering of graphical content from left and right stereo perspectives. Where in FIG. 23 existing perspective establishment capabilities of the mono controller 2368 therein were called by the stereo controller 2370 therein, in the arrangement of FIG. 24 the stereo controller 2470 itself is adapted to establish suitable left and right perspectives.

Similar distinctions are drawn with regard to data entities 2470-D through 2470-H. A stereo surface buffer establisher 2470-D is disposed on the processor 2466; the stereo surface buffer establisher 2470-D is adapted to assign memory for, define, and/or otherwise establish left and right buffers adapted to receive one or more renders onto surfaces thereof, e.g. renders from left and right stereo perspectives. A stereo image buffer establisher 2470-E is disposed on the processor 2466; the stereo image buffer establisher 2470-E is adapted to assign memory for, define, and/or otherwise establish left and right image buffers adapted to receive one or more left and right images therein. A stereo surface renderer 2470-F is disposed on the processor 2466; the stereo surface renderer 2470-F is adapted to render graphical content, e.g. from left and right stereo perspectives, onto left and right surfaces such as may be present within left and right surface buffers, respectively. A stereo surface compositor 2470-G is disposed on the processor 2466; the stereo surface compositor 2470-G is adapted to composite left and right surfaces such as may be present in left and right surface buffers, for example ordering surfaces, realigning surfaces, scaling surfaces, etc. A stereo image merger 2470-H is disposed on the processor 2466; the stereo image merger 2470-H is adapted to merge one or more left and right surfaces, such as may be present in left and right surface buffers, into left and right images respectively, and/or to deliver such left and right images to a left and right image buffers.

Embodiments are not limited with regard to which function(s) are called in a mono controller by a stereo controller, and/or are performed by the stereo controller itself. Other arrangements, wherein some functions are called by the stereo controller and some performed natively by the stereo controller, may be equally suitable.

Figure 25:
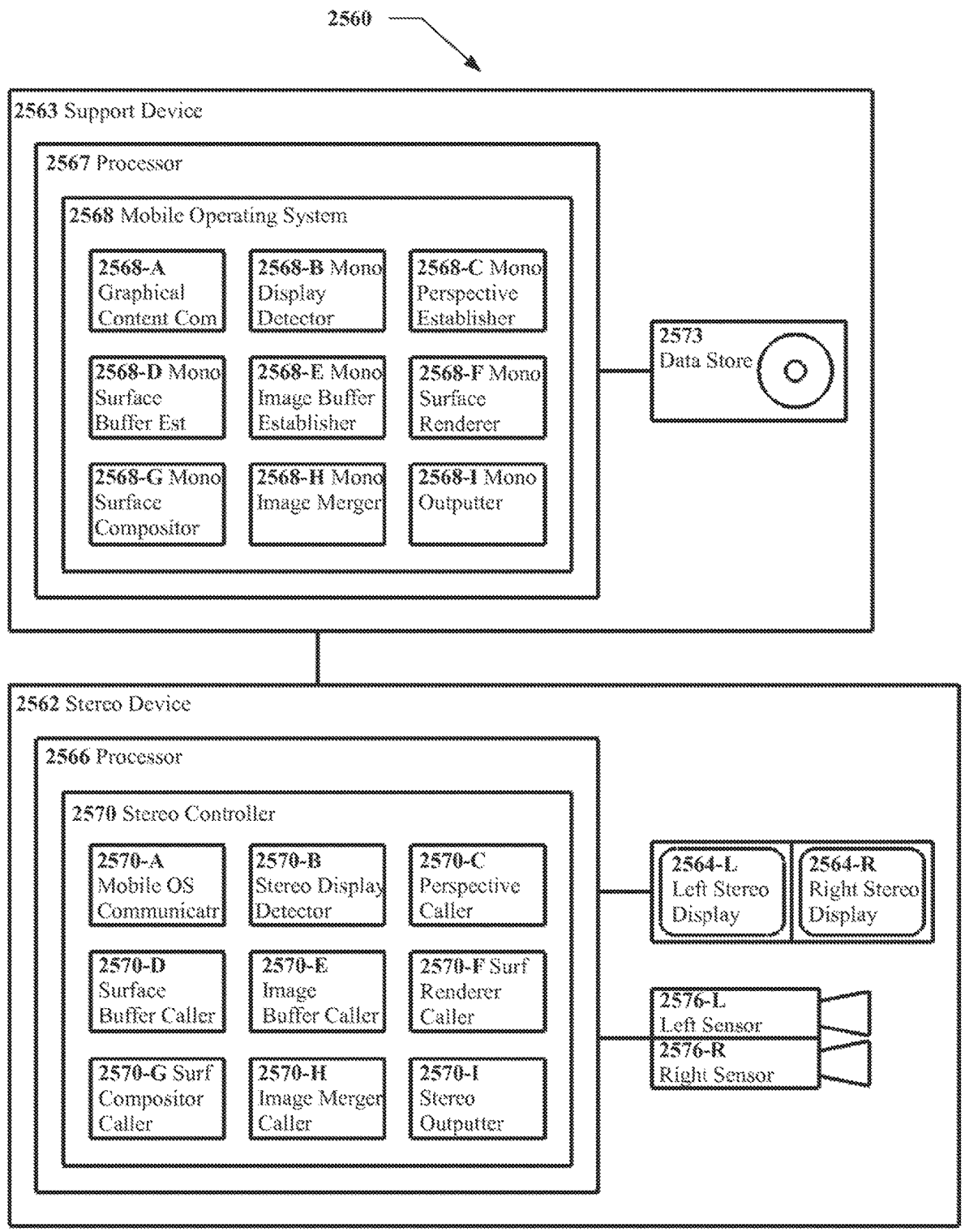
FIG. 25 shows an example multi-part apparatus for delivering stereo and/or mixed mono/stereo content from a stereo display, in schematic form.

Now with reference to FIG. 25, therein is shown another example embodiment of an apparatus 2560 for stereo and/or mixed mono/stereo output, in schematic form. The example in FIG. 24 showed an apparatus 2460 with distinct stereo and mono devices 2462 and 2463, with the mono device 2463 including a mono display 2465. The example in FIG. 24 also shows a non-specific mono controller 2468, and communicators 2475 and 2474 in both mono and stereo devices 2463 and 2462, respectively.

By contrast, in the arrangement of FIG. 25 a stereo device 2562 is present and distinct, but no mono device is present. Rather, a support device 2563 is illustrated, including a processor 2567 and a data store 2573 but lacking a mono display. Where the mono device 2463 of FIG. 24 may represent a device including a mono display such as a smart phone, tablet, etc., the support device 2563 of FIG. 25 may represent a device with processing capability but without necessarily including a display (mono or otherwise). Such a support device 2563 may be a portable processor, a "wallet" computer (e.g. an electronic device adapted to provide processing power and to be conveniently carried in a pocket, purse, etc. so as to support other electronic systems), etc., though other arrangements may be suitable.

In addition, the processor 2567 in the support device 2563 is shown with a mobile operating system 2568 disposed thereon. Certain mobile operating systems may serve as, and/or support functions similar to, those described with regard to mono controllers as previously referenced herein. The mobile operating system 2568 as illustrated includes a number of data entities 2568-A through 2568-I, namely a graphical content communicator 2568-A, a mono display detector 2468-B, a mono perspective establisher 2568-C, a mono surface buffer establisher 2568-D, a mono image buffer establisher 2568-E, a mono surface renderer 2568-F, a mono surface compositor 2568-G, a mono image merger 2568-H, and a mono outputter 2568-I. Similar data entities were described with regard to FIG. 23, although as noted embodiments are not necessarily limited only thereto.

Further, in the arrangement of FIG. 25 no distinct communicators are shown therein. Rather, the support device 2563 and stereo device 2562 are shown with a communications link therebetween. Such an arrangement may implicitly include one or more communicators, may replace communicators (e.g. as a simple "hard wire" link rather than a well-defined hardware and/or software communication entity), etc.

It is noted that absent a mono display, some or all data entities 2568-A through 2568-I may not function as designed. For example, the mono outputter 2568-I may not be able to output mono content to a mono display if no such mono display exists. Similarly, if mono content cannot be (or at least is not) outputted to a mono display, then the various data entities contributing to producing that mono content may not perform, and/or may be unable to perform, original functions for which those data entities were configured, i.e. mono output to a mono display.

It is noted that the inability of certain data elements to perform originally configured functions is not prohibited, nor does the presence of such data elements necessarily interfere with the operation of various embodiments. In more colloquial terms, lack of a mono display does not necessarily cause malfunctions even if mono output is nominally supported, and thus data entities addressing mono output need not necessarily be removed if present. For example, for the mobile operating system 2568 as shown in FIG. 25, it may not be necessary to delete, inactivate, suspend function of, etc. data entities and/or capabilities therein merely because those data entities and/or capabilities are not performing the functions for which those data entities were originally configured (although deleting, inactivating, suspending functions, etc. also is not prohibited). Thus, in at least certain embodiments a mobile operating system may be used "stock", or without necessarily requiring modification, when delivering stereo and/or mixed mono/stereo content (even if the mobile operating system were in itself adapted solely to deliver mono content only, to a mono display only).

It is also noted that even if certain of data entities 2568-A through 2568-I may not perform functions as originally configured, for at least certain embodiments some or all such data entities 2568-A through 2568-I may perform other functions. For example, functions in the mobile operating system 2568 configured for mono-only output to a mono-only display may be called by the stereo controller 2570, the stereo controller 2570 thus repurposing existing portions of the mobile operating system to perform functions (e.g. stereo and/or mixed mono/stereo output) that the mobile operating system in itself does not perform.

Notably, the stereo controller 2570 as illustrated includes a number of data entities 2570-A through 25704, namely a mobile operating system communicator 2570-A, a stereo display detector 2470-B, a perspective caller 2570-C, a surface buffer caller 2570-D, an image buffer caller 2570-E, a surface renderer caller 2570-F, a surface compositor caller 2570-G, an image merger caller 2570-H, and a stereo outputter 2570-I.

The mobile operating system communicator 2570-A is disposed on the processor 2566 of the stereo device 2562; the mobile operating system communicator 2570-A is adapted to communicate with a mobile operating system 2568, for example to receive graphical content therefrom, to send commands and/or queries thereto, etc. In certain embodiments the mobile operating system communicator 2570-A may be adapted to address the mobile operating system 2568 in a manner other than may be typical for the operation of the mobile operating system 2568, for example the mobile operating system communicator 2570-A may be adapted to "spoof" the mobile operating system 2568 by sending spurious instructions thereto, calling or otherwise accessing functions within the mobile operating system 2568 not normally available to external entities, etc. The mobile operating system communicator 2570-A may be at least somewhat analogous to the mono controller communicator 2370-A in FIG. 23. Similar data entities to 2570-B through 2570-I also were described with regard to FIG. 23, although as noted embodiments are not necessarily limited only thereto.

Figure 26:
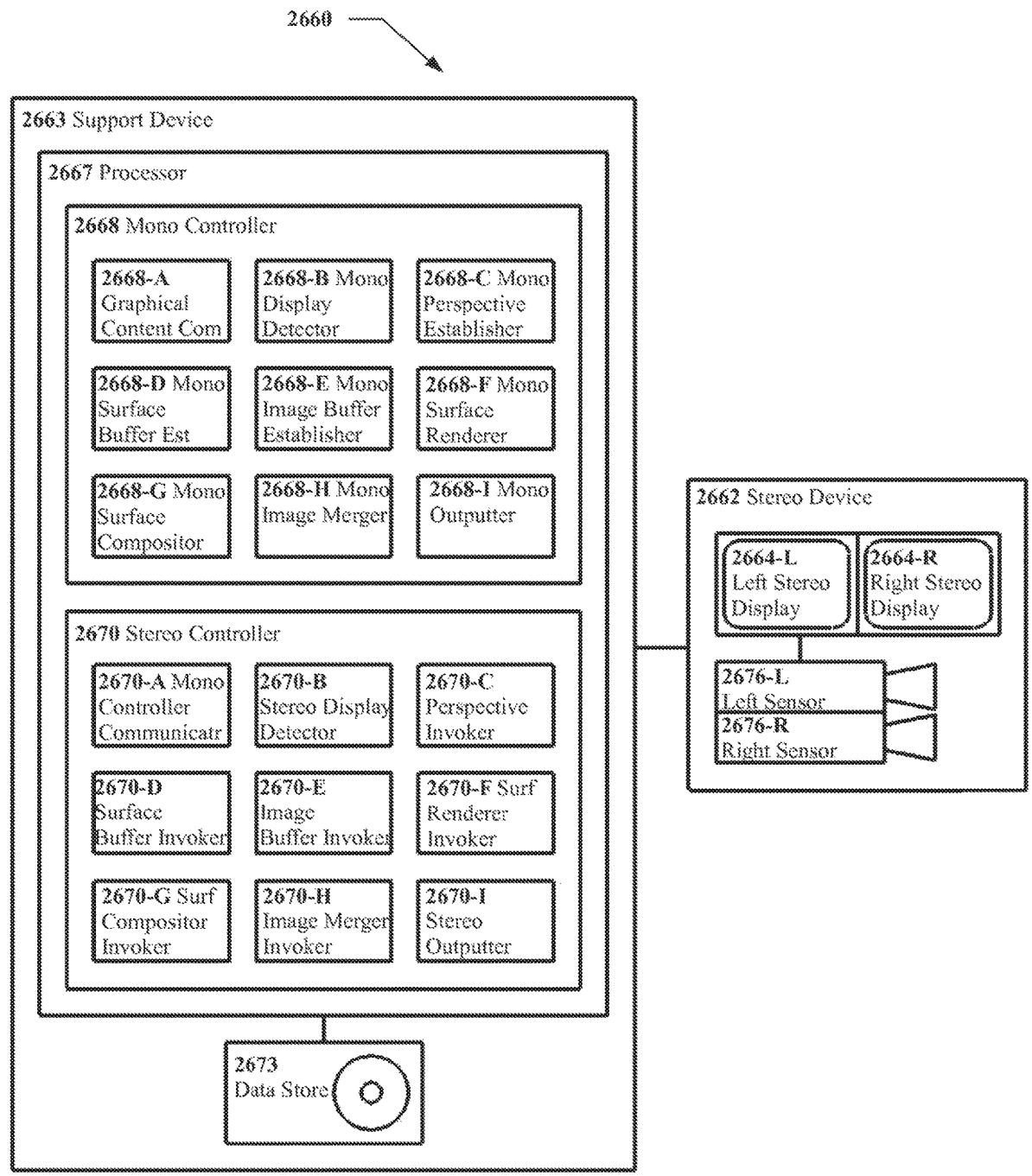
FIG. 26 shows another example multi-part apparatus for delivering stereo and/or mixed mono/stereo content from a stereo display, in schematic form.

Turning now to FIG. 26, therein is shown another example embodiment of an apparatus 2660 for stereo and/or mixed mono/stereo output, in schematic form. The apparatus 2660 includes a support device 2663 and a stereo device 2662. However, where in certain previous examples each such device has been shown with a processor therein, in the arrangement of FIG. 26 only the support device has a processor 2667 therein, with a mono controller 2668 and stereo controller 2670 disposed therein. The support device 2663 also includes a data store 2673 in communication with the processor 2667.

By contrast, the stereo device 2662 is shown to include only left and right stereo displays 2664-L and 2664-R and left and right sensors 2676-L and 2676-R. Embodiments are not limited with regard to what element(s) may be present in what device(s) (for arrangements wherein the apparatus includes two or more devices). In particular, it is noted with reference to FIG. 26 that a given device, as shown the stereo device 2662, may include relatively few, or even only one, functional element of the apparatus 2660. For example, in the arrangement shown in FIG. 26 the stereo device may represent a minimal, e.g. simple and/or lightweight, stereo head mounted display. The support device 2663 may represent a "utility box" adapted to support functions not immediately necessary within the head mounted display proper, e.g. processing capability, data storage, power, heat dissipation, etc. Such an arrangement may for example facilitate wearer comfort, convenience, unobtrusiveness (e.g. a compact head mounted display that may be less likely to be noticed by and/or cause offense in other nearby persons, etc.), and so forth. However, this is an example only, and other arrangements may be suitable.

In the arrangement of FIG. 26, the mono controller 2668 and stereo controller 2670 include therein data entities 2668-A through 2668-I and 2670-A through 2670-I respectively. In particular, the mono controller 2668 includes a graphical content communicator 2668-A, a mono display detector 2468-B, a mono perspective establisher 2668-C, a mono surface buffer establisher 2668-D, a mono image buffer establisher 2668-E, a mono surface renderer 2668-F, a mono surface compositor 2668-G, a mono image merger 2668-H, and a mono outputter 2668-I. The stereo controller 2670 includes a mono controller communicator 2670-A, stereo display detector 2670-B, perspective invoker 2670-C, surface buffer invoker 2670-D, image buffer invoker 2670-E, surface renderer invoker 2670-F, surface compositor invoker 2670-F, image merger invoker 2670-G, and stereo outputter 2670-H. With regard to the term "invoker", as noted previously certain functions may be accomplished by either the stereo controller 2670 performing such functions directly, the stereo controller 2670 calling some other entity (such as the mono controller 2668) to perform such functions, and/or some combination thereof; to "invoke" such functions may be considered a general term, including (but not limited to) carrying out the functions directly and calling those functions to be carried out.

Otherwise similar data entities to 2668-A through 2668-I and 2670-A through 2670-I were described with regard to FIG. 23, although as noted embodiments are not necessarily limited only thereto.

Figure 27:
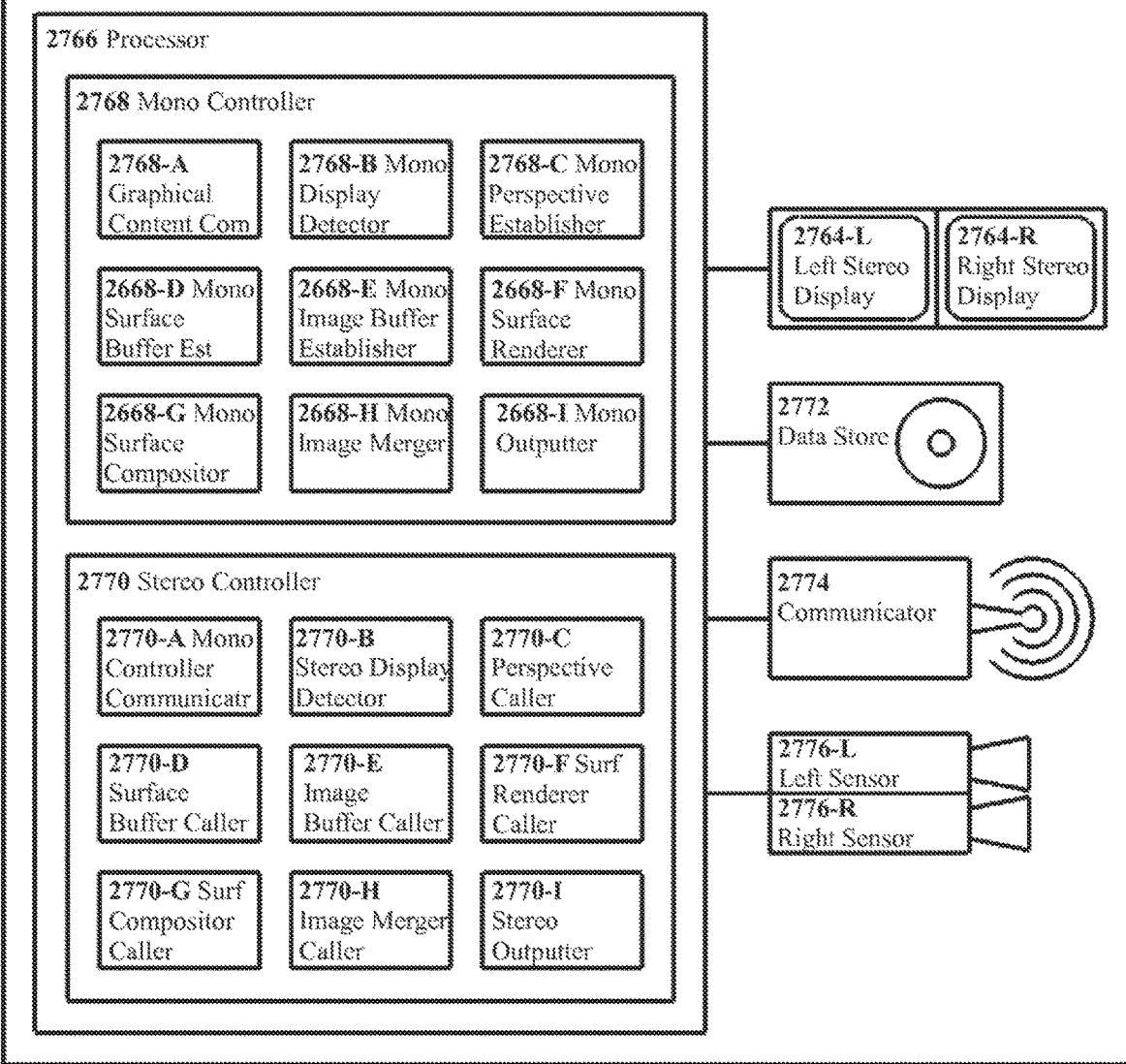
FIG. 27 shows an example integral apparatus for delivering stereo and/or mixed mono/stereo content from a stereo display, in schematic form.

Now with reference to FIG. 27, therein is shown a another example embodiment of an apparatus 2760 for stereo and/or mixed mono/stereo output, in schematic form. The apparatus 2760 as shown is integral, with a processor 2766 having a mono controller 2768 and stereo controller 2770 disposed thereon, and with left and right stereo displays 2764-L and 2764-R, a data store 2772, a communicator 2774, and left and right sensors 2776-L in communication with the processor 2766.

Such an arrangement as shown in FIG. 27 may for example include an integrated stereo head mounted display adapted for stereo and/or mixed mono/stereo display, wherein most/all functional components thereof are incorporated into a portion wearable on a user's head. As a more concrete example, FIG. 27 may represent a head mounted display in the form a pair of glasses or the like, self-contained without external power supply, processor, heat dissipation, etc. However, other arrangements may be equally suitable.

As shown in FIG. 27, the mono controller 2768 includes a graphical content communicator 2768-A, a mono display detector 2468-B, a mono perspective establisher 2768-C, a mono surface buffer establisher 2768-D, a mono image buffer establisher 2768-E, a mono surface renderer 2768-F, a mono surface compositor 2768-G, a mono image merger 2768-H, and a mono outputter 2768-I. The stereo controller 2770 includes a mono controller communicator 2770-A, stereo display detector 2770-B, perspective caller 2770-C, surface buffer caller 2770-D, image buffer caller 2770-E, surface renderer caller 2770-F, surface compositor caller 2770-F, image merger caller 2770-G, and stereo outputter 2770-H. Similar data entities were described with regard to FIG. 23, although as noted embodiments are not necessarily limited only thereto.

As may be seen from FIG. 23 through FIG. 27 collectively, the form and/or arrangement of various embodiments may vary considerably, with various elements moved, added, removed, reconfigured, combined, subdivided, etc. The arrangements in FIG. 23 through FIG. 27 are examples only, and embodiments are not limited thereto.

Figure 28:
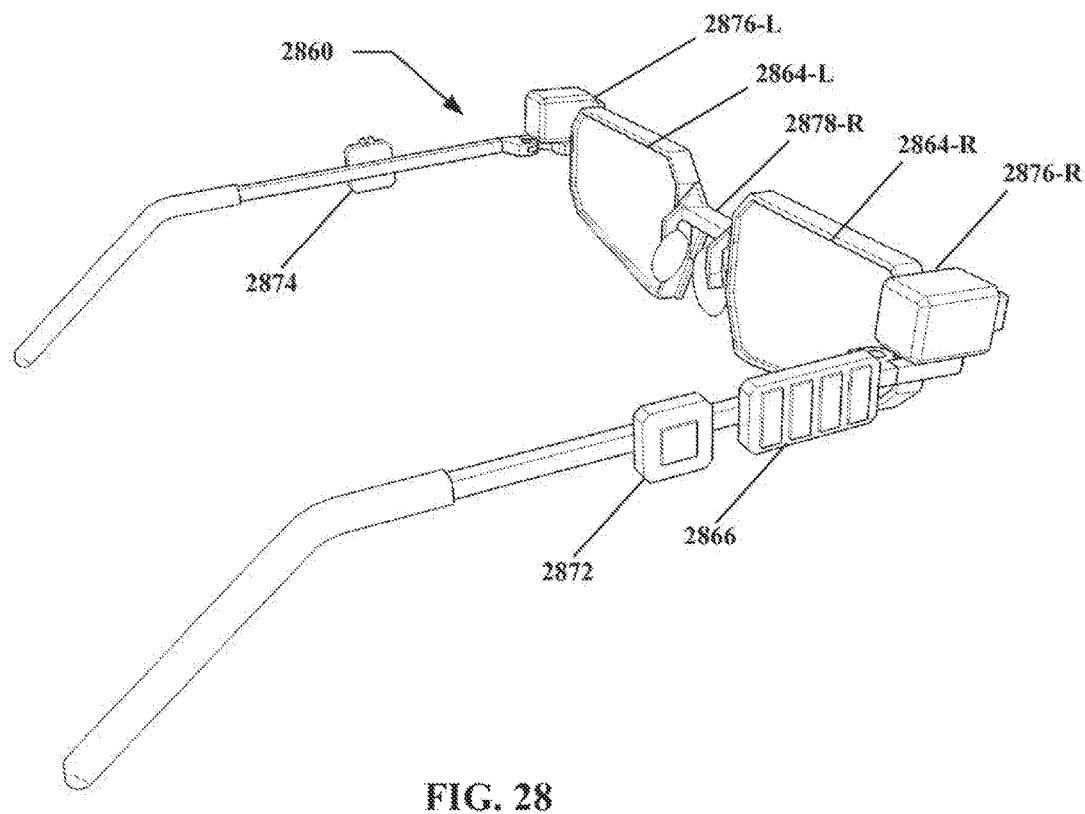
FIG. 28 shows an example apparatus for delivering stereo and/or mixed mono/stereo content from a stereo display, in perspective view.

Now with reference to FIG. 28, therein is shown an example embodiment of an apparatus 2860 for stereo and/or mixed mono/stereo output, in perspective view. As may be seen, in terms of overall configuration the apparatus 2860 in FIG. 28 may in some ways resemble the arrangement shown in schematic form in FIG. 27. That is, the arrangement in FIG. 28 shows a head mounted display in the form a pair of glasses or the like, without external power supply, processor, heat dissipation, etc. being illustrated. However, other arrangements may be equally suitable, including but not limited to arrangements as described with regard to FIG. 23 through FIG. 26.

As may be seen in FIG. 28, the apparatus 2860 therein includes a processor 2866, a data store 2872, a communicator 2874, left and right stereo displays 2864-L and 2864-R, and left and right sensors 2876-L and 2876-R. In addition, the apparatus 2860 includes a body 2878 in the form of a pair of glasses, with the processor 2866, data store 2872, communicator 2874, left and right stereo displays 2864-L and 2864-R, and left and right sensors 2876-L and 2876-R disposed thereon.

In the example illustrated, the left and right stereo displays 2864-L and 2864-R are disposed on the body 2878 such that when the body 2878 is worn the left and right stereo displays 2864-L and 2864-R would be arranged in front of, facing, and proximate the eyes of a wearer, for example so as to display stereo visual information to that wearer. Similarly, the left and right sensors 2876-L and 2876-R are shown disposed on the body 2878 such that when the body 2878 is worn the left and right sensors 2876-L and 2876-R would be arranged in left and right positions proximate and facing substantially outward from the wearer's eyes, for example so as to capture stereo visual information at least substantially comparable to that received by the wearer's eyes. However, the arrangement shown in FIG. 28 is an example only. Substantially any configuration supporting the functions as described herein may be suitable, and may be utilized for various embodiments.

Figure 29:
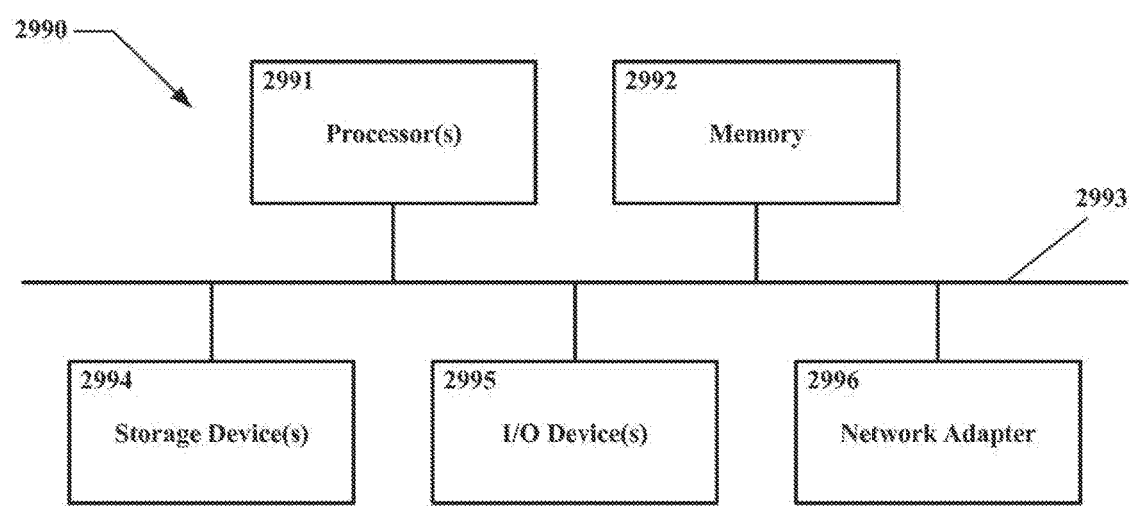
FIG. 29 shows a block diagram of a processing system that may implement operations of the present invention.

FIG. 29 is a block diagram of an apparatus that may perform various operations, and store various information generated and/or used by such operations, according to an embodiment of the disclosed technique. The apparatus may represent any computer or processing system described herein. The processing system 2990 is a hardware device on which any of the other entities, components, or services depicted in the examples of FIG. 1 through FIG. 28 (and any other components described in this specification) may be implemented. The processing system 2990 includes one or more processors 2991 and memory 2992 coupled to an interconnect 2993. The interconnect 2993 is shown in FIG. 29 as an abstraction that represents any one or more separate physical buses, point to point connections, or both connected by appropriate bridges, adapters, or controllers. The interconnect 2993, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 2991 is/are the central processing unit of the processing system 2990 and, thus, control the overall operation of the processing system 2990. In certain embodiments, the processor(s) 2991 accomplish this by executing software or firmware stored in memory 2992. The processor(s) 2991 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2992 is or includes the main memory of the processing system 2990. The memory 2992 represents any form of random access memory (RAM), read-only memory (ROM), flash memory, or the like, or a combination of such devices. In use, the memory 2992 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 2994, a storage device(s) 2995, and I/O device(s) 2996, are also connected to the processor(s) 2991 through the interconnect 2993 The network adapter 2994 provides the processing system 2990 with the ability to communicate with remote devices over a network and may be, for example, an Ethernet adapter or Fibre Channel adapter. The network adapter 2994 may also provide the processing system 2990 with the ability to communicate with other computers within the cluster. In some embodiments, the processing system 2990 may use more than one network adapter to deal with the communications within and outside of the cluster separately.

The I/O device(s) 2996 can include, for example, a keyboard, a mouse or other pointing device, disk drives, printers, a scanner, and other input and/or output devices, including a display device. The I/O device(s) 2996 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 2992 may be implemented as software and/or firmware to program the processor(s) 2991 to carry out actions described herein. In certain embodiments, such software or firmware may be initially provided to the processing system 2990 by downloading from a remote system through the processing system 2990 (e.g., via network adapter 2994).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 2995 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

Figure 30:
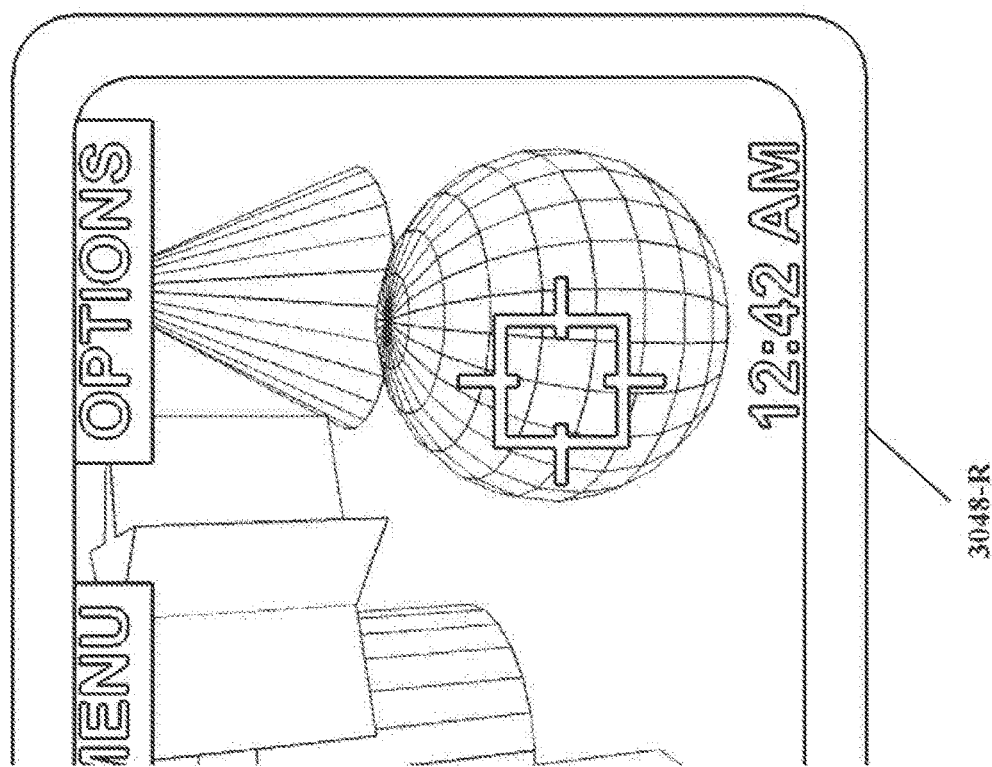
FIG. 30 shows an example arrangement of left and right stereo images exhibiting differing fields of view.
Figure 30:
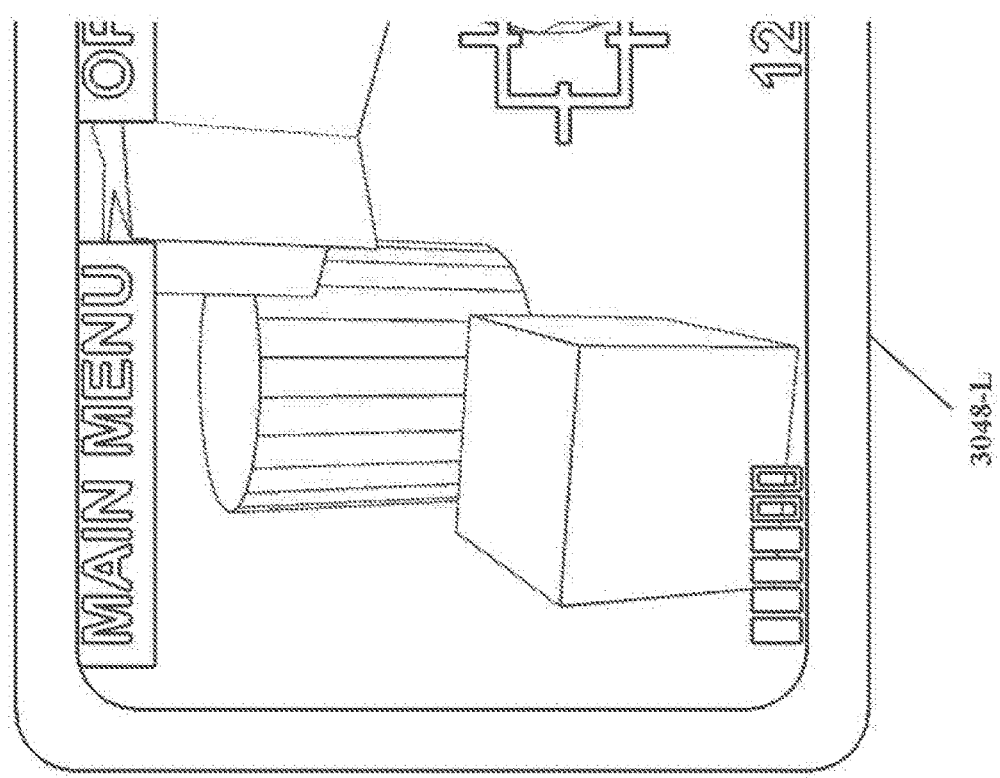

Now with reference to FIG. 30, as noted previously in various embodiments the left and right renders of mono content may be identical, such that the same views of the same mono content are displayed to left and right eyes of a stereo display. However, as also noted, such an arrangement with identical left and right mono content is not required, and other arrangements may be suitable. One example arrangement of such is shown in FIG. 30.

As may be seen in FIG. 30, left and right images 3048-L and 3048-R are shown therein. However, where in certain other examples left and right images included identical or nearly identical mono content therein, in the left and right images 3048-L and 3048-R in FIG. 30 the mono content (e.g. the frame, menu bar, battery indicator, time indicator, crosshair) are visibly different. Notably, the left image 3048-L is missing approximately one third of the full width of the various content, both 2D and 3D, along the right edge of the left image 3048-L. Similarly, the right image 3048-R is missing approximately one third of the full width of the various content along the left edge of the right image 3048-R.

Such an arrangement may be produced in a variety of manners, including but not limited to changing the fields of view of the various renders, changing the size of the surfaces, cropping the surface buffers, surfaces, image buffers, and/or merged images, etc. Regardless of how such an arrangement is achieved, the left and right images 3048-L and 3048-R are different from one another, as may be seen. Likewise, certain content in the left and right images 3048-L and 3048-R is not identical.

Although the above discussion has noted differences in 2D content such as the frame, etc., as may be seen the 3D content therein (the various geometric solids) also is different between left and right images 3048-L and 3048-R. This is in addition to differences already shown for 3D content, e.g. left and right images 3048-L and 3048-R differing so as to present an appearance of three dimensionality through stereo effects. Thus, both 2D and 3D content may differ between left and right images 3048-L and 3048-R, whether to manifest an appearance of three dimensionality or otherwise.

Although the arrangement in FIG. 30 is an example only, and is not limiting, such an arrangement may be useful in at least certain embodiments. For example, if the left and right images 3048-L and 3048-R as shown were aligned with approximately a 50% overlap, then the stereo effect thereof may be modulated across the width of the combined images 3048-L and 3048-R. That is, the right portion of the left image 3048-L and the left portion of the right image 3048-R would show similar content to one another, though the 3D geometric solids therein would exhibit different perspectives; thus the portion wherein the left and right images 3048-L and 3048-R overlap would (if properly aligned) exhibit an appearance of three dimensionality due to stereo effects. However, the left portion of the left image 3048-L and the right portion of the right image 3048-R would each show unique content to left and right eyes of a viewer respectively, without a stereo overlap, and thus the left and right portions of what the viewer sees will appear two dimensional.

Figure 31:
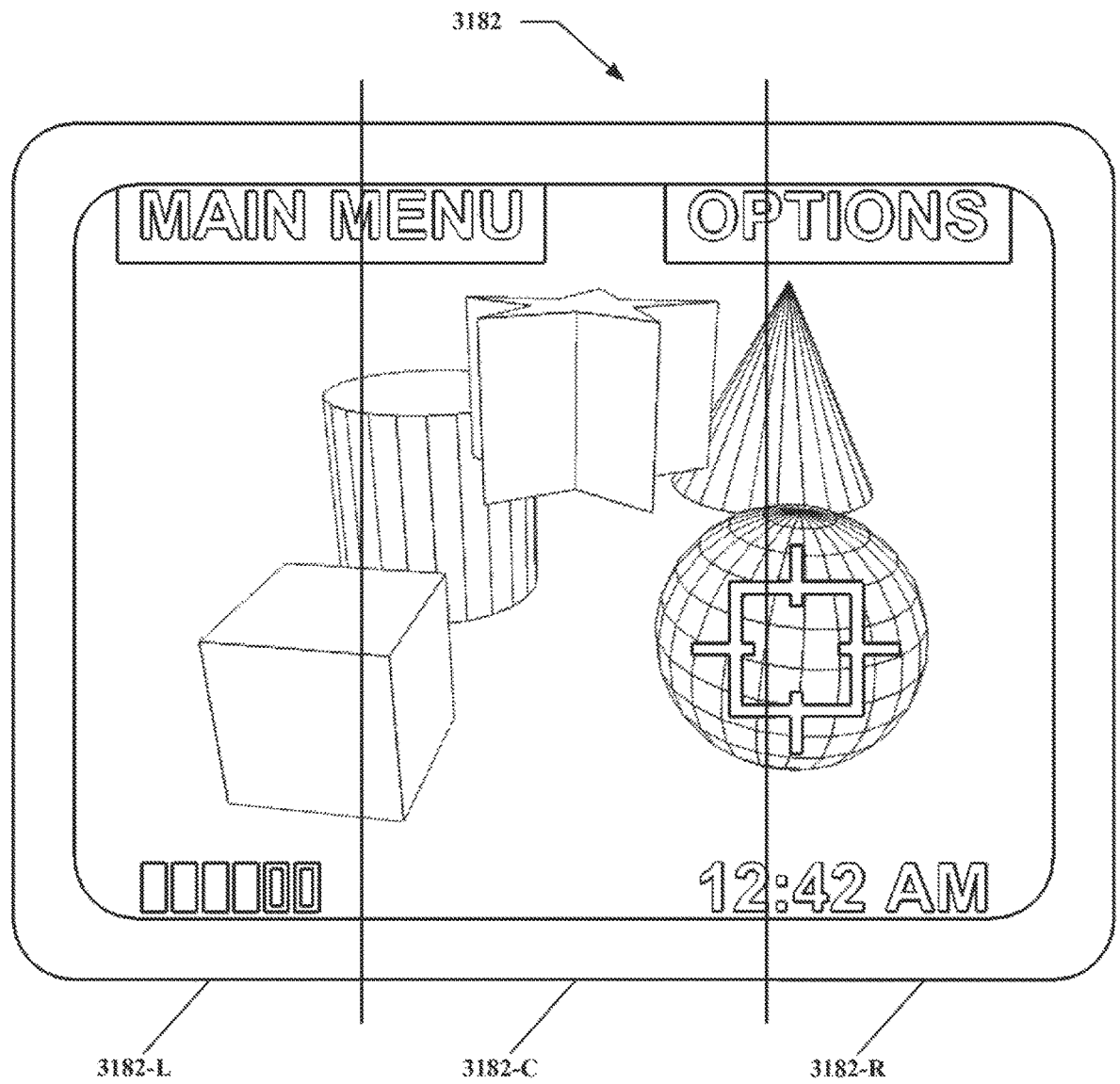
FIG. 31 shows an example combined view as may result from left and right stereo images exhibiting differing fields of view.

Such an arrangement is illustrated in FIG. 31. Therein is shown a combined view 3182 as may result from left and right images when viewed by a viewer; the combined view 3182 is divided into left, center, and right regions 3182-L, 3182-C, and 3182-R as shown by vertical lines in FIG. 31 (though in practice such lines may or may not exist, and if existing may or may not be visible). The combined view 3182 represents the field of view of a viewer, merging left and right images together through stereo effects; the source of what the viewer sees may be from two images, but the images are fused by the viewer's eyes and/or brain into an appearance of a continuous view.

For example, a left image may include the left and center regions 3182-L and 3182-C of the combined view 3182, while a right image may include the center and right regions 3182-C and 3182-R of the combined view 3182. This may be at least somewhat analogous to the left and right images 3048-L and 3048-R as shown in FIG. 30. However, given the differing perspectives of the geometric solids in the left and right images 3048-L and 3048-R in FIG. 30, if those left and right images 3048-L and 3048-R were combined the center region thereof would exhibit an appearance of three dimensionality due to stereo effects. For simplicity (and in view of the limits of two dimensional illustration), three dimensionality is not shown for the center region 3182-C of FIG. 31.

However, such potential for three dimensionality in the central region 3182-C of the combined view 3182 may be noteworthy. Given such an arrangement, the left region 3182-L may be effectively mono, showing content in two dimensions. The right region 3182-R likewise may be effectively mono, also showing content in two dimensions. However, the center region 3182-C, wherein left and right images overlap, may be stereo, showing 3D content in three dimensions. Thus, the geometric solids would appear three dimensional in the center of the combined view 3182, but would appear two dimensional toward the left and right thereof.

Such an arrangement may not be readily detectable, or at least may not be sufficiently notable as to be distracting, to a viewer. Human perception of three dimensionality typically is better towards the center of the combined field of view than towards the left and right edges. Thus, even if only the center region 3182-C of the combined view 3182 is in fact exhibiting a stereo 3D effect, the viewer may automatically "fill in the blanks" and consider their entire field of view to exhibit a similar stereo 3D effect. Such an approach may result in reduced resource demands, e.g. fewer processor cycles dedicated to generating overlapping images if the area of overlap is smaller. Other advantages also may follow therefrom.

However, such an approach is an example only, and embodiments are not limited only thereto.

In addition, it is noted that changes to the field of view, cropping, etc. of content in/for left and right images for output to a stereo display does not necessarily imply similar alterations to content in/for mono images for output to a mono display. That is, a mono display may exhibit a full field of view of content (e.g. as visible in FIG. 31), even if the left and right images do not. For example, because a mono display typically cannot output two images that a viewer may merge in his or her eyes/brain, cropping a mono image may simply result in loss of content; thus a mono image may be left uncropped, while left and right stereo images are cropped, with the effect that viewers of mono and stereo displays may see the same or similar extents of content, even if the individual images are not of similar extent.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
   receiving, by a processor, a first two-dimensional (2D) graphical content and a second 2D graphical content;
   receiving, by the processor, a first three-dimensional (3D) graphical content and a second 3D graphical content;
   rendering, with the mono perspective, a first mono surface from the first 2D graphical content or the first 3D graphical content and a second mono surface from the second 2D graphical content or the second 3D graphical content;
   rendering, with a mono perspective, a first left surface from the first 2D graphical content;
   rendering, with a first right surface from the first 2D graphical content;
   rendering, with a left stereo perspective, a second left surface from the first 3D graphical content;
   rendering, with a right stereo perspective, a second right surface from the first 3D graphical content;
   compositing the first mono surface and the second mono surface;
   compositing the first left surface and the second left surface;
   compositing the first right surface and the second right surface;
   merging the first mono surface and the second mono surface to form a mono image;
   merging the first left surface and the second left surface to form a left image, wherein the left image comprises the mono perspective and the left stereo perspective;
   merging the first right surface and the second right surface to form a right image, wherein the right image comprises the mono perspective and the right stereo perspective;
   outputting the left image to a left stereo display coupled to the processor;
   outputting the right image to a right stereo display coupled to the processor to form a 3D content in conjunction with the left stereo display; and
   outputting the mono image to the left stereo display and the right stereo display to form a 2D content.

2. The method of claim 1, wherein the 2D content is from a first content source and the 3D content is from a second content source separate from the first content source.

3. The method of claim 2, wherein the 2D content displayed by the left stereo display and the right stereo display is also displayed by the mono display.

4. The method of claim 2, wherein the left stereo display and the right stereo display at least a portion of the 3D content in a window and at least a portion of the 2D content outside the window.

5. The method of claim 1, further comprising instantiating, on the processor a mono controller responsive to mono controller input delivered thereto.

6. The method of claim 5, wherein the mono controller input invokes changing content of the mono image.

7. The method of claim 5, wherein the mono controller input invokes changing 3D content of the mono image.

8. The method of claim 5, wherein the mono controller input comprises touch screen input.

9. The method of claim 1, further comprising instantiating, on the processor, a stereo controller responsive to stereo controller input delivered thereto.

10. The method of claim 9, wherein the stereo controller input invokes changing content of the mono image.

11. The method of claim 9, wherein the stereo controller input invokes changing 3D content of the mono image.

12. The method of claim 1, wherein rendering at least one of the first mono surface, the second mono surface, the first left surface, the second left surface, the first right surface, or the second right surface further comprises rendering by at least one of a mono controller, a stereo controller, or a further data entity in communication with at least one of the mono controller and the stereo controller.

13. The method of claim 1, wherein compositing at least one of the first mono surface, the second mono surface, the first left surface, the second left surface, the first right surface, or the second right surface comprises compositing by at least one of a mono controller, a stereo controller, or a further data entity in communication with at least one of the mono controller and the stereo controller.

14. The method of claim 1, wherein merging at least one of the first mono surface, the second mono surface, the first left surface, the second left surface, the first right surface, or the second right surface comprises merging by at least one of a mono controller, a stereo controller, or a further data entity in communication with at least one of the mono controller and the stereo controller.

15. The method of claim 1, wherein:
   rendering the first mono surface, the second mono surface, the first left surface, the second left surface, the first right surface, or the second right surface comprises a stereo controller calling a mono controller to render;
   compositing the first mono surface, the second mono surface, the first left surface, the second left surface, the first right surface, or the second right surface comprises the stereo controller calling the mono controller to composite; and
   merging the first mono surface, the second mono surface, the first left surface, the second left surface, the first right surface, or the second right surface comprises the stereo controller calling the mono controller to merge.

16. The method of claim 15, wherein the stereo controller calling the mono controller to composite comprises at least one of:
   the stereo controller defining a virtual display for compositing by the mono controller;

the stereo controller calling a composite function within the mono controller;

the stereo controller activating executable instructions for compositing in the mono controller; and the stereo controller copying and executing executable instructions for compositing from the mono controller.

17. The method of claim 15, wherein the stereo controller calling the mono controller to merge comprises at least one of:

the stereo controller defining a virtual display for merging by the mono controller;

the stereo controller calling a merge function within the mono controller;

the stereo controller activating executable instructions for merging in the mono controller; and the stereo controller copying and executing executable instructions for merging from the mono controller.

18. The method of claim 1, wherein the processor is disposed in a mobile device.

19. The method of claim 1, wherein the processor is disposed in at least one of a smart phone and a head mounted display.

* * * * *